(12) United States Patent
Fietz et al.

(10) Patent No.: US 11,672,349 B2
(45) Date of Patent: Jun. 13, 2023

(54) CHAIR FOR SUPPORTING A PERSON WHO IS FEEDING A BABY

(71) Applicant: Melissa Fietz, Nanaimo (CA)

(72) Inventors: Melissa Fietz, Nanaimo (CA); Adam Looker, London (CA); Joshua Gregg Erickson, Victoria (CA)

(73) Assignee: Melissa Fietz, Nanaimo (CA)

( * ) Notice: Subject to any disclaimer, the term of this patent is extended or adjusted under 35 U.S.C. 154(b) by 65 days.

(21) Appl. No.: 17/331,273

(22) Filed: May 26, 2021

(65) Prior Publication Data

US 2021/0274941 A1 Sep. 9, 2021

Related U.S. Application Data

(63) Continuation of application No. 16/590,085, filed on Oct. 1, 2019, now Pat. No. 11,045,003.

(60) Provisional application No. 62/739,613, filed on Oct. 1, 2018.

(51) Int. Cl.
| | |
|---|---|
| *A47C 7/54* | (2006.01) |
| *A47C 1/00* | (2006.01) |
| *A47D 13/08* | (2006.01) |
| *B60N 2/75* | (2018.01) |
| *A47C 1/03* | (2006.01) |
| *A61G 5/12* | (2006.01) |

(52) U.S. Cl.
CPC ............... *A47C 7/541* (2018.08); *A47C 1/00* (2013.01); *A47C 1/03* (2013.01); *A47C 7/54* (2013.01); *A47C 7/543* (2013.01); *A47D 13/083* (2013.01); *A61G 5/125* (2016.11); *B60N 2/763* (2018.02); *B60N 2/767* (2018.02); *B60N 2/777* (2018.02)

(58) Field of Classification Search
CPC .......... B60N 2/763; B60N 2/767; B60N 2/77; B60N 2/773; B60N 2/777; A47C 1/03; A47C 1/0303; A47C 1/0307; A47C 1/0308; A47C 7/541; A47D 13/083
See application file for complete search history.

(56) References Cited

U.S. PATENT DOCUMENTS

| | | |
|---|---|---|
| 4,100,633 A | 7/1978 | Pintos |
| 4,277,102 A | 7/1981 | Aaras et al. |
| 4,500,134 A | 2/1985 | Kaneko et al. |
| 4,565,409 A | 1/1986 | Hollonbeck et al. |
| 5,072,905 A | 12/1991 | Hyatt |
| 5,382,079 A | 1/1995 | Wilson et al. |
| 5,407,249 A | 4/1995 | Bonutti |
| 5,536,070 A | 7/1996 | Lemmen |
| 5,765,911 A | 6/1998 | Sorenson |

(Continued)

FOREIGN PATENT DOCUMENTS

| | | |
|---|---|---|
| CA | 2239365 | 12/1998 |
| DE | 20115256 U1 | 3/2003 |

(Continued)

*Primary Examiner* — Syed A Islam

(74) *Attorney, Agent, or Firm* — Oyen Wiggs Green & Mutala LLP; Nicholas Garner

(57) ABSTRACT

The present invention relates to a chair for supporting a person feeding a baby. The chair includes a seat. The chair includes an armrest operatively connected to the seat. The armrest is selectively rotatable about a vertical axis, and moveable forward/rearward, laterally inward/outward and vertically relative to the seat. The armrest is shaped to receive a baby thereon.

20 Claims, 50 Drawing Sheets

(56) References Cited

U.S. PATENT DOCUMENTS

| | | | |
|---|---|---|---|
| 5,851,054 A | 12/1998 | Bergsten et al. | |
| 6,112,748 A | 9/2000 | Esdale et al. | |
| 6,154,690 A | 11/2000 | Coleman | |
| 6,619,746 B2 | 9/2003 | Roslund, Jr. et al. | |
| D487,196 S | 3/2004 | Krayeski | |
| 6,722,736 B2 | 4/2004 | Guillot | |
| 7,201,449 B2* | 4/2007 | Tsai | A47C 1/0308 297/411.36 |
| 7,478,867 B2* | 1/2009 | Weng | A47C 7/70 297/161 |
| 7,862,123 B2 | 1/2011 | Baker et al. | |
| 8,104,837 B2 | 1/2012 | Diffrient | |
| 8,483,914 B2* | 7/2013 | Copeland | E02F 9/2004 701/50 |
| 8,590,968 B2 | 11/2013 | Zahir | |
| 10,080,438 B2 | 9/2018 | Paul et al. | |
| 10,537,175 B2 | 1/2020 | Chen | |
| 11,045,003 B2 | 6/2021 | Fietz | |
| 11,330,917 B2* | 5/2022 | Nichols | A47D 13/083 |
| 2005/0093352 A1 | 5/2005 | Yasuda et al. | |
| 2007/0170759 A1 | 7/2007 | Nolan et al. | |
| 2009/0177128 A1* | 7/2009 | Fukuyama | A61H 7/001 601/134 |
| 2012/0242116 A1 | 9/2012 | Desnoyers | |
| 2013/0139320 A1 | 6/2013 | Tzameret | |
| 2018/0105081 A1* | 4/2018 | Richards | G05G 1/085 |
| 2019/0174921 A1* | 6/2019 | Chen | A47C 7/541 |

FOREIGN PATENT DOCUMENTS

| | | |
|---|---|---|
| DE | 202011104026 U1 | 10/2011 |
| EP | 3348173 A2 | 7/2018 |
| JP | 3201286 A2 | 9/1991 |
| WO | 2004098430 A2 | 11/2004 |
| WO | 2009044422 A1 | 4/2009 |
| WO | 2014124515 A1 | 8/2014 |
| WO | 2016140550 A1 | 9/2016 |

* cited by examiner

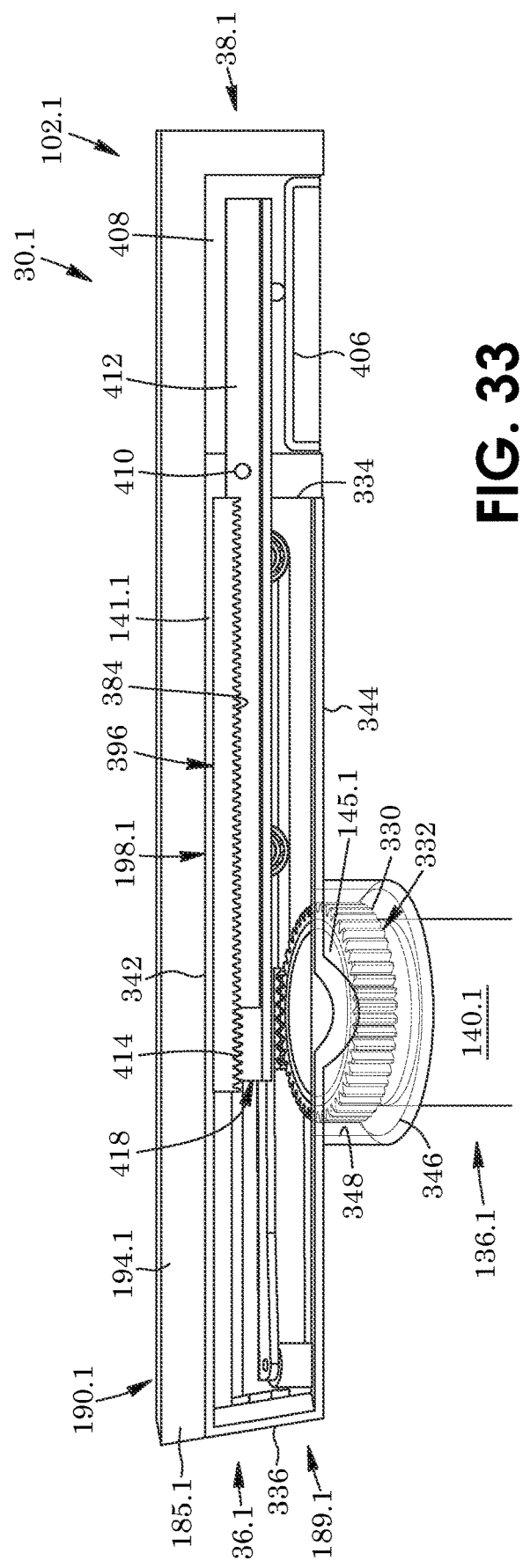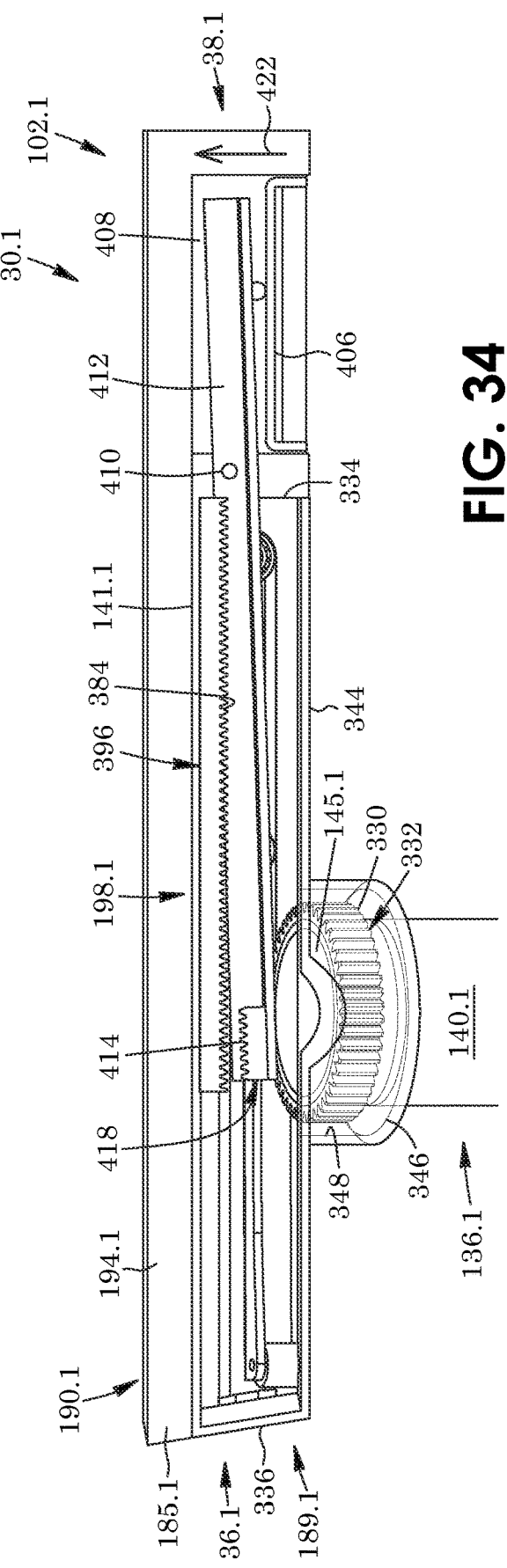

CHAIR FOR SUPPORTING A PERSON WHO IS FEEDING A BABY

FIELD OF THE INVENTION

The present invention relates to a chair. In particular, the invention relates to a chair for supporting a person who is feeding a baby.

DESCRIPTION OF THE RELATED ART

U.S. Pat. No. 5,536,070 to Lemmen discloses an ergonomic armrest for a chair. The chair has a forward armrest pad and a rear armrest pad supported by a vertical support mechanism. The vertical support mechanism permits the vertical, horizontal and transverse adjustment of the location of the armrest pads. The vertical support mechanism allows the position of the forward and rear armrest pads to be reversed. The rear armrest pad is attached to an extendable element which facilitates the displacement of the rear armrest pad above and away from the forward armrest pad. The forward armrest pad is horizontally displaceable relative to the vertical support mechanism and may be angularly displaced.

U.S. Pat. No. 7,201,449 to Tsai discloses an adjustable armrest. The armrest includes an elevation device to allow adjustment of a height of the armrest. The armrest includes a first rocking device to allow adjustment of the armrest to the left or to the right. The armrest includes a movement controlling device to allow front and rear adjustment of the armrest. The armrest includes a second rocking device to allow angular movement of the armrest.

BRIEF SUMMARY OF INVENTION

The present invention provides, and it is an object to provide, an improved chair for supporting a person who is feeding a baby.

There is accordingly provided a chair for supporting a person who is feeding a baby. The chair includes a seat, a backrest and a footrest. The chair includes an armrest operatively connected to the seat. The armrest is selectively rotatable about a vertical axis, and is moveable horizontally, laterally and vertically relative to the seat. The armrest also extends in the direction into which the armrest has been rotated.

There is additionally provided a chair for supporting a person feeding a baby with an armrest thereof that is selectively rotatable about a vertical axis, and moveable forward/rearward, inward/outward, and vertically relative to the seat. The armrest includes an upper portion extending along a horizontal plane and an angled portion coupling to and extending inwards and downwards from and relative to the upper portion thereof.

There is also provided a chair for supporting a person who is feeding a baby. The chair includes a seat. The chair includes a pair of armrests operatively connected to the seat. The armrests are shaped and moveable to a baby-supporting position in which a first of the armrests is angled relative to a second of the armrests so as to receive and enable supporting of the baby and a forearm of a milk provider to fully extend and rest thereon.

There is further provided a chair for supporting a person who is feeding a baby. The chair includes a seat. The chair includes an elongate armrest operatively connected to the seat. The armrest includes a lower portion and an upper portion. The armrest is rotatable about a vertical axis and is moveable forward, rearward and vertically so as to enable the lower portion of the armrest to extend along and abut an abdomen of the person and enable the upper portion of the armrest to extend along and support a forearm of the person.

There is yet further provided a method of milkfeeding using a chair. The chair includes an armrest that is rotatable about a vertical axis and is moveable horizontally, vertically and laterally. The method includes positioning a lower portion of the armrest to extend along and abut an abdomen of the person. The method includes positioning an upper portion of the armrest to extend along and receive a forearm of the person. The method includes positioning an intermediate portion of the armrest to extend along and receive the baby thereon such that a mouth of the baby aligns with a breast of the person. There is yet also provided a chair for supporting a person who is feeding a baby according to another aspect. The chair includes a base with a first plurality of teeth coupled thereto in this example; however this is not strictly required. In other embodiments, there may be provided a clutch, pawls, a friction plate, a locking mechanism on a rail similar to a pipe clamp, or a number of other implementations. The chair includes a first carriage coupled to and laterally moveable relative to the base via a first rail system in this example; however in other embodiments this could be via slide bearings, for example. The first carriage includes a second plurality of teeth. The chair includes a second carriage coupled to and moveable relative to the first carriage via a second rail system. The chair includes an armrest coupled to the second carriage. The chair includes a locking mechanism, in this example a locking member pivotally coupled to the second carriage. Alternatively, this could be a handle actuating a Bowden cable or a handle actuating an electrical solenoid, for example. The locking member has an unlocked position in which first and second catches thereof are disengaged from the first plurality of teeth and the second plurality of teeth. The armrest in the unlocked position is moveable forward/rearward and laterally relative to the base. The locking member is moveable from the unlocked position to a locked position in which both said catches engage with some of the first plurality of teeth and the second plurality of teeth, respectively, in this example with movement of the armrest forward/rearward and laterally being inhibited thereby. These degrees of freedom may be implemented with motorized actuators and may be implemented with positions that are stored, recallable and user selectable.

There is yet further provided a chair for supporting a person who is feeding a baby according an additional aspect. The chair includes a base and an elongate member coupled to and extending upwards from the base. The elongate member includes a first plurality of teeth extending about to a distal end thereof, in this example. Alternatively, the elongate member could comprise friction pads, pawls, or a ratcheting mechanism, for example. The chair includes an armrest coupled to the elongate member. The chair includes a locking mechanism, in this example a locking member pivotally coupled to the armrest. The locking member has an unlocked position in which at least one catch thereof is disengaged from the first plurality of teeth. The armrest in said unlocked position is rotatable about said elongate member. The locking member is moveable from the unlocked position to a locked position in which said at least one catch engages with some of the first plurality of teeth, with rotational movement of the armrest being inhibited thereby. Other locking means/mechanisms instead of teeth may be employed in other embodiments.

There is also provided an armrest for a person who is feeding a baby. The armrest includes an inner mount along which a plurality of teeth couple. The armrest includes an outer housing coupled to and enclosing the inner mount at least in part. The armrest includes a lever pivotally coupled to the outer housing in this example. Alternatively, this could be a clutch, friction plate, a locking mechanism on a rail similar to a pipe clamp, or comprise a number of other implementations. The lever has an unlocked position in which at least one catch thereof is disengaged from the plurality of teeth. The armrest in said unlocked position is moveable forward/rearward relative to the inner mount. The lever is moveable from the unlocked position to a locked position in which the at least one catch engages with some of the plurality of teeth, with movement of the armrest forward/rearward being inhibited thereby. Alternatively, this may be implemented using an actuator so that the extension was motorized and user recallable.

As a further alternative each of the chairs and armrests may be microprocessor controlled.

BRIEF DESCRIPTION OF DRAWINGS

The invention will be more readily understood from the following description of preferred embodiments thereof given, by way of example only, with reference to the accompanying drawings, in which:

FIG. 33 is a right, outer side perspective view of the inner shaft and the armrest of FIG. 32, with the outer housing and inner mount of the armrest shown in transparent lines, with the lever being shown in a locked position in which a gear rack of the lever thereof engages with the gear racks of the inner mount of the armrest, and with the inner shaft being shown in fragment and the rest of the chair not being shown;

FIG. 34 is a right, outer side perspective view of the inner shaft and the armrest of FIG. 33, with the outer housing and inner mount of the armrest shown in transparent lines, with the lever being shown in an unlocked position in which the gear rack of the lever thereof are spaced-apart part from the gear racks of the inner mount of the armrest, and with the inner shaft being shown in fragment and the rest of the chair not being shown;

DESCRIPTION OF THE PREFERRED EMBODIMENTS

Figure 1:
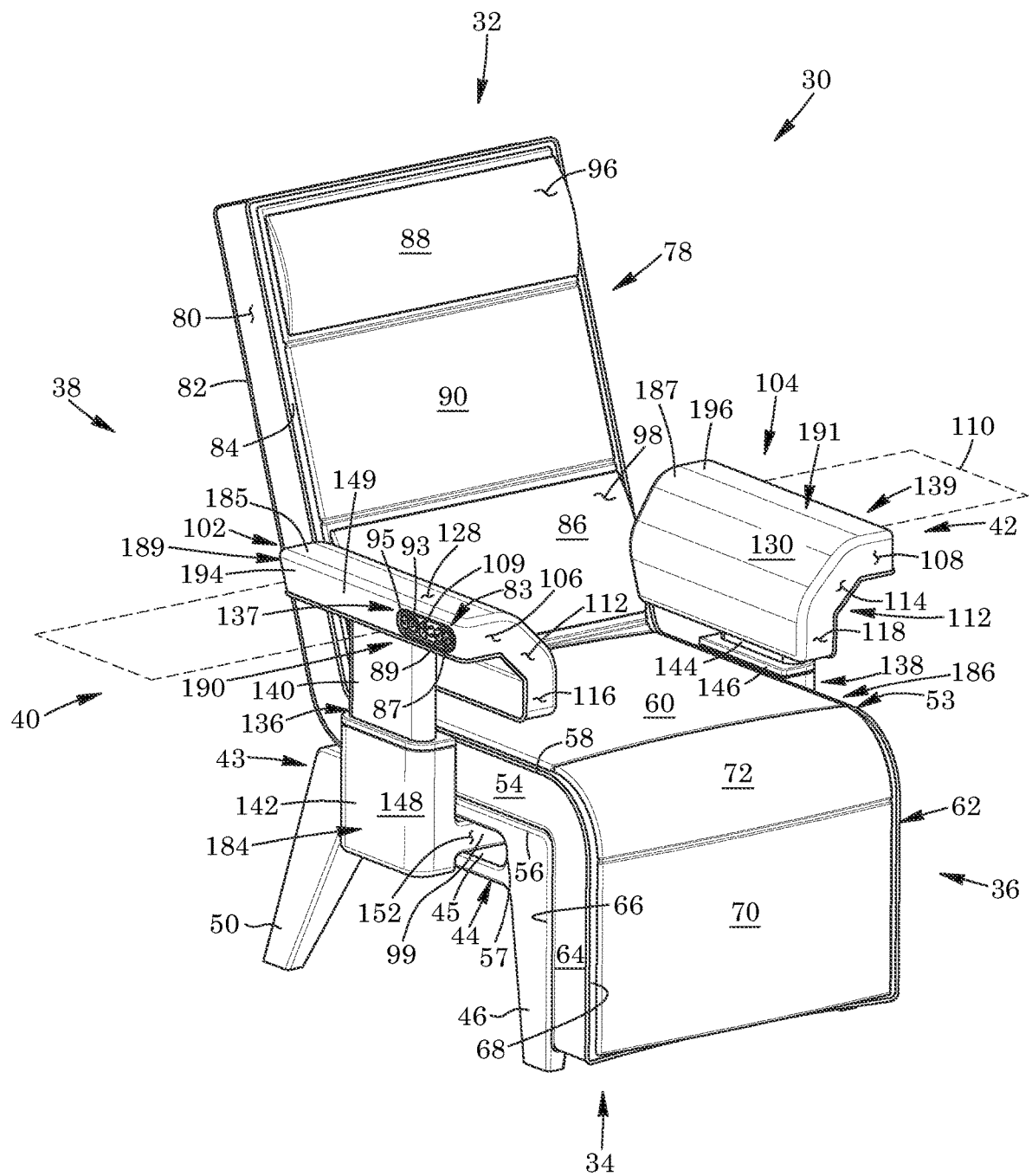
FIG. 1 is a front, right side perspective view of a chair for supporting a person who is feeding a baby, the chair being according to one aspect and including a leg rest shown in a fully lowered position, a backrest shown in a fully raised position, and armrests shown in non-rotated, retracted, rearward positions.
Figure 7:
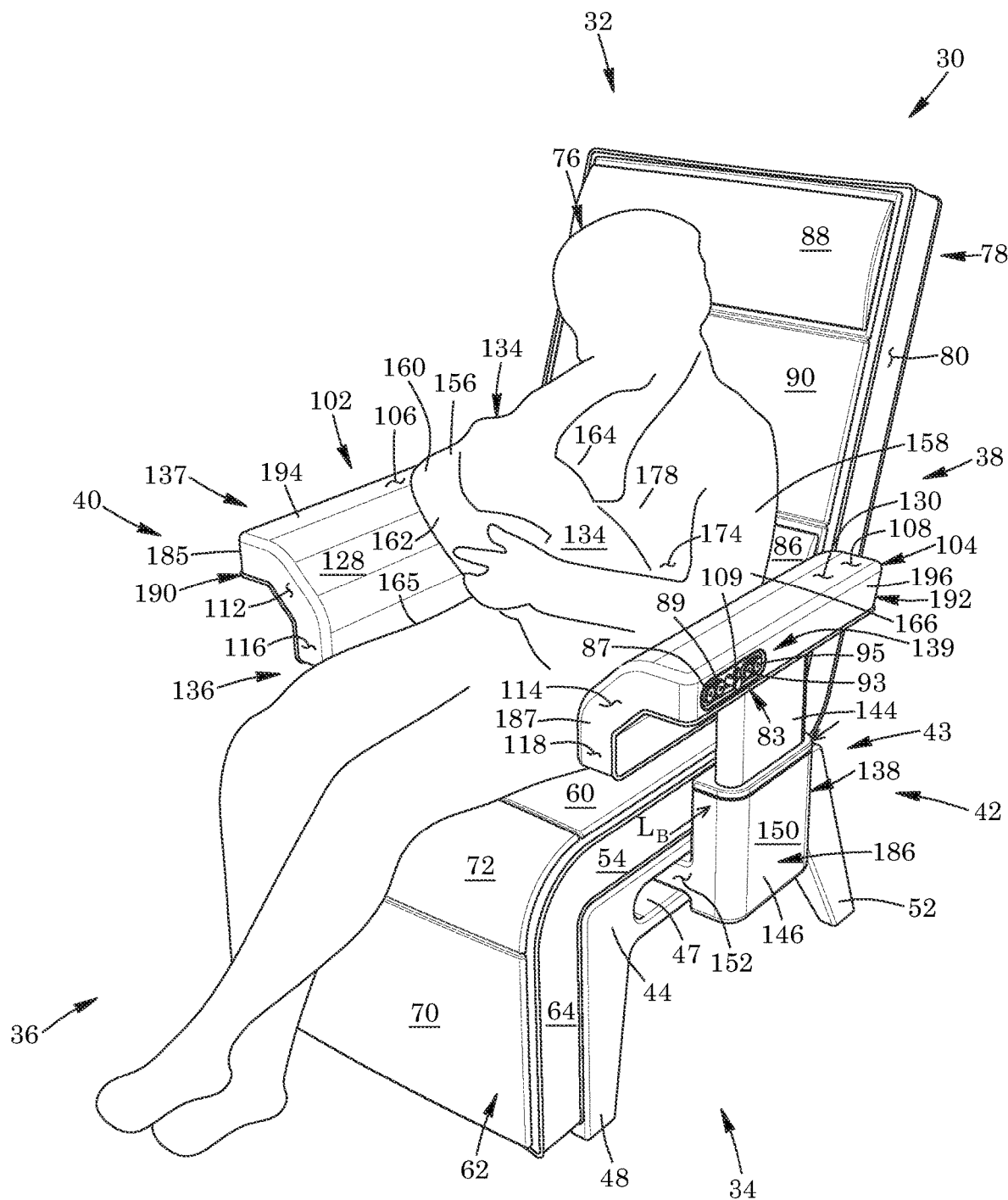
FIG. 7 is a front, right side perspective view of the chair of FIG. 1, together with a person holding a baby between her arms, and showing a method of using the chair according to a first aspect.

Referring to the drawings and first to FIG. 7, there is shown a chair 30 for supporting a person 76 who is feeding a baby 134. Referring to FIG. 1, the chair may be referred to as a nursing chair; however, this is not strictly required as the chair may be used for purposes other than breastfeeding one's baby. For example, the chair may be used for bottle-feeding one's baby. The chair 30 has a top 32, a bottom 34, a front 36 and a rear 38. The front and rear of the chair extend between the top and bottom of the chair. The chair 30 has a right side 40 from the perspective of a person sitting in the chair and a left side 42 spaced-apart therefrom. The sides of the chair extend between the top 32 and bottom 34 of the chair and extend between the front 36 and rear 38 of the chair.

The chair 30 includes a base 43 comprising base support 44 that is generally a rectangular prism in exterior form in this example; however, this is not strictly required and the base support may take the form of other shapes in other embodiments. As seen in FIG. 1, the base support has a first elongate aperture 45 extending therewithin in this example, with the aperture extending from the right side 40 towards the left side 42 of the chair 30. Aperture 45 is positioned between the front 36 and rear 38 of the chair 30.

Figure 4A:
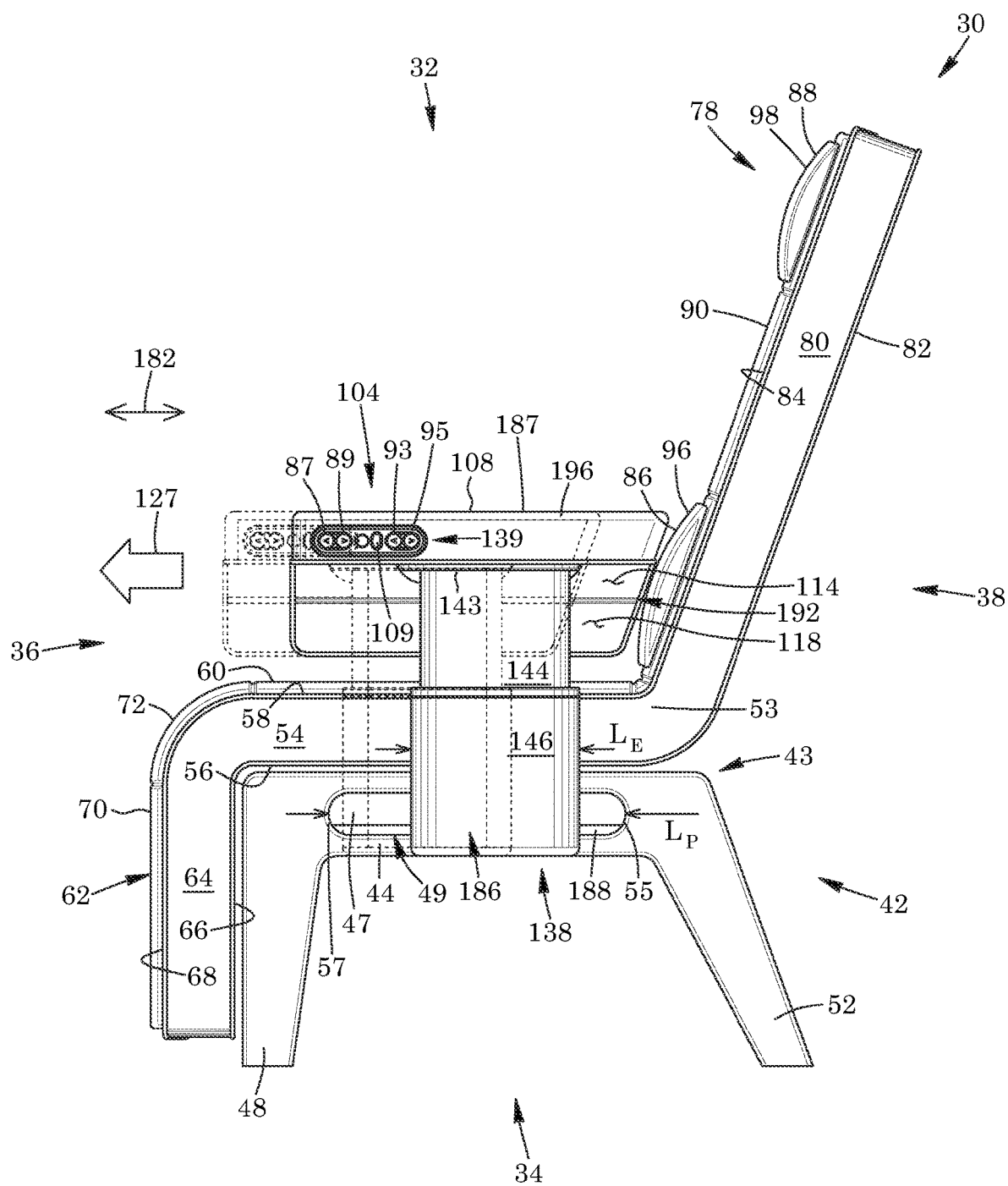
FIG. 4A is a right side elevation view thereof, with forward positions of the armrests and lower carriage assemblies of the chair shown in ghost.
Figure 10:
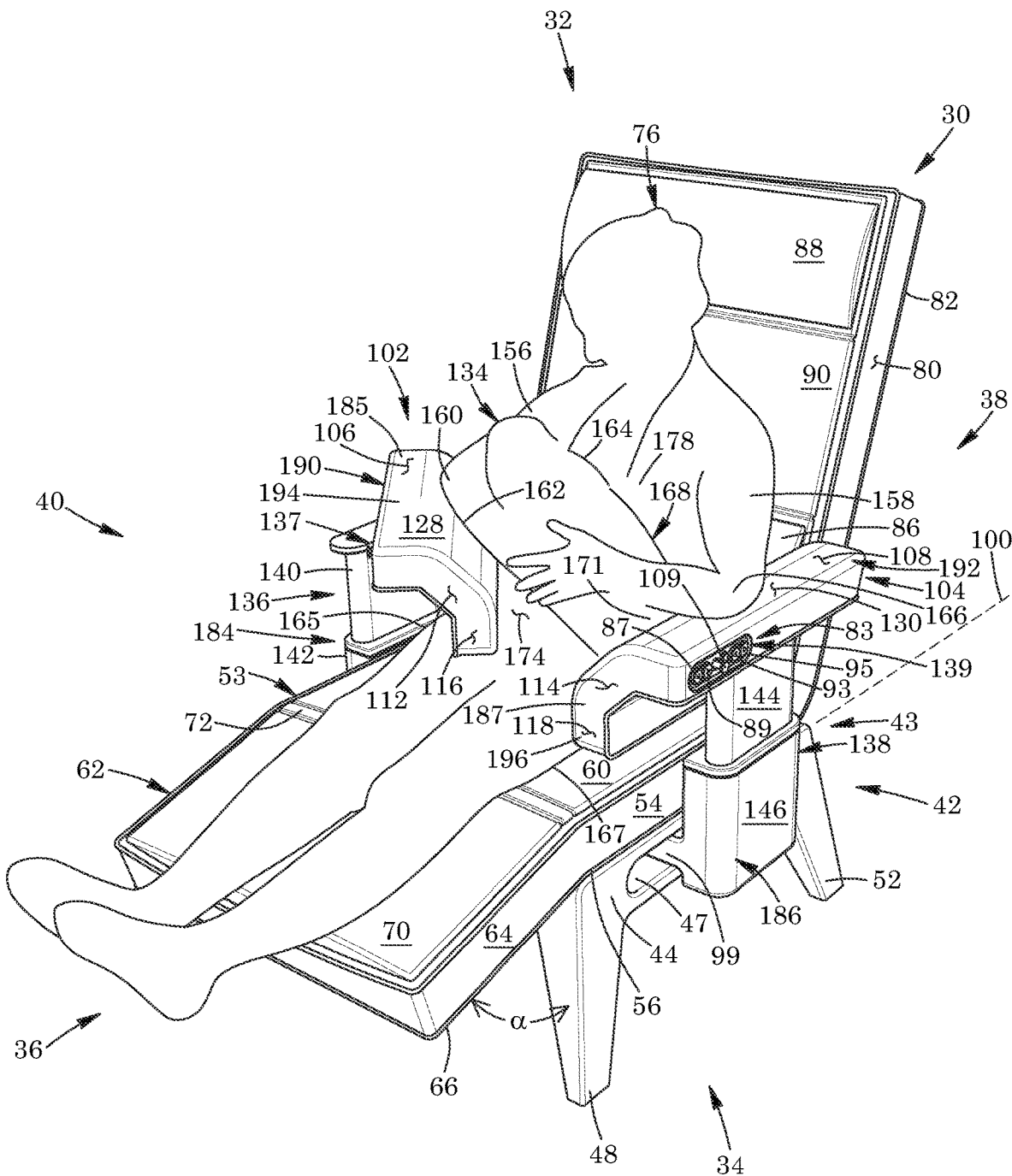
FIG. 10 is a front, right side perspective view of the chair, person and baby of FIG. 7, showing a method of using the chair according to a fourth aspect.

As seen in FIG. 10, the base support 44 has a second elongate aperture 47 extending therewithin in this example, with the aperture extending from the left side 42 towards the right side 40 of the chair. Aperture 47 is positioned between the front 36 and rear 38 of the chair. Each of the apertures is obround in shape in this example and defines a pathway, which is seen in FIG. 4A by pathway 49 for aperture 47. Each pathway has a first or rearward end 55 and a second or forward end 57. As seen in FIG. 4, the pathway has a length $L_P$ which extends between the rearward and forward ends thereof.

As seen with reference to FIGS. 1 and 7, the chair 30 includes a pair of front legs 46 and 48 coupled to and extending downwards from the base support 44. The front legs align with and extend along the front 36 of the chair 30. Still referring to FIGS. 1 and 7, the chair 30 includes a pair of rear legs 50 and 52 coupled to and extending downwards from the base support 44. The legs 46, 48, 50 and 52 are part of base 43 of the chair. The rear legs 50 and 52 align with and extend along the rear 38 of the chair. Each of the legs is rectangular in lateral cross-section in this example and tapers in a direction extending from the base support 44 towards the bottom 34 of the chair 30. Referring to FIG. 4, the rearward ends 55 of pathways 49 align adjacent to a position where the rear legs 52 of the chair 30 extend downwards from the base support 44 in this example. The forward ends 57 of the pathways align adjacent to a position where the forward legs 48 of the chair extend downwards from the base support in this example.

As seen in FIG. 1, the chair 30 includes a seat 53 which is also part of base 43 thereof. The legs 50 and 46 of the chair couple to and extend downwards from the seat. The seat 53 is a rectangular prism in shape in this example; however, this is not strictly required and the seat may take the form of other shapes in other embodiments. The seat includes a seat base 54 having a bottom 56 and top 58. The bottom of the seat base couples to the base support 44. The seat base 54 extends along, abuts and is contiguous with the base support in this example. The chair 30 includes a seat cushion 60 which extends along and couples to the top 58 of the seat base. The seat cushion is a removable cushion designed to be thrown into a washing machine for ease of cleaning and then re-attached to the chair.

Still referring to FIG. 1, the chair includes a leg rest 62. The leg rest is a rectangular prism in shape in this example; however, this is not strictly required and the leg rest may take the form of other shapes in other embodiments. The leg rest 62 includes a leg base 64 having a first planar surface 66 and a second planar surface 68. The leg base is pivotable relative to the seat base 54 in this example. The leg base 64 and seat base are integrally connected and form a unitary whole. The leg rest 62 has a fully lowered position seen in FIGS. 1 to 5, 7, 11 and 12. The leg rest aligns with and extends along the front 36 of the chair 30 when in its lowered position. As seen with references to FIGS. 1 and 5, the first planar surface 66 of the leg base 64 abuts, aligns with and extends along the front legs 46 and 48 of the chair 30 when the leg rest is in its lowered position in this example.

Figure 11:
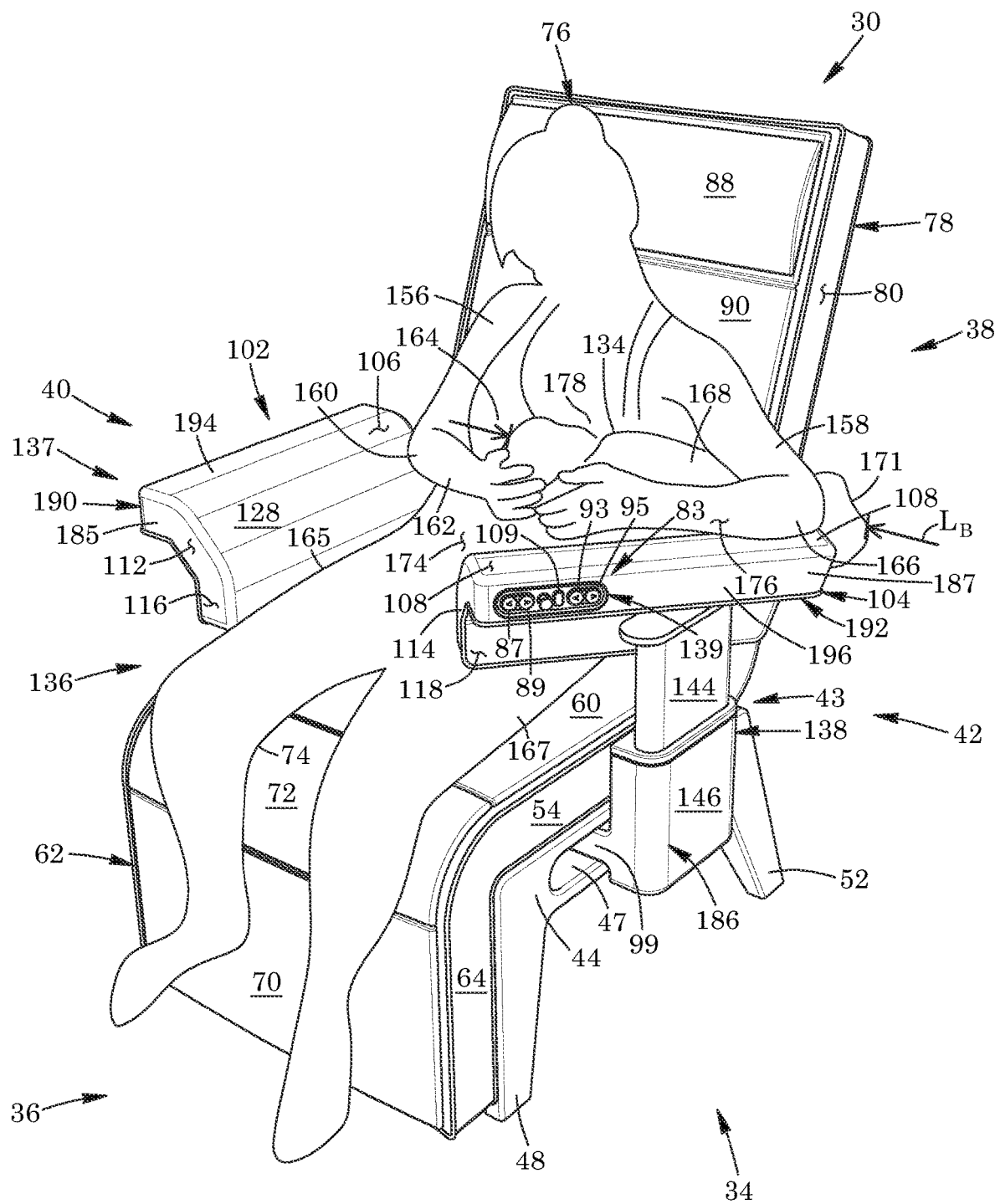
FIG. 11 is a front, right side perspective view of the chair, person and baby of FIG. 7, showing a method of using the chair according to a fifth aspect.

Referring to FIG. 1, the chair 30 includes a leg rest cushion 70 which extends along and couples to the second planar surface 68 of the leg base 64. The chair includes a resilient intermediate or popliteal cushion 72 coupled to the seat base 54 and leg base in this example; however such cushions are not strictly required nor do they have to be coupled to the seat base. The popliteal cushion is positioned between the seat cushion 60 and leg rest cushion 70. As seen in FIG. 11, the popliteal cushion 72 is shaped to support and align with the popliteal fossa 74 of person 76. The popliteal cushion is shown in an extended position in FIGS. 1 to 5, 7 and 11 to 12.

Figure 5:
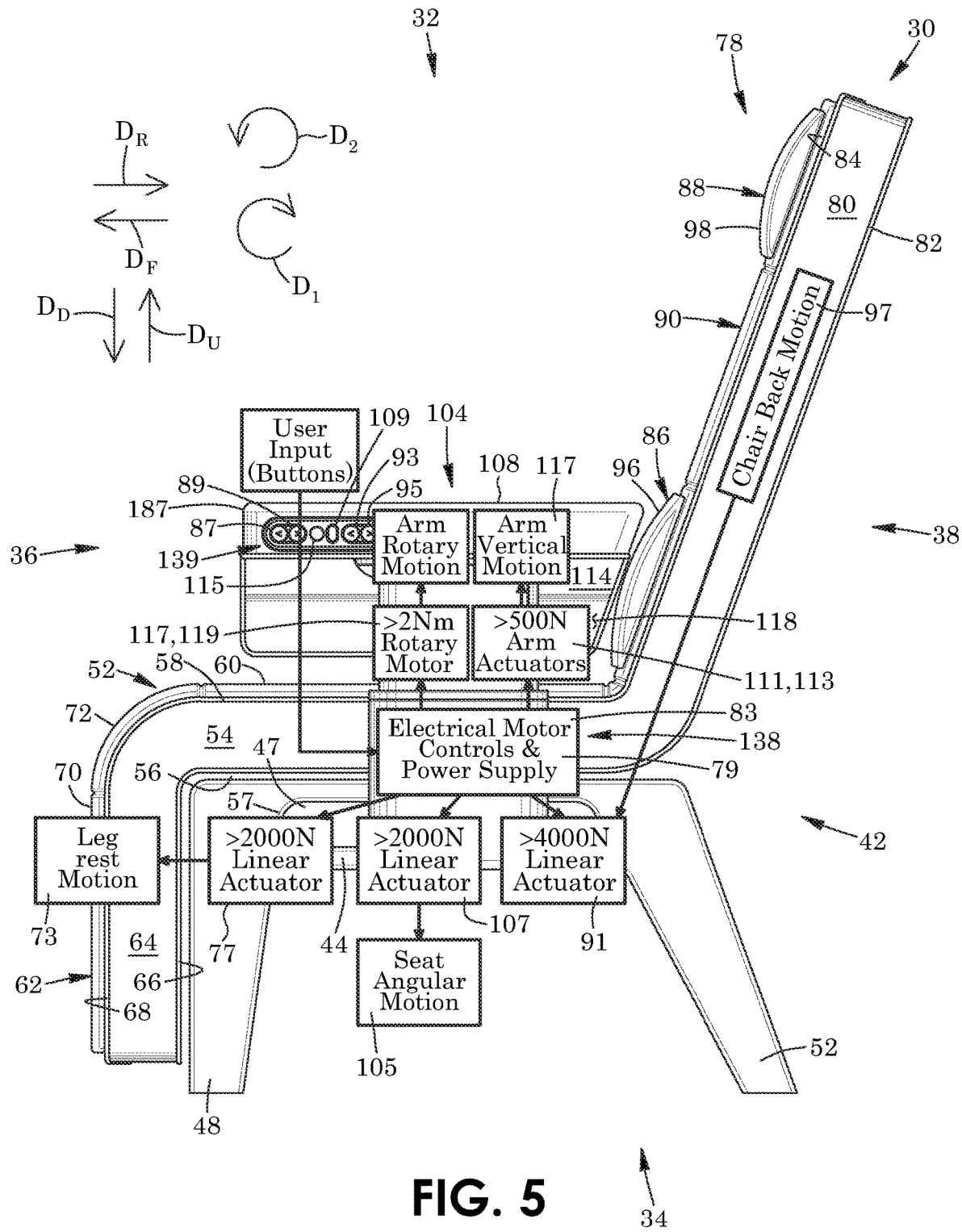
FIG. 5 is a right side elevation schematic view of the chair of FIG. 1, with actuators and controls thereof shown in box diagrams according to one aspect and example.
Figure 6:
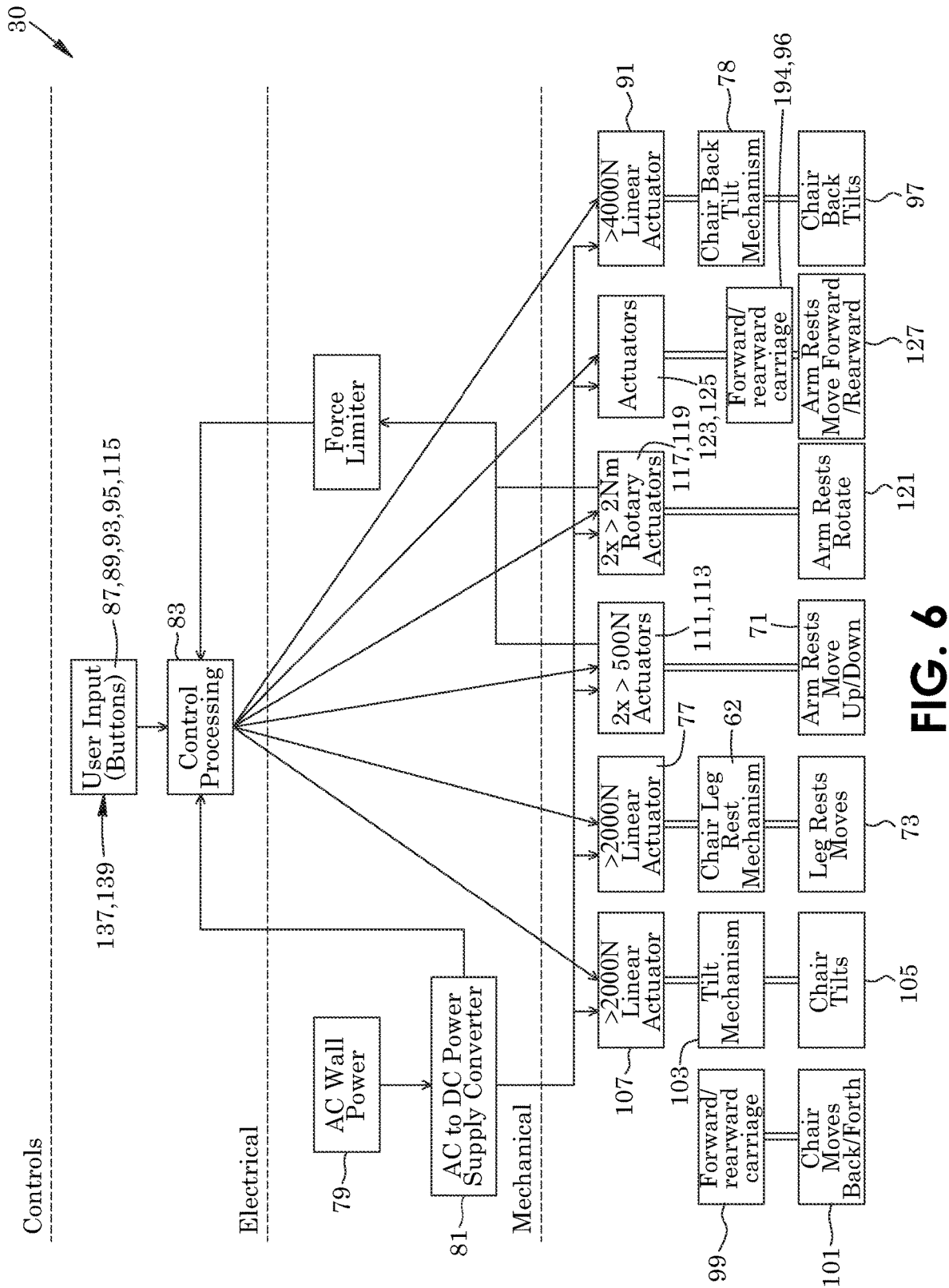
FIG. 6 is a flow chart of control, electrical and mechanical actuator components of the chair of FIG. 1 according to one aspect and example.
Figure 8:
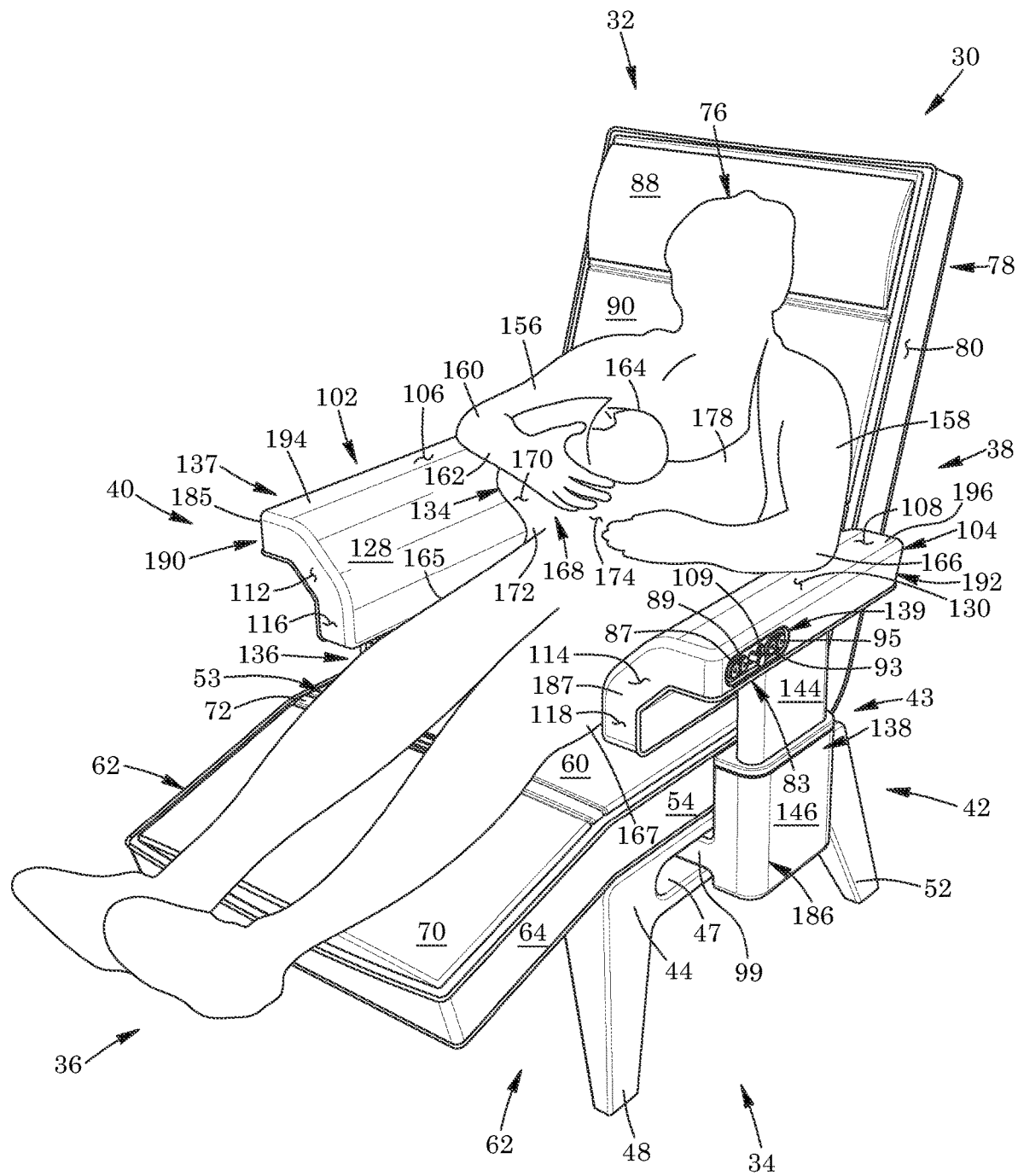
FIG. 8 is a front, right side perspective view of the chair, person and baby of FIG. 7, showing a method of using the chair according to a second aspect.
Figure 9:
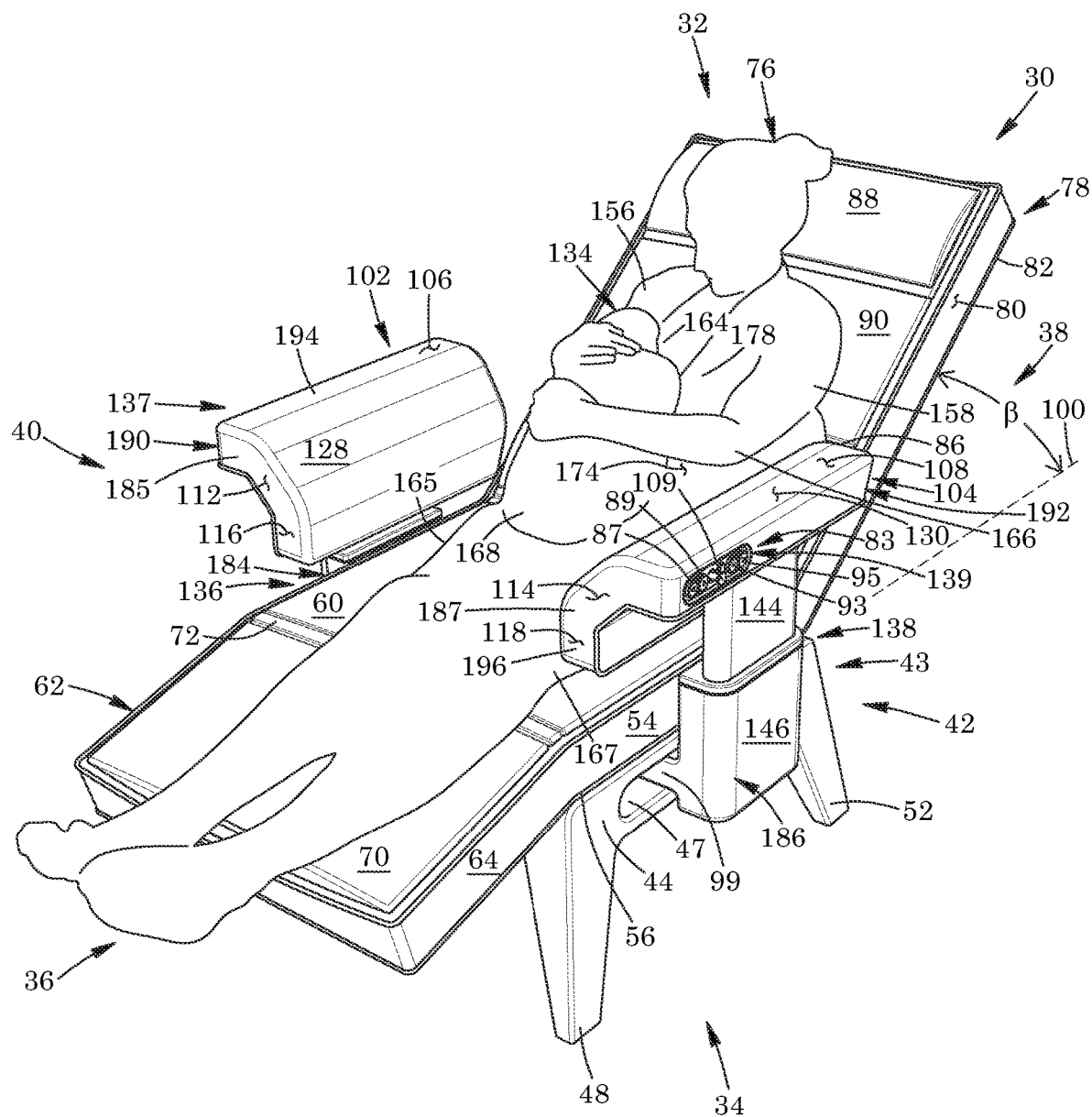
FIG. 9 is a front, right side perspective view of the chair, person and baby of FIG. 7, showing a method of using the chair according to a third aspect.

The leg rest 62 is moveable from the fully lowered position seen in FIG. 1 to a fully raised position seen in FIGS. 8 to 10 via an actuator, in this example a leg rest actuator 77 seen in FIG. 5. The leg rest actuator is coupled to and positioned within the base support 44 in this example. Referring to FIG. 6, the chair 30 includes a power supply, in this example an alternating current (AC) electric power supply 79 obtained by inserting an electrical plug (not shown) of the chair 30 into an electrical outlet (not shown). However, this is not strictly required and the chair may be powered by other power supplies such as via a battery in other embodiments. The chair 30 includes an AC to DC power supply converter 81 in this example to which the power supply 79 is electrically coupled. The converter electrically couples to leg rest actuator 77. The power supply 79 is thus electrically coupled to and provides power to the leg rest actuator.

Figure 3:
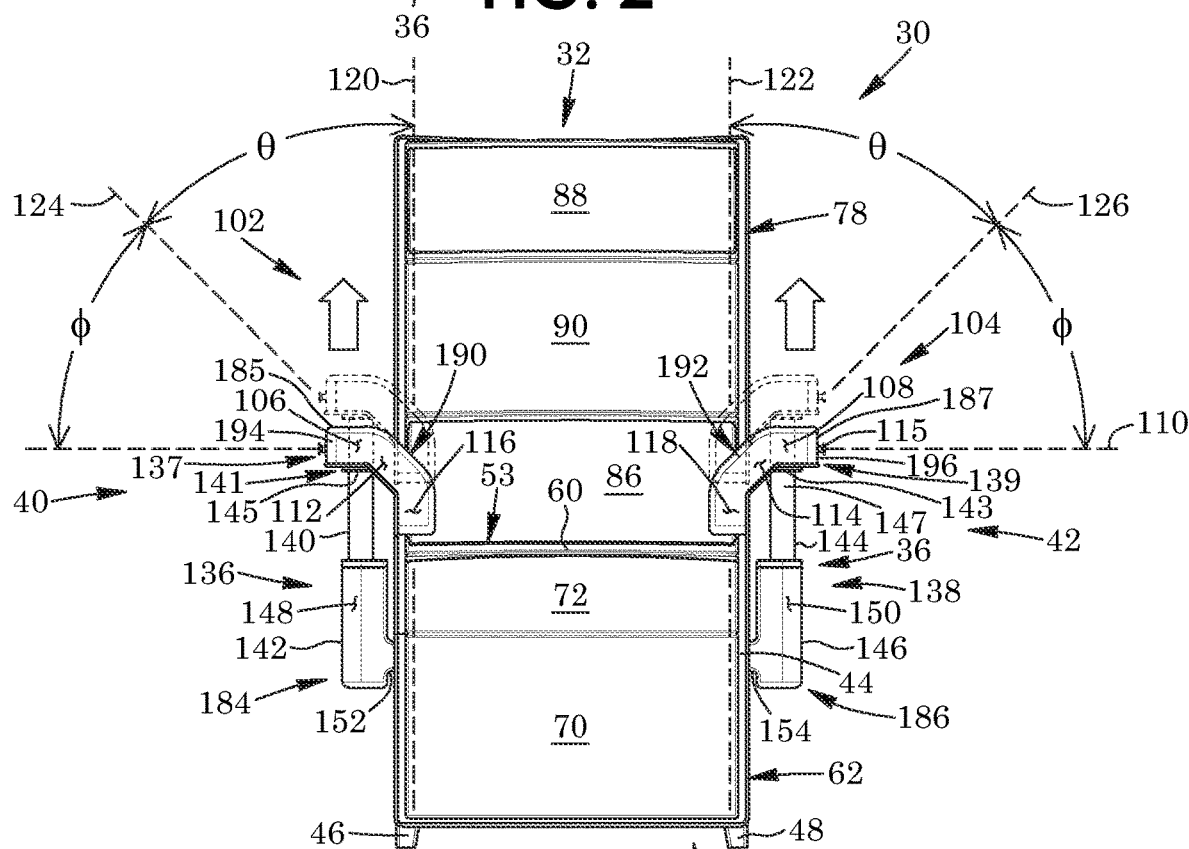
FIG. 3 is a front elevation view thereof, with raised positions of the armrests shown in ghost.

The chair 30 includes a control and processing unit 83. Referring to FIG. 3, the control and processing unit includes a pair of control panels 137 and 139. As seen in FIG. 1, each control panel is located on a peripheral portion 149 of its armrest 102 which aligns with and faces corresponding side 40 of the chair. Referring to FIG. 9, the control panels 139 are positioned to facilitate access thereto by the person 76 feeding the baby 134. The choice of control panel location and controls is thus tailored to the needs of the person feeding the baby.

The control and processing unit functions to receive user-obtained input signals from the control panels and enable powering and de-powering of actuators in response thereto. As seen in FIG. 5, each control panel 139 includes a plurality of user-operated switch mechanisms, in this example leg rest push-buttons 87 and 89 thereon. Actuating or pushing push-button 87 actuates actuator 77 to selectively raise the leg rest 62, as shown by box of numeral 73, to a fully raised position seen in FIG. 8. Pushing push-button 89 causes the actuator to selectively lower the leg rest back to its fully lowered position seen in FIG. 5.

Referring to FIG. 10, the first planar surface 66 of the leg base 64 is angled by an angle $\alpha$ relative to the front legs 48 when the leg rest is in its raised position. Angle $\alpha$ is acute and equal to 40 degrees in this example; however this is not strictly required and the leg rest can raised to a lesser or greater extent in other embodiments. The popliteal cushion 72 is in a retracted position when the leg rest 62 is in its raised position, such that the seat cushion 60 and leg rest cushion 70 are spaced-apart closer compared to when the leg rest is lowered. The leg rest is configured to move within a range of 0 to 90 degrees in this example; however, this is not strictly required and the leg rest may move within a greater or smaller range in other embodiments.

As seen in FIG. 1, the chair 30 includes a backrest 78. The backrest is a rectangular prism in shape in this example; however, this is not strictly required and the backrest may take the form of other shapes in other embodiments. The backrest includes a backrest base 80 having a first planar surface 82 and a second planar surface 84. The backrest base and seat base 54 are integrally connected and form a unitary whole in this example. The backrest base 80 is pivotable relative to the seat base 54 in this example. The chair 30 includes in this example a lower back cushion 86, a headrest cushion 88 and an upper back cushion 90 positioned between the lower back cushion and headrest cushion. The lower backrest cushion, the upper backrest cushion and headrest cushions extend along and couple to the second planar surface 84 of the backrest base 80.

Referring to FIG. 7, the lower back cushion 86 extends from adjacent seat cushion 60 towards the top 32 of the chair 30 and is shaped to support the lower back 92 of the person 76. The headrest cushion 88 extends from the top 32 of the chair 30 towards the bottom 34 of the chair and is shaped to support the head 94 of the person. As seen in FIG. 1, cushions 86, 88 and 90 are generally rectangular in front profile. As seen in FIG. 5, lower back cushion 86 and headrest cushion 90 are arcuate shaped in side profile with outer surfaces 96 and 98 that are outwardly convex in this example.

The backrest 78 has a fully raised position seen in FIGS. 1 to 5, 7, 8 and 10 to 12. As seen with reference to FIG. 5, the backrest extends from the top 32 and rear 38 of the chair 30 towards the bottom 34 and front 36 of the chair when the backrest in its fully raised position in this example.

The backrest 78 is moveable from the fully raised position seen in FIG. 5 to a fully lowered position seen in FIG. 9 via an actuator, in this example a backrest actuator 91 seen in FIG. 5. The backrest actuator is coupled to and positioned within the base support 44 in this example. As seen in FIG. 6, converter 81 electrically couples to backrest actuator 91. The power supply 79 is thus electrically coupled to and provides power to the backrest actuator.

As seen in FIG. 5, each control panel 139 includes a backrest switch mechanism, in this example backrest push-buttons 93 and 95 in this example. Actuating or pushing push-button 95 actuates actuator 91 to selectively lower the backrest 78, as shown by box of numeral 97, to its fully lowered position in FIG. 9. Pushing of push-button 93 causes the actuator to selectively raise the backrest once more to the raised position seen in FIG. 5.

Referring back to FIG. 9, the first planar surface 82 of the backrest base 80 is angled by an angle β relative to the horizontal plane 100 and bottom 56 of the seat base 54 when the backrest is in its fully lowered position. Angle β equals 45 degrees in this example; however, this is not strictly required and the backrest can be lowered to a greater or lesser extent in other embodiments. The backrest is configured to move within a range of 0 to 75 degrees in this example.

The reclining of the backrest 78 and reclining of the leg rest 62 are configured to move independently. This allows the milk provider to select a position that fits him or her best for his or her milk feeding position. This facilitates the ergonomics of specific breastfeeding positions. The backrest 78 and leg rest 62 are thus adjustable relative to the seat 53 to provide one or more ergonomic configurations of the chair. Referring to FIGS. 1 and 6, the backrest 78 and the leg rest 62 are thus motor actuated and adjustable upwards and downwards to promote optimal armrest positioning for the person feeding the baby. The backrest and leg rest may be simultaneously actuated and/or controlled.

Referring to FIG. 1, the chair includes a left arm lower carriage assembly 184 and a right arm lower carriage assembly 186. Each carriage assembly includes a forward/rearward carriage 99 slidably coupled to the base support 44 in this example via a rail system 188 seen in FIG. 4. The forward/rearward carriage functions to enable both the armrests 104 and lower carriage assemblies 186 to move back and forth in a first or forward/rearward direction 182 seen in FIG. 4A extending from the front 36 to the rear 38 of the chair. This motion is shown by box of numeral 101 in FIG. 6.

Still referring to FIG. 6, the chair 30 includes a tilt mechanism 103 coupled to the base support 44 in this embodiment. The tilt mechanism functions to enable the chair to tilt forward or backward, as shown by box of numeral 105, via an actuator, in this example a chair tilt actuator 107. The chair tilt actuator in this example is coupled to and positioned within the base support 44 seen in FIG. 5. Referring back to FIG. 6, converter 81 electrically couples to the chair tilt actuator 107. The power supply 79 is thus electrically coupled to and provides power to the chair tilt actuator.

As seen in FIG. 5, each control panel 139 includes a chair tilt rocker switch 109 in this example. Actuating or pushing rocker switch actuates actuator 107 to tilt the chair 30 forward or rearward, as shown by box of numeral 105. Referring back to FIG. 6, the tilt mechanism 103 is configured to enable the chair 30 to tilt forward or backward in a range spanning from 0 to 30 degrees in this example; however, this is not strictly required and the chair may tilt to a greater or lesser extent in other embodiments.

Referring now to FIG. 1, the chair includes a pair of spaced-apart, elongate armrests, in this example a right armrest 102 from the perspective of a person sitting in the chair and a left armrest 104. The armrests include outer housings 185 and 187 and have exteriors 189 and 191 in communication with the outer housings. The armrests 102 and 104 have first or upper portions 106 and 108 which are co-planar with a horizontal plane 110 in the position shown in FIG. 1. Referring to FIG. 3, control panel 137 is mounted to upper portion 106 of armrest 102 and is positioned to align with and extend along side 40 of the chair 30 in this example. Control panel 139 is mounted to upper portion 108 of armrest 104 and is positioned to align with and extend along side 42 of the chair in this example.

As seen in FIG. 1, the armrests 102 and 104 have second, intermediate or angled portions 112 and 114 coupled to, extending downwards from and positioned below the upper portions thereof. As seen in FIG. 3, the armrests have third, lower or side portions 116 and 118 co-planar with vertical planes 120 and 122. Referring back to FIG. 1, the side portions of the armrests 102 and 104 couple to and extend downwards from the angled portions 112 and 114 of the armrests. The angled portions 112 and 114 of the armrests thus couple to and extend between respective upper portions 106 and 108 and side portions 116 and 118 of the armrests.

As seen in FIG. 3, the angled portions 112 and 114 of the armrests 102 and 104 extend within angled planes 124 and 126 that are each angled at an angle θ relative to the vertical planes 120 and 122, respectively. The angled portions of the armrests extend within angled planes that are angled at an angle φ relative to the horizontal plane. Angles θ and φ are equal to 45 degrees in this example. Referring to FIG. 1, each of the armrests 102 and 104 is generally upwardly convex, with the armrests in this example having have user-facing surfaces 128 and 130 that are each partially octagonal in shape.

Figure 12:
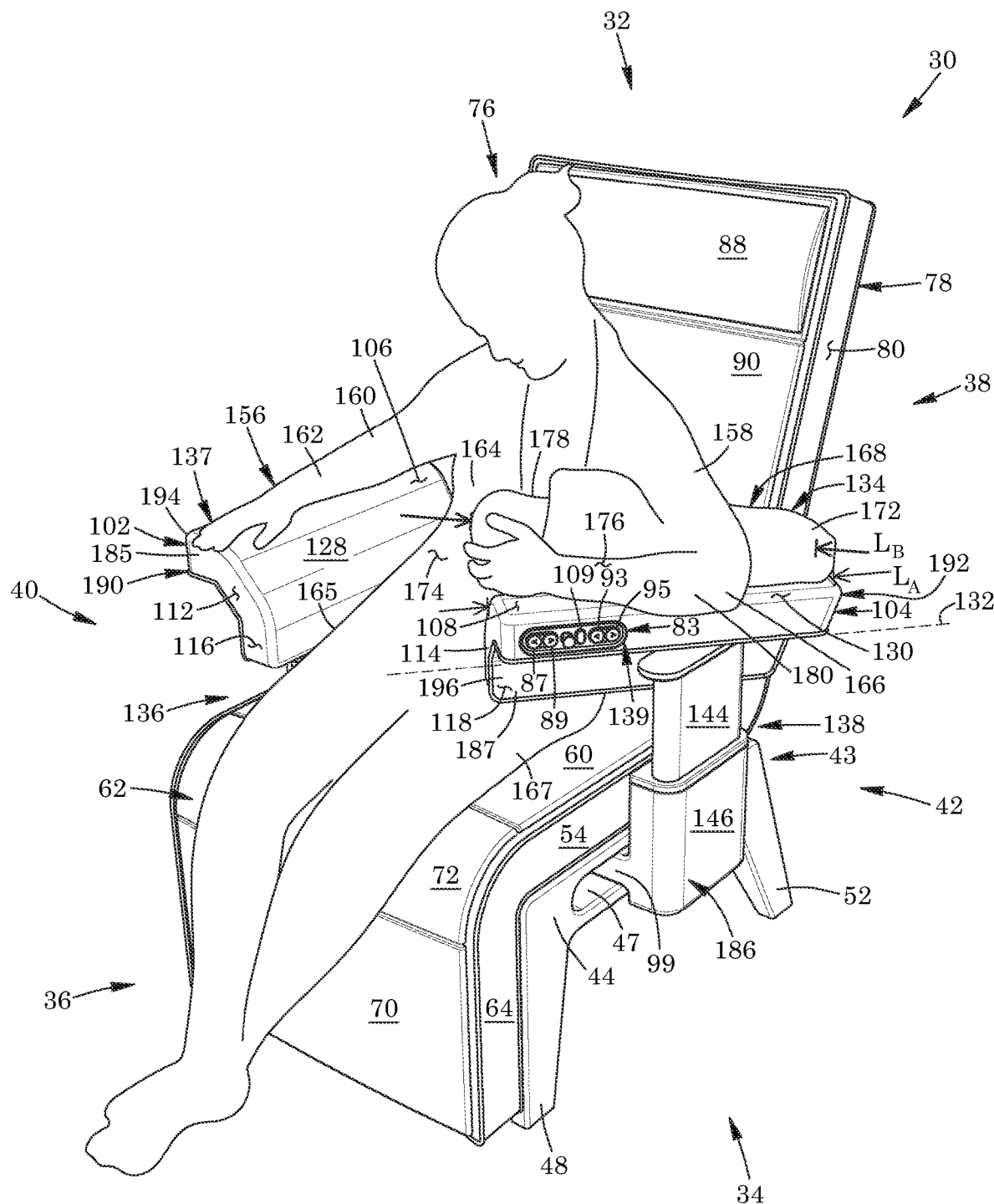
FIG. 12 is a front, right side perspective view of the chair, person and baby of FIG. 7, showing a method of using the chair according to a sixth aspect.

Referring to FIG. 12, each of the armrests 102 and 104 has a longitudinal axis 132 and a length $L_A$ extending along the longitudinal axis thereof. The length of the armrests is equal to at least 18 inches according to one embodiment; however, this is not strictly required and the armrests may have greater or shorter lengths in other embodiments. The length of each of the armrests is shaped to be equal to or greater than the average length $L_B$ of full-term baby 134 at birth in this example.

Referring to FIG. 1, upper portion 106, angled portion 112 and side portion 116 of the right armrest 102 are integrally connected and form a unitary whole. Upper portion 108, angled portion 114 and side portion 118 of the left armrest 104 are integrally connected and form a unitary whole. Each of the portions 106, 108, 112, 114, 116 and 118 of the armrests is a rectangular prism in shape in this example.

As seen in FIG. 3, the chair 30 includes a pair of armrest height-adjustment assemblies 136 and 138 that couple the armrests 102 and 104 to the base support 44. Armrest height-adjustment assembly 136 includes a pair of telescoping members, in this example an upper elongate member 140 and lower elongate member 142. Armrest height-adjustment assembly 138 includes a pair of telescoping members, in this example an upper elongate member 144 and lower elongate member 146. Armrests 102 and 104 are pivotably connected to upper elongate members 140 and 144, respectively. The telescoping members 140, 142, 144 and 146 couple to and extend upwards from the base 43 of the chair 30 in this example. The upper elongate members are obround in lateral cross-section in this example.

As seen with reference to FIGS. 1 and 3, the lower elongate members 142 and 146 are L-shaped in front view in this example. Referring to FIG. 3, the lower elongate members have first or vertically-extending portions 148 and 150 shaped to selectively receive upper elongate members 140 and 144 therewithin. The vertically-extending portions of the lower elongate members are upright and generally rectangular prisms in outer shape in this example.

Still referring to FIG. 3, the lower elongate members 142 and 146 have second or horizontally-extending portions 152 and 154 that are generally horizontally-extending and rectangular prisms in outer shape in this example. Vertically-extending portion 148 and horizontally-extending portion 152 of lower elongate member 142 are integrally connected and form a unitary whole. Vertically-extending 150 and horizontally-extending portion 154 of lower elongate member 146 are integrally connected and form a unitary whole.

As seen in FIG. 1, the horizontally-extending portion 152 of lower elongate member 142 is positioned in part to extend within first elongate aperture 45 of base support 44 and to couple to the base support. As seen in FIG. 7, the horizontally-extending portion 152 of the lower elongate member 146 is positioned in part to extend within second elongate aperture 47 of the base support and to couple to the base support. Referring to FIG. 1, the armrests 102 and 104 are thus operatively connected to seat 53. As seen in FIG. 4, each of the lower elongate members 146 has a horizontally-extending length $L_E$ extending between the front 36 and rear 38 of the chair 30. The length $L_E$ of the lower elongate members is less than the length $L_P$ of respective pathways 49.

Referring to FIG. 3, the armrests 102 and 104 are moveable from the fully lowered positions shown in solid lines to the fully raised positions shown in ghost lines via respective actuators, in this example armrest height-adjustment actuators 111 and 113 seen in FIG. 5. The actuators of the chair are linear actuators in this example; however, this is not strictly required and other actuators may be used in other embodiments. The height-adjustment actuators 111 and 113 are enclosed within the lower elongate members 142 and 146 seen in FIG. 1 in this example. Referring back to FIG. 5, the armrest height-adjustment actuators are coupled to and positioned within the base support 44 in this example. As seen in FIG. 6, converter 81 is electrically coupled to the armrest height-adjustment actuators 111 and 113. The power supply 79 is thus electrically coupled to and provides power to the armrest height-adjustment actuators.

As seen in FIG. 5, each control panel 139 includes an armrest position input device, in this example a joystick 115. Actuating or pushing each joystick in a first or upwards direction Du in this example actuates a user-selected one or both of actuators 111 and 113 to selectively raise its corresponding armrest 102 or 104 as seen in ghost in FIG. 3. In particular, upper elongate member 144 extends outwards relative lower elongate member 146. In one example, the armrests may be raised by 20-30 cm; however, this is not strictly required and the armrests may be raised or lowered within a greater or lesser range in other embodiments. Referring to FIG. 5, actuating or pushing of each joysticks 115 in a second or downwards direction DD causes a user-selective one or both of the armrests to lower down to their lowered positions once more. This movement is illustrated in FIG. 6 by box of numeral 71. In particular, upper elongate member 144 retracts into lower elongate member 146. Referring to FIG. 3, the armrests 102 and 104 are thus moveable vertically relative to the seat 53.

Referring to FIG. 3, the armrests include inner mounts 141 and 143 rotatably coupled to distal ends 145 and 147 of the upper elongate members 140 and 144 in this example. The outer housings 185 and 187 of the armrests 102 and 104 at least partially enclose and extend about the inner mounts in this example. The armrests are rotatable from the non-rotated positions shown in solid lines in FIG. 2 to the inwardly-rotated positions shown in ghost lines via respective actuators, in this example armrest rotation actuators 117 and 119 seen in FIG. 5. The armrest rotation actuators are coupled to and positioned within the base support 44 in this example. As seen in FIG. 6, converter 81 is electrically coupled to armrest rotation actuators 117 and 119. The power supply 79 is thus electrically coupled to and provides power to the armrest rotation actuators.

Figure 2:
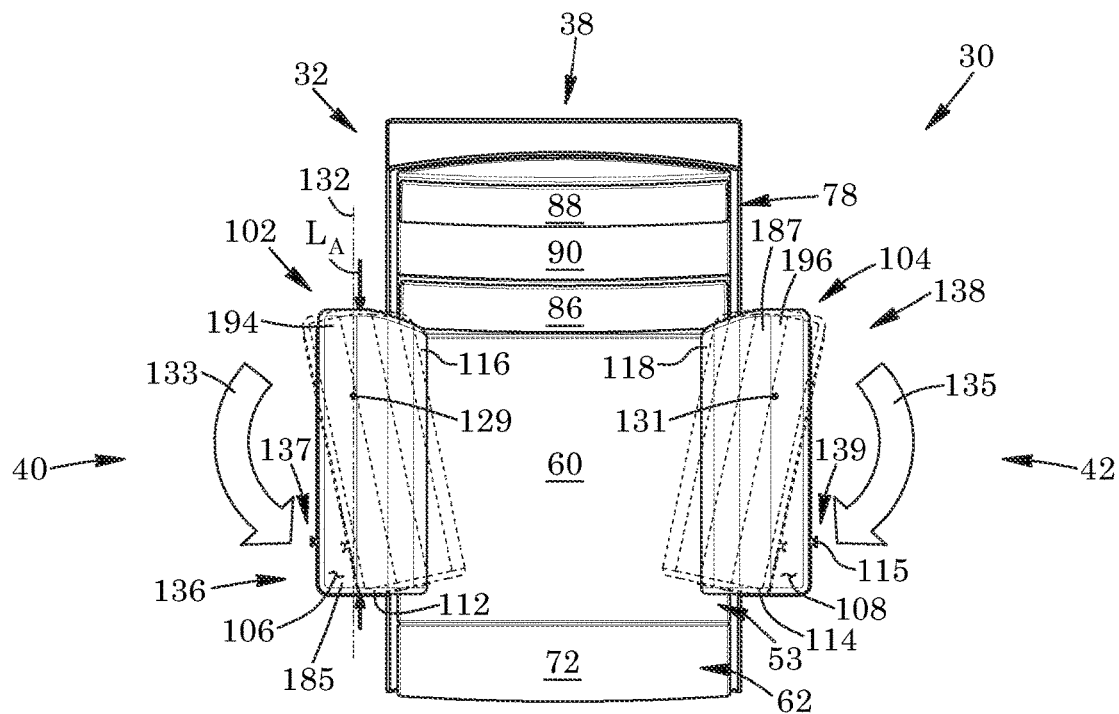
FIG. 2 is a top plan view thereof, with inwardly-rotated positions of the armrests shown in ghost.

Referring to FIG. 5, actuating or rotation of each joystick 115 in a first rotation direction $D_1$ in this example actuates a user-selected one or both of the actuators 117 and 119 to selectively rotate their corresponding armrest 102 or 104 inwards as seen in ghost in FIG. 2. Still referring to FIG. 2, the armrests 102 and 104 are thus selectively rotatable about respective vertical axes 129 and 131. Armrest 102 rotates counter-clockwise, as seen by arrow of numeral 133, when viewed from above from the non-rotated position thereof shown in solid lines to the inwardly-rotated position thereof shown in ghost. Armrest 104 rotates clockwise, as seen by arrow of numeral 135, when viewed from above from the non-rotated position thereof shown in solid lines to the inwardly-rotated position thereof shown in ghost. Actuating or rotation of each joystick in a second rotation direction $D_2$ opposite the first rotation direction $D_1$ causes a user-selected one or both of the armrests to move towards their non-rotated positions once more. This movement is illustrated in FIG. 6 by box of numeral 121.

Figure 4B:
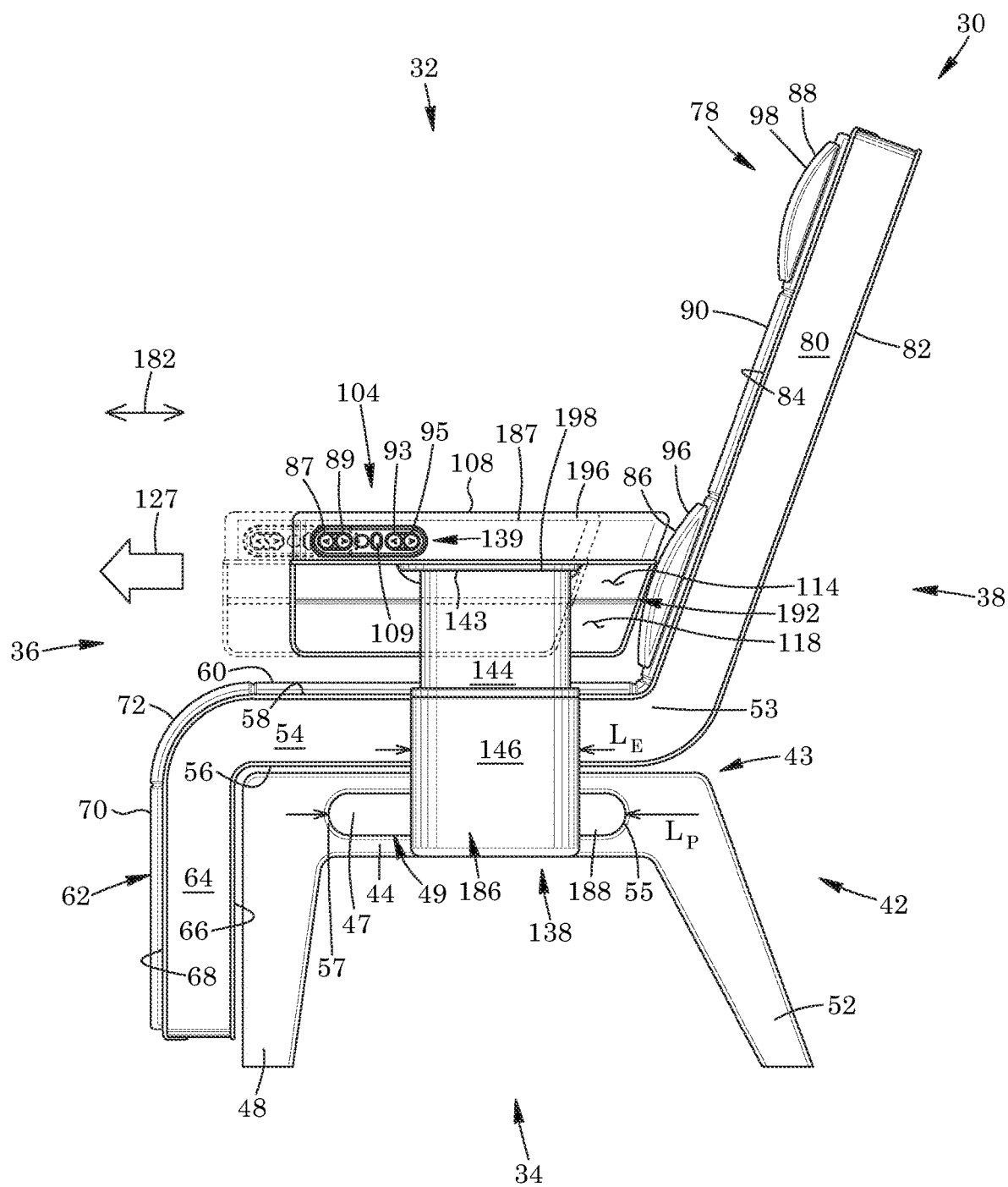
FIG. 4B is a right side elevation view thereof, with forward positions of the armrests relative to the lower carriage assemblies shown in ghost.

Referring to FIG. 1, the chair 30 includes a left arm upper carriage assembly 190 and a right arm upper carriage assembly 192. The carriage assemblies include forward/rearward carriages 194 and 196 of which outer housings 185 and 187 of the armrests 102 and 104 are parts thereof. Referring to FIG. 3, the forward/rearward carriages are moveable forward/rearward relative to inner mounts 141 and 143 and armrest height-adjustment assemblies 136 and 138 via extension mechanisms, in this example rail systems, as seen in FIG. 4B by rail system 198 for carriage 196. The armrests 104 are selectively moveable relative to corresponding lower carriage assemblies 186 along pathways 49 from rearward positions shown in solid lines to the forward positions shown in ghost lines via in this example respective actuators, in this case armrest forward-motion actuators 123 and 125 seen in FIG. 6. The armrest forward-motion actuators are coupled to and positioned within the base support 44 in this example seen in FIG. 5. As seen in FIG. 6, converter 81 is electrically coupled to armrest forward-motion actuators 123 and 125. The power supply 79 is thus electrically coupled to and provides power to the armrest forward-motion actuators.

Referring to FIG. 5, actuating or pushing each joystick 115 in a third or forward direction $D_F$ in this example actuates a user-selected one or both actuators 123 and 125 to selectively move their corresponding respective armrests 102 and 104 towards a forward position as seen in ghost in FIG. 4. Still referring to FIG. 4, the armrests are adjacent to and may abut the forward ends 57 of the pathways 49 when in their forward positions. Actuating or pushing each joystick in a fourth or rearward direction $D_R$ causes a user-selective one or both of the armrests 102 and 104 to move towards their rearward positions once more. This movement is illustrated in FIG. 6 by box of numeral 127. As seen in FIG. 4, the armrests 102 and 104 are thus moveable horizontally relative to the seat 53 along pathway 49. The armrests are therefore moveable from rearward positions, shown in solid lines and adjacent to the rear legs 52 of the chair 30, to forward positions, shown in ghost and adjacent to the front legs 48 of the chair. The armrests also have middle positions, as shown by armrest 104 seen in FIG. 10, located between said forward and rearward position. The armrests are thus fully moveable horizontally between the front and rear legs of the chair.

Referring to FIG. 7, each of the control panels 137 and 139 on the armrest 102 and 104 can be used to operate the right armrest, the left armrest or both armrests. This allows person 76 cradling baby 134 in her right arm 156 to sit down and use the control panel 139 on the left armrest 104 to adjust the right armrest 102 to a desired position without ever having the baby leave her right arm.

Each of the control panels 137 and 139 is configured to control all motorized aspects of the chair 30, with the leg rest 62 and backrest 78 also having dual control via said control panels. Referring to FIGS. 1 and 6, the degrees of freedom of the armrests 102 and 104 are thus motor actuated in this example and electronically controlled.

Each of the control panels further includes a home button in this example. Actuation of the home button will function to automatically return the armrests 102 and 104 to their lowered, non-rotated, rearward positions seen in FIG. 1. The armrests thus move automatically via electric actuators in this example and have pre-set recallable positions. The control panels are located in a highly accessible position while feeding a baby, and provide simultaneous control of the armrest motorized height, rotation and extension along with the footrest and backrest to aid in feeding the baby.

FIG. 7 shows a method of using the chair according to a first aspect. The leg rest 62 is shown in its fully lowered position and the backrest 78 is shown in its fully raised position. The armrest 102 is shown in a non-rotated, raised, rearward position and armrest 104 is shown in a lowered, non-rotated, retracted, rearward position. The person 76 is holding baby 134 between her right arm 156 and left arm 158. The right elbow 160 of the person rests on the upper portion 106 of the right armrest 102 of the chair 30. The right forearm 162 of the person 76 rests on the upper portion and angled portion 112 of the right armrest of the chair 30. The left elbow 166 of the person 76 abuts the angled portion 114 of the left armrest 104. The baby 134 is feeding from the right breast 164 of the person 76. The baby is extending between the armrests 102 and 104. The side portions 116 and 118 of the armrests are shaped and positioned to abut, extend along and support the left side 165 and right side 167 of the person 76.

FIG. 8 shows a method of using the chair 30 according to a second aspect. The leg rest 62 is shown in its fully raised position and the backrest 78 is shown in its fully raised position. The armrest 102 is shown in a non-rotated, raised, rearward position and armrest 104 is shown in a lowered, non-rotated, retracted, rearward position. The person 76 is resting her right elbow 160 and left elbow 166 on the upper portions 106 and 108 of the armrests. The armrests 102 and 104 are thus moveable to a first elbow-supporting position shown in FIG. 8 in which the armrests extend parallel with each other and the elbows of the person abut the armrests while breastfeeding. The person 76 is holding the baby 134 in her right arm 156. The baby is feeding from the right breast 164 of the person. The baby 134 has a lower portion 168 comprising buttocks 170 and legs 172 thereof. The buttocks of the baby rest upon on the angled portion 112 and the legs of the baby abut the side portion 116 of the right armrest 102 in this example. The side portions 116 and 118 of the armrests 102 and 104 are shaped and positioned to abut, extend along and support the sides 165 and 167 of the person 76.

FIG. 9 shows a method of using the chair 30 according to a third aspect. The leg rest 62 is shown in its fully raised position and the backrest 78 is shown in its fully lowered position. The armrests 102 and 104 are shown in lowered, non-rotated, retracted, rearward positions. The arms 156 and 158 of the person 76 are inwardly spaced from the armrests and extend about the baby 134. The side portion 116 of armrest 102 is positioned to be spaced-apart from the right side 165 of the person. The side portion 118 of the armrest 104 is positioned to extend along, abut and support the left side 167 of the person 76. The angled portion 114 of armrest 104 is positioned to extend along, abut and support the abdomen 174 of the person in this example. The armrest may thus function a supportive tool. However, this abutting of the armrest along the abdomen is not strictly required and may depend on the size of the person. The baby 134 is feeding from the right breast 164 of the person 76. The baby is fully resting on, extending along and overtop of the person.

FIG. 10 shows a method of using the chair 30 according to a fourth aspect. The leg rest 62 is shown in its fully raised position and the backrest 78 is shown in its fully raised position. The right armrest 102 is shown in a raised, inwardly-rotated, rearward position and the left armrest 104 is shown in a lowered, non-rotated, middle spaced forwards from the rearward position. The person 76 is resting her right elbow 160 on the angled portion 112 of the right armrest 102. The side portion 116 of the right armrest is positioned to extend along and abut the abdomen 174 of the person in this example; however this is not strictly required. The person 76 is resting her left elbow 166 on the upper portion 108 of the left armrest 104. Right armrest 102 is thus shaped and moveable to a second elbow-supporting position shown in FIG. 10 in which the armrest is angled relative to armrest 104 and the elbows 160 and 166 of the person 76 rest on the armrests while breastfeeding. The person 76 is holding the baby 134 between her arms 156 and 158. The baby is feeding from the right breast 164 of the person. The feet 171 of the baby 134 are resting upon on the angled portion 114 of the left armrest 104.

FIG. 11 shows a method of using the chair 30 according to a fifth aspect. The leg rest 62 is in its fully lowered position and the backrest 78 is shown in its fully raised position. The right armrest 102 is shown in a lowered, non-rotated, rearward position and left armrest 104 is shown in a raised, inwardly-rotated, middle position spaced forwards from the rearward position. The person 76 is resting her left elbow 166 and forearm 176 on the upper portion 108 of the left armrest 104. The upper portion of the armrest accordingly extends along and supports the left forearm of the person. The upper portion 108 of the armrest 104 is thus shaped to receive the left arm 158 of the person 76 and enable the left arm of the person to rest and extend thereon when breastfeeding.

The person is resting her right elbow 160 on the angled portion 112 of the right armrest 102. The person 76 is holding the baby 134 between her arms 156 and 158. The baby is feeding from the left breast 178 of the person. The baby 134 is resting upon and extending along the angled portion 114 of the left armrest 104. The angled portion of the left armrest is accordingly shaped to receive the baby and enable the baby to rest and extend thereon when breastfeeding. Armrest 104 is thus shaped and moveable to the baby-supporting position shown in FIG. 11 in which the armrest is angled relative to the armrest 102 so as to receive and enable the baby 134 and forearm 176 of the person 76 to fully extend and rest thereon. Each of the angled portions 112 and 114 of the armrests 102 and 104 is thus shaped to support and extend along the length $L_B$ of the baby. The side portion 116 of the right armrest 102 is shaped and positioned to abut, extend along and support side 165 of the person 76. The side portion 118 of armrest 104 is shaped and positioned to abut, extend along and support abdomen 174 of the person in this example; however this is not strictly required.

FIG. 12 shows a method of using the chair 30 according to a sixth aspect. The leg rest 62 is in its fully lowered position and backrest 78 is in its fully raised position. The right armrest 102 is shown in a lowered, non-rotated, rearward position and left armrest 104 is shown in a raised, inwardly-rotated, rearward position. The person 76 is holding the baby 134 in her left arm 158. Only part 180 of the left forearm 176 of the person is resting on the upper portion 108 of the left armrest 104. The upper portion of the armrest is thus shaped to receive and support the arm of the person.

The baby 134 is feeding from the left breast 178 of the person 76. The baby is resting upon and supported by the upper portion 108 of the left armrest 104 and the baby is extending along the length $L_A$ of the armrest. The upper portion of the armrest is thus shaped to extend along and receive the baby thereon. The user-facing surfaces 130 of the armrests 104 are thus shaped to receive and enable the baby 134 to rest and extend thereon when breastfeeding. The side portion 116 of the right armrest 102 is shaped and positioned to abut, extend along and support side 165 of the person 76. The side portion 118 of armrest 104 is shaped and positioned to abut, extend along and support abdomen 174 of the person; however this is not strictly required.

The chair 30 as herein described thus comprises armrests 102 and 104 that adjustable electronically. The control panels 137 and 139 seen in FIGS. 1 and 8 thus enable person 76 to control of height of the respective armrests 102 and 104, rotation of the respective armrests, and extension of the respective armrests as well as positioning of the backrest 78 and the leg rest 62 relative to the seat 53.

The purpose of the chair is to support a milk provider feeding a child so that the milk provider can remain in an ergonomically correct position, including correct positioning of the arms, back, neck, core, legs and thereof, during the task. The chair enables many adjustment configurations to this end, including allowing the armrests to support the mother's arms while she supports the baby with her arms; and including allowing the armrests to support the weight of the baby and the milk provider's arms as a secondary support.

In some instances, the armrests have been described as being configured to abut portions of the abdomen 174 of the person 76. This is not strictly required and the chair may be configured to be wide enough to accommodate both larger and smaller women. For example, if a smaller woman uses the chair 30, her hips may not be larger enough to have the armrest abut her abdomen 174.

FIGS. 13 to 44 show a chair 30.1 for supporting a person who is feeding a baby, according to another embodiment. Like parts have like numbers and function as the embodiment shown in FIGS. 1 to 12 with the addition of "0.1". Chair 30.1 is substantially the same as chair 30 shown in FIGS. 1 to 12 with the following exceptions.

Figure 13:
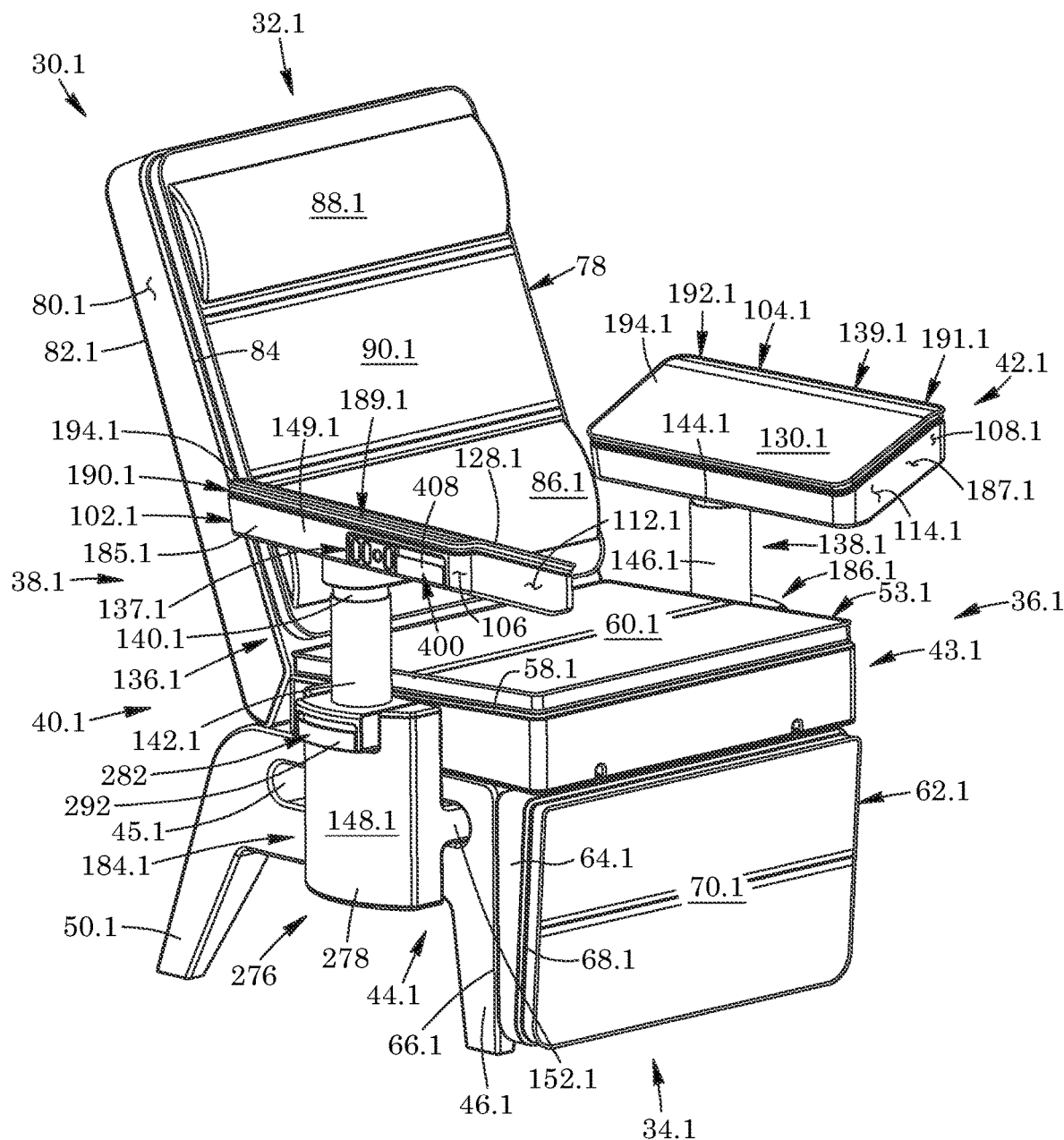
FIG. 13 is a front, right side perspective view of a chair for supporting a person who is feeding a baby, the chair being according to another aspect and including a leg rest shown in a fully lowered position, a backrest shown in a fully raised position, and armrests shown in non-rotated, retracted, rearward positions.

Referring first to FIG. 13, the chair includes a left arm lower carriage assembly 184.1 and right arm lower carriage assembly 186.1. Each lower carriage assembly is substantially the same and thus only right arm lower carriage assembly 186.1 will be described in detail. This is a different embodiment than the chair describes in FIGS. 1 to 12 and may differ at least in part from the final production embodiment.

Figure 15:
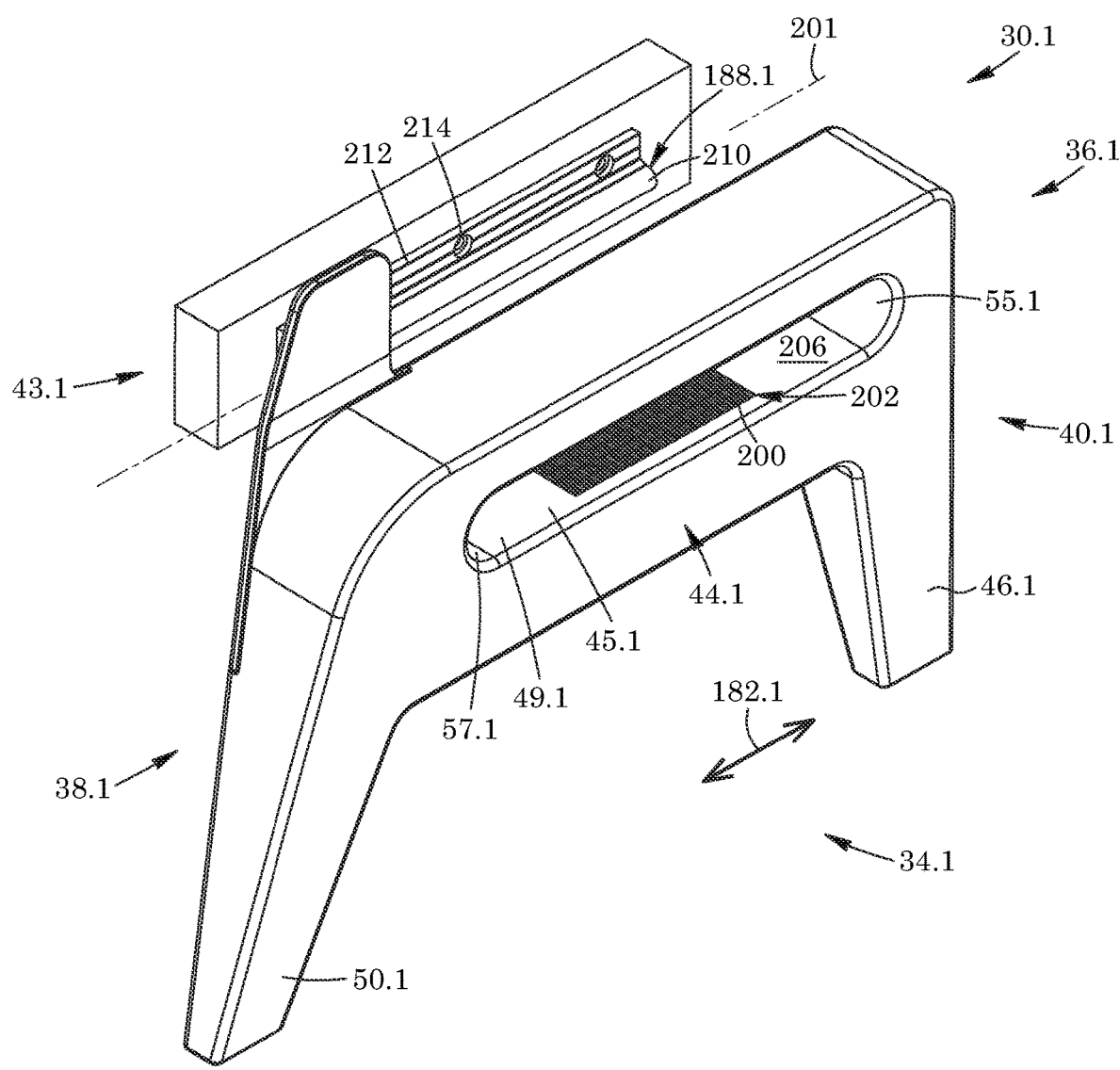
FIG. 15 is a right side, rear, top perspective view of part of the base of the chair of FIG. 14, together the right legs of the chair, with the rest of the chair not being shown.
Figure 20:
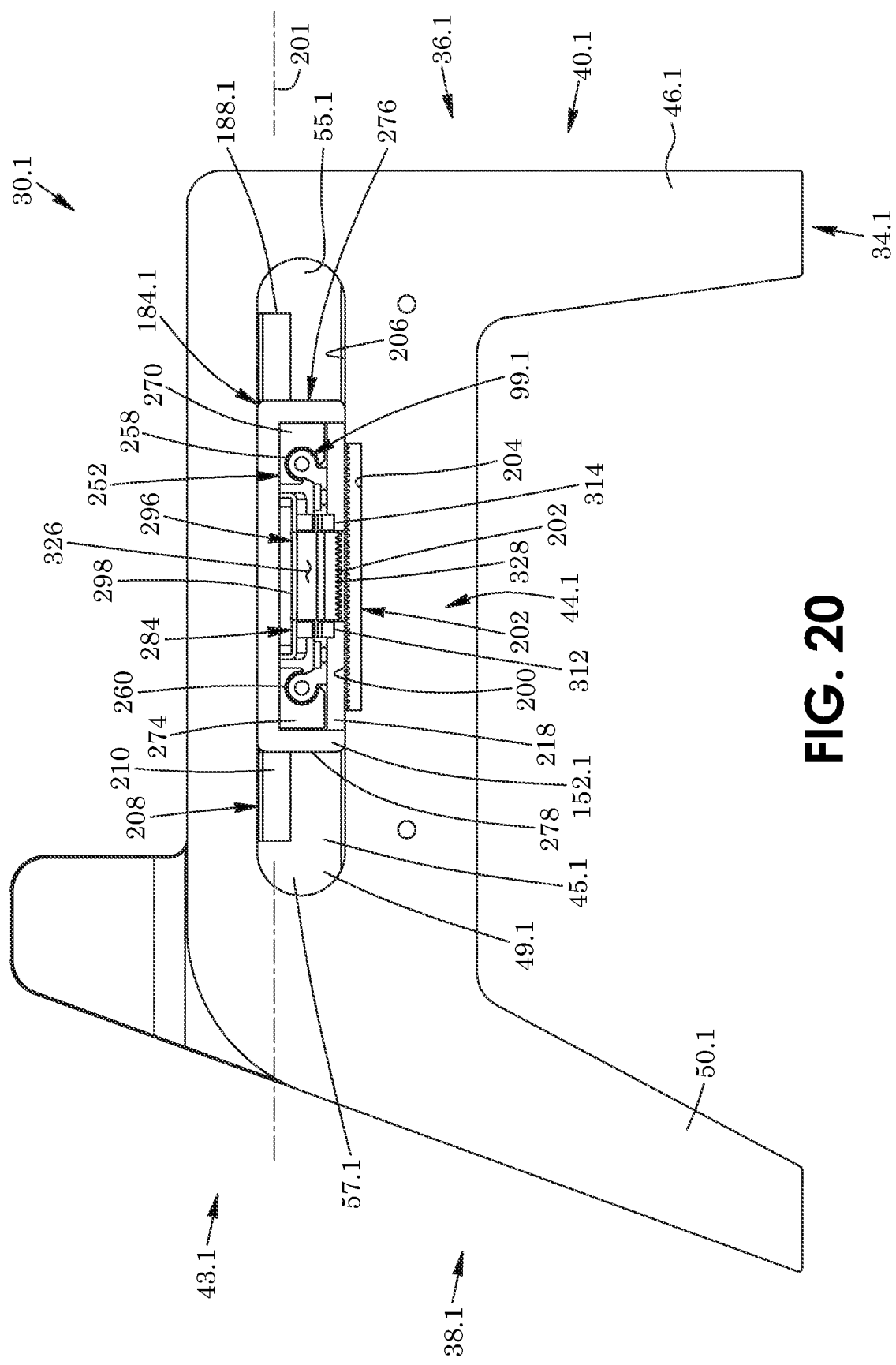
FIG. 20 is a lateral sectional view of the right side legs of FIG. 14 and right arm lower carriage assembly of FIG. 19, with an upper portion of inward/outward carriage not being shown, and the lever shown in the unlocked position with a longitudinal gear rack thereof shown spaced-apart from a gear rack coupled to the legs.

The chair 30.1 includes pluralities of teeth coupled to its left side and right side legs, as seen in FIG. 15 by plurality of teeth 200 coupled to legs 46.1 and 50.1. In this example the teeth are positioned with elongate aperture 45.1 between ends 55.1 and 57.1 of the pathway 49.1. The teeth 200 couple to and extend along base support 44.1 of the chair 30.1. The teeth thus couple to the base 43.1 of the chair 30.1. The plurality of teeth 200 align parallel to a first longitudinal axis 201 which extends from the front 36.1 to the rear 38.1 of the chair 30.1. The plurality of teeth comprise parts of a first gear rack 202 in this case. As seen in FIG. 20, the gear rack is positioned within a recess 204 of the base support 44.1 such that the teeth 200 thereof align with the top 206 of the base support in this example.

Figure 16:
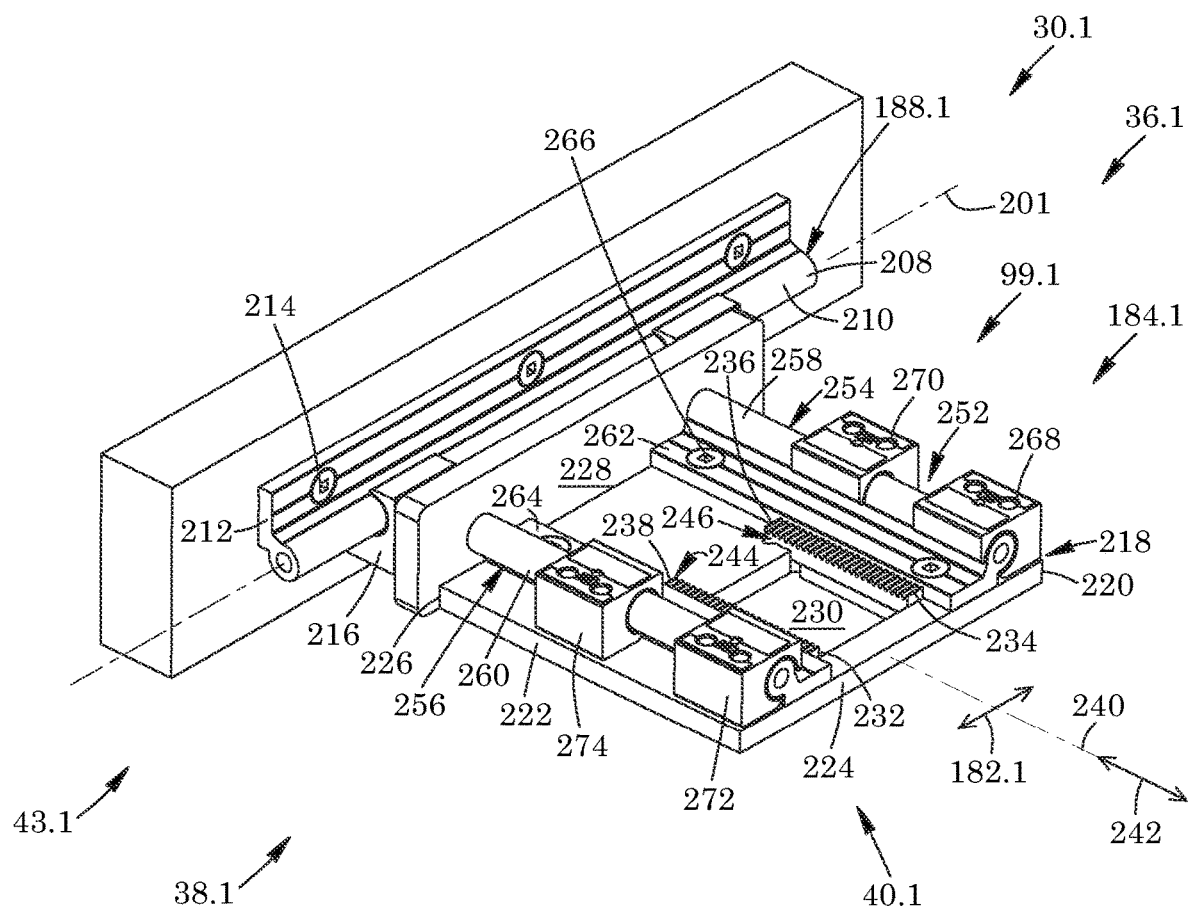
FIG. 16 is a right side, rear, top perspective view of the part of the base of the chair of FIG. 15 together with a right forward/rearward carriage of the right arm lower carriage assembly of FIG. 14 shown slidably coupled to the base, with the rest of the chair not being shown.
Figure 19:
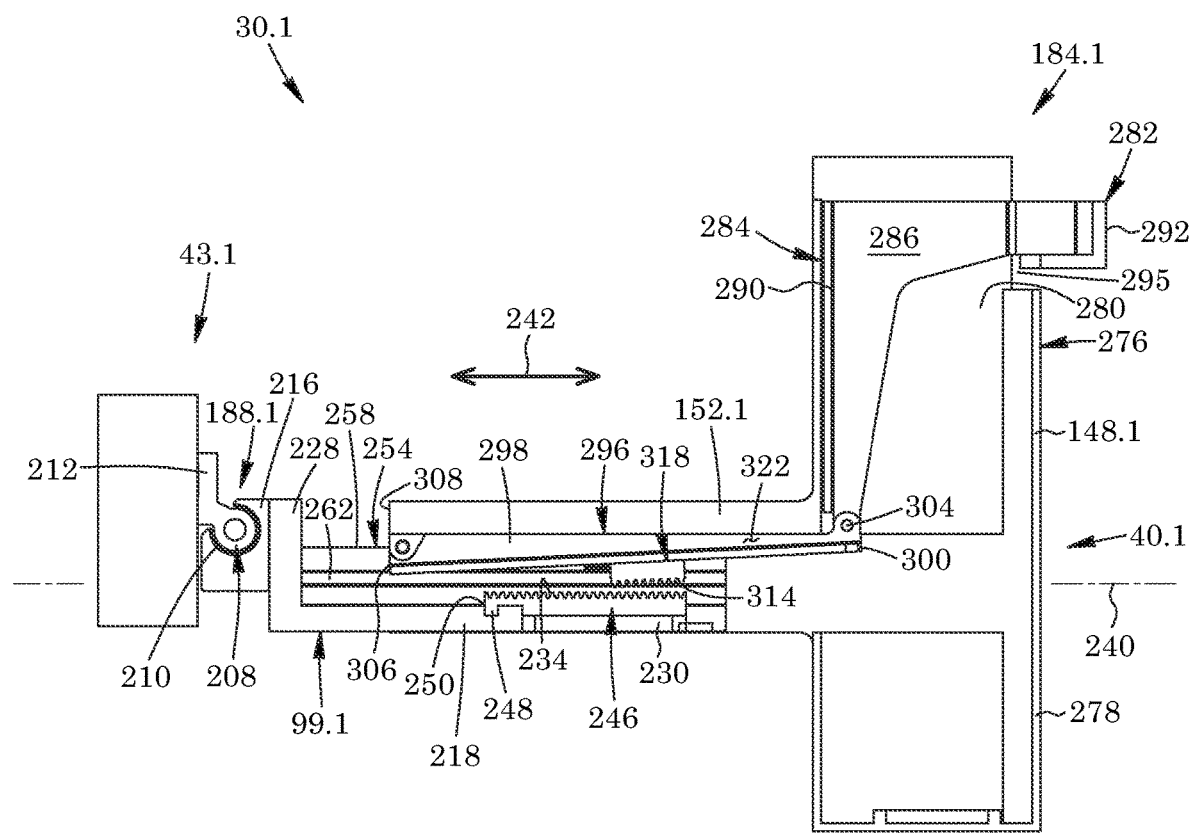
FIG. 19 is a sectional view taken along lines 19-19 of the right arm lower carriage assembly of FIG. 18, the lever being shown in an unlocked position with lateral gear racks thereof shown spaced-apart from gear racks of the forward/rearward carriage.

The chair 30.1 includes a first rail system for each lower carriage assembly, as seen in FIG. 16 by rail system 188.1 for lower carriage assembly 184.1. The rail system includes a male member, in this example an elongate rail 208 with a tubular portion 210 that is circular in lateral cross-section in this example and with a flange portion 212. The tubular portion of the rail is co-axial with and extends along longitudinal axis 201. The flange portion 212 of the rail 208 is rectangular in shape in this example. The flange portion of the rail couples to the base 43.1 of the chair 30.1 via fasteners, in this example screws 214. As seen in FIG. 19, the rail system 188.1 further includes a female member, in this example a rail channel 216 shaped to slidably receive the tubular portion 210 of the rail 208 therethrough.

Referring back to FIG. 16, each arm lower carriage assembly 184.1 includes a first carriage, in this example a forward/rearward carriage 99.1. The carriage includes a base that is planar and in this example in the form of a base plate 218. The base plate is rectangular in this case, with a forward end 220 facing the front 36.1 of the chair 30.1, a rearward end 222 facing the rear 38.1 of the chair, an outer side 224 facing corresponding adjacent side 40.1 of the chair, and an inner side 226 spaced-apart inwardly from the outer side thereof. The sides of the base plate 218 extend between the rearward end and the forward end of the base plate. The forward/rearward carriage 99.1 couples to rail channel 216 in this example via a side member, in this example side plate 228. The side plate is rectangular and couples to and extends upwards from the inner side 226 of the base plate 218. The forward/rearward carriage 99.1 thus couples to and is laterally moveable relative to the base 43.1 via the first rail system 99.1. The forward/rearward carriages and first rails systems enable the armrests 102.1 and 104.1 seen in FIG. 23 to selectively move from and between rearward positions seen in solid lines and forward positions shown in ghost lines.

Referring back to FIG. 16, the forward/rearward carriage 99.1 has an aperture 230 extending through base plate 218 and which is rectangular in this example. The aperture extends from adjacent outer side 224 of the base plate towards inner side 226 of the base plate, and extends between the forward end 220 and rearward end 222 of the base plate 218 in this example.

The forward/rearward carriage 99.1 includes at least one and in this example a first plurality of teeth 232 and second plurality of teeth 234 aligned in respective rows 236 and 238 in this example. The teeth align parallel to a lateral axis 240 of the forward/rearward carriage and chair 30.1 and a second or lateral direction 242 which extends from the left side to the right side of the chair. The first plurality of teeth 232 and the second plurality of teeth 234 are parts of a respective pair of spaced-apart gear racks 244 and 246 in this example. Each gear rack is shaped in part to fit within the aperture 230 and press fit to the base plate 218 thereby in this example. As seen in FIG. 19, each gear rack 246 further includes a notched end portion 248 that further couples to an additional matching recess 250 of the base plate that is spaced-apart from the aperture in this example. As seen in FIG. 16, the gear racks 244 and 246 extend from adjacent to outer side 224 of the base plate 218 towards inner side 226 of the base plate, and extend between the forward end 220 and rearward end 222 of the base plate 218 in this example.

Still referring to FIG. 16, the chair 30.1 includes a second rail system 252 for each lower carriage assembly 184.1. The rail system in this example includes a pair of spaced-apart male members, in this example an elongate rails 254 and 256 with tubular portions 258 and 260 that are circular in lateral cross-section in this example and flange portions 262 and 264. The rails extend from outer side 224 to inner side 226 of the base plate 218 and are positioned adjacent to forward end 220 and rearward end 222 of the base plate respectively in this example. The tubular portions 258 and 260 of rails 254 and 256 extend parallel to lateral axis 240. The flange portions 262 and 264 of the rails are rectangular in shape in this example. The flange portions of the rails 254 and 256 couple to the base plate 218 via fasteners, in this example screws 266. Still referring to FIG. 16, the rail system 252 further includes at least one female member and in this example two spaced-apart, aligned pairs of female members, in this example a first aligned pair of rail channels 268 and 270 and a second aligned pair of rail channels 272 and 274. Rail channels 268 and 270 are shaped to slidably receive the tubular portion 258 of the rail 254 therethrough and rail channels 272 and 274 are shaped to slidably receive the tubular portion 260 of the rail 256 therethrough.

Figure 18:
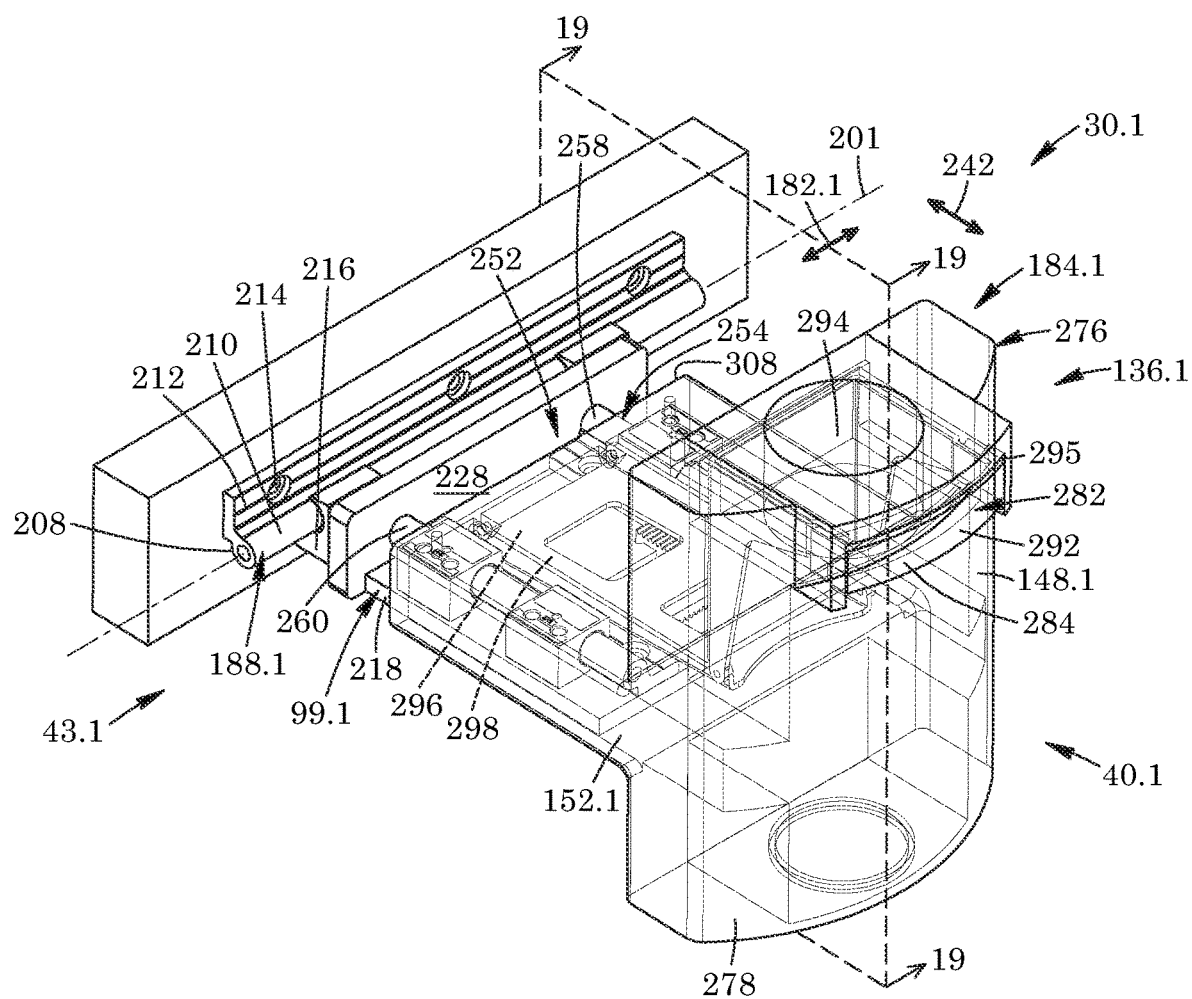
FIG. 18 is a right side, rear, top perspective view part of the base of the chair of FIG. 14, together with the right arm lower carriage assembly of FIG. 14, with the forward/rearward carriage thereof shown slidably coupled to the base, with the assembly including an inward/outward carriage shown in with transparent lines, the inward/outward carriage coupling to the forward/rearward carriage, with the lever of FIG. 17 shown partially within the inward/outward carriage, and with the rest of the chair not being shown.

As seen in FIG. 18, each arm lower carriage assembly 184.1 includes a second carriage, in this example an inward/outward carriage 276. The carriage comprises a hollow housing 278 with a vertically-extending portion 148.1 and horizontally-extending portion 152.1 coupled thereto. The rail channels 268, 270, 272 and 274 of the second rail system 252 seen in FIG. 16 are enclosed by and couple to the horizontally-extending portion of the inward/outward carriage 276. Each inward/outward carriage 276 seen in FIG. 18 is thus coupled to and moveable inward/outward relative to its corresponding forward/rearward carriage 99.1 via the second rail system 252 along direction 242. The inward/outward carriages 276 and corresponding second rail systems therefore enable the armrests 102.1 and 104.1 seen in FIG. 24 to selectively move from and between laterally-inward/retracted position seen in solid lines and laterally-outward/extended positions shown in ghost lines.

Figure 42:
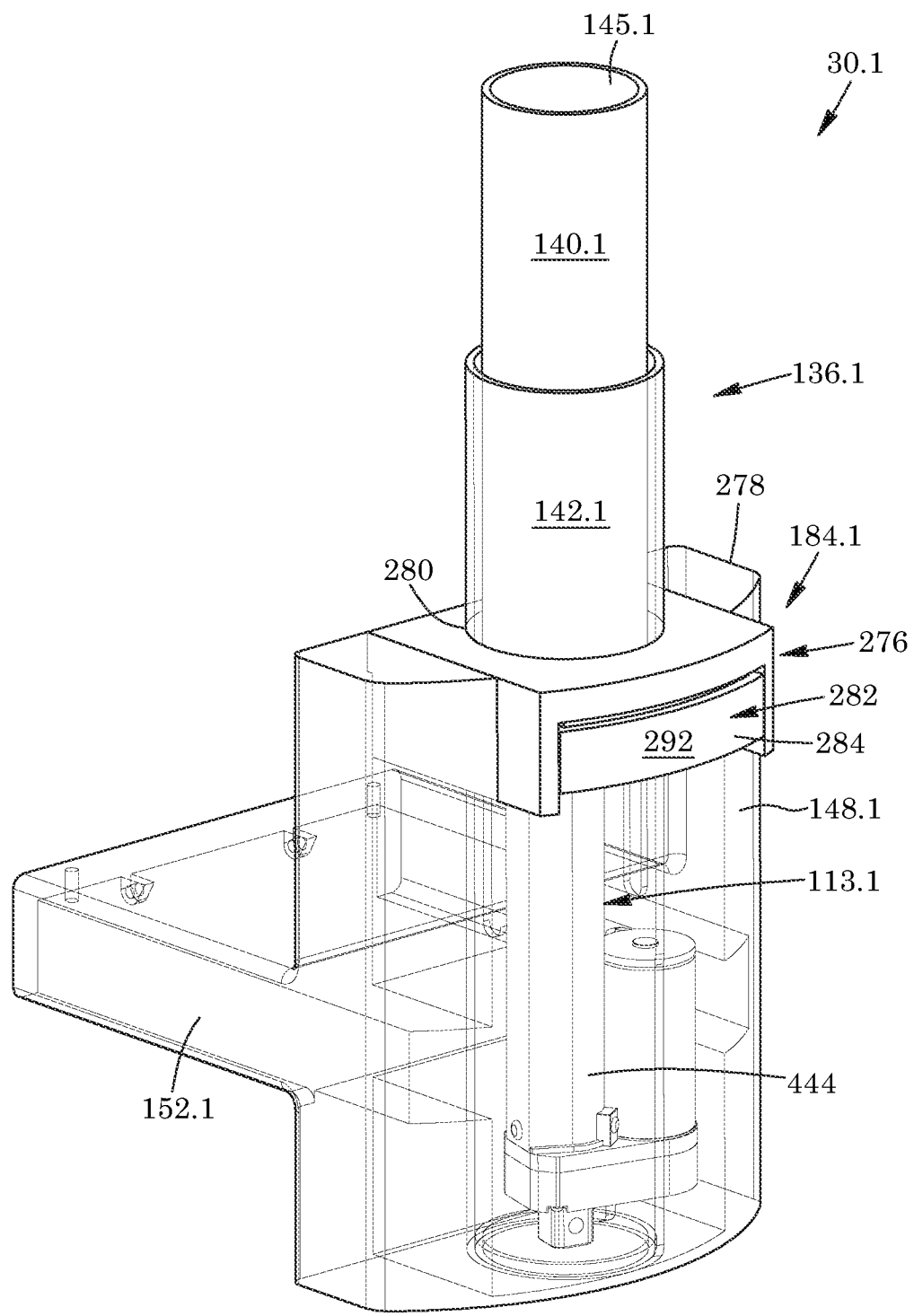
FIG. 42 is a right side, rear, top perspective view of the right arm lower carriage assembly of the chair of FIG. 13, with the forward/rearward carriage thereof not being shown, with the outer housing thereof shown in transparent lines to reveal the right side armrest height-adjustment assembly of FIG. 14, the armrest height-adjustment assembly including an armrest height-adjustment actuator, and with the rest of the chair not shown.

As seen in FIG. 42, each vertically-extending portion 152.1 of the inward/outward carriage 276 includes a bore 280 shaped to receive in part a corresponding lower elongate member 142.1 of a corresponding height-adjustment assembly 136.1. Armrest height-adjustment actuator 113.1 is positioned within and enclosed by the vertically-extending portion of the housing 278 of the inward/outward carriage 276. The height-adjustment assembly 136.1 is thus positioned at least partially within the inward/outward carriage in this example. As seen in FIG. 13, each armrest 102.1 is coupled to its corresponding inward/outward carriage 276 via its corresponding height-adjustment assembly 136.1.

Figure 14:
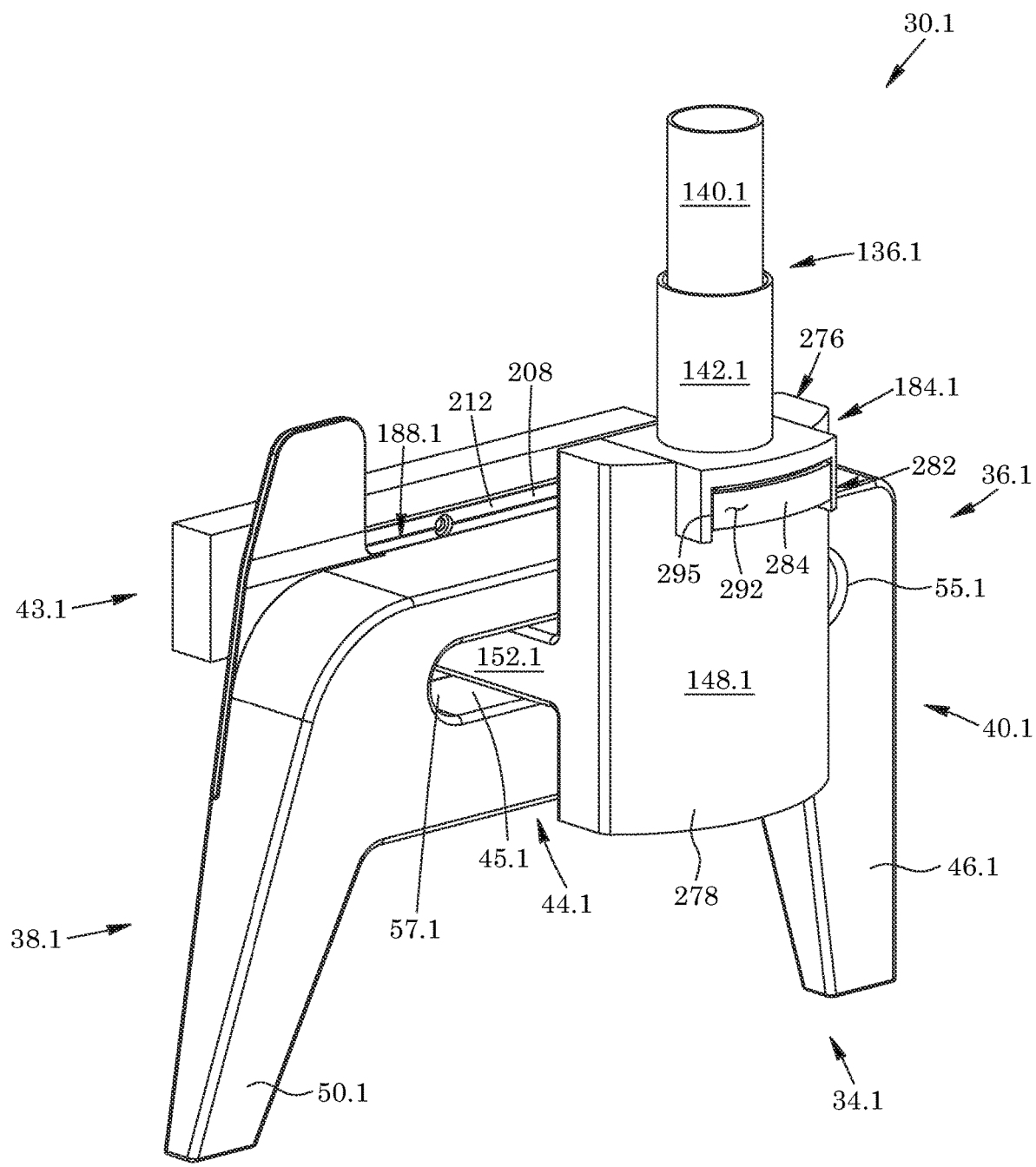
FIG. 14 is a right side, rear, top perspective view of a right arm lower carriage assembly of the chair of FIG. 13, together right legs of the chair and a right armrest height-adjustment assembly, with the rest of the chair not being shown.
Figure 17:
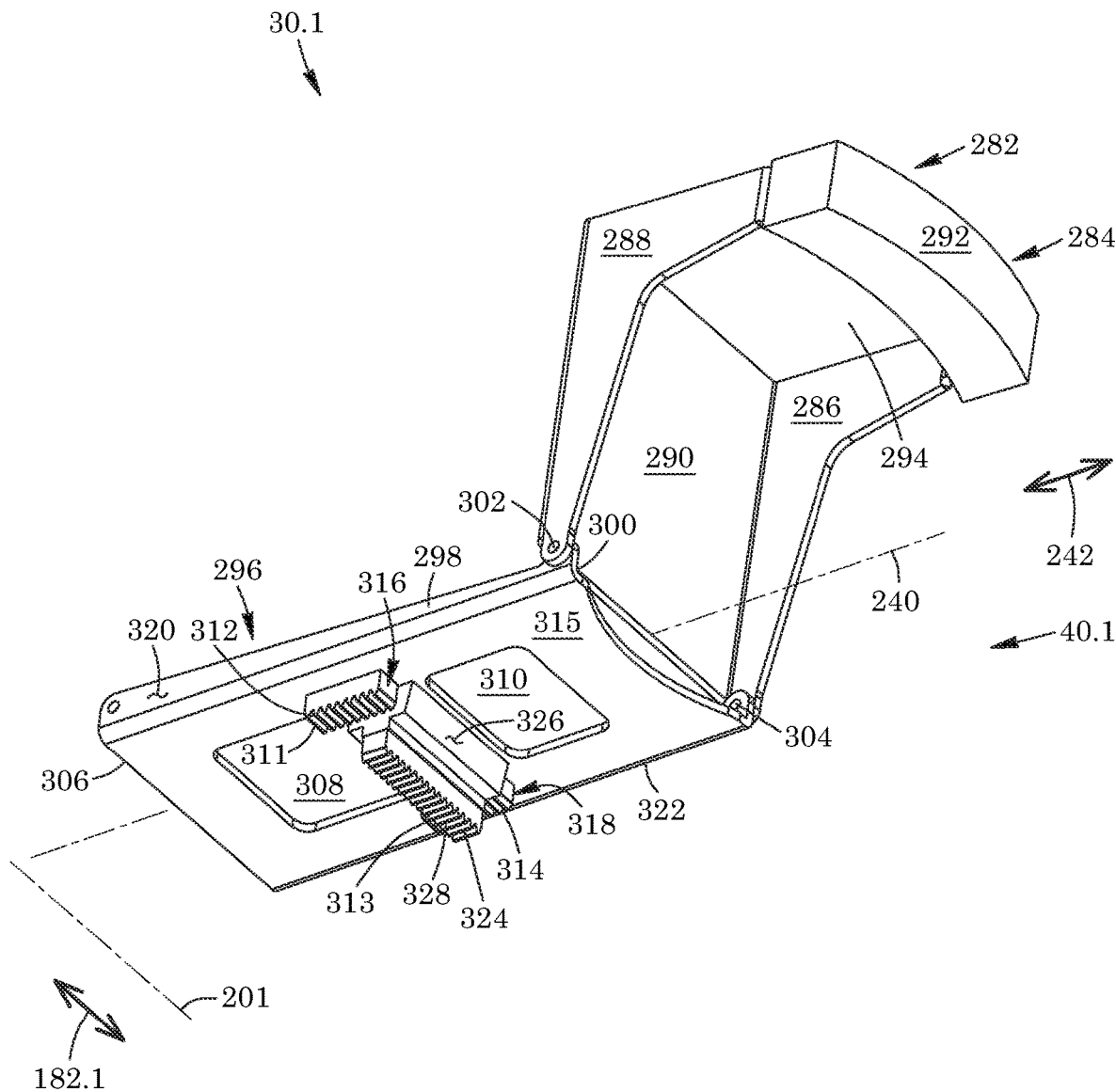
FIG. 17 is a bottom, rear, right side perspective view of a lever of the right arm lower carriage assembly of FIG. 14.

Referring now to FIG. 17, the chair 30.1 includes a mechanical control or locking mechanism, in this example a lower locking member per side thereof, as seen by locking member 282 for side 40.1 of the chair. The locking member includes a first or upper portion 284 that is an upside down L-shape in this example in side profile. The upper portion of the locking member 282 comprises a pair of spaced-apart L-shaped brackets 286 and 288 coupled together via a vertically-extending plate 290. The upper portion 284 of the locking member further includes a handle 292 coupled to and extending between the brackets and spaced-apart from the vertically-extending plate. The brackets 286 and 288, plate 290 and handle 292 form an open-ended enclosure 294. As seen in FIG. 18, the upper portion 284 of the locking member 282 is shaped to fit within and be substantially enclosed by the vertically-extending portion 148.1 of housing 278 of inward/outward carriage 276. As seen in FIG. 14, handle 292 extends through a side aperture 295 of the housing and aligns adjacent to side 40.1 of the chair 30.1.

As seen in FIG. 17, the locking member 282 includes a second or lower portion 296 comprising a U-shaped bracket 298 in this example. The U-shaped bracket generally extends horizontally and has a first or outer end 300 which couples to distal ends 302 and 304 of L-shaped brackets 286 and 288 in this example. The U-shaped bracket 298 has a second or inner end 306 spaced-apart from the outer end thereof. As seen in FIG. 19, the locking member 282 pivotally couples to the housing 278 of the inward/outward carriage 276 via inner end 306 of bracket 298 pivotally coupling to an inner end 308 of the horizontally-extending portion 152.1 of the housing. The locking member thus pivotally couples to the inward/outward carriage. Referring back to FIG. 17, bracket 298 has a pair of spaced-apart apertures 308 and 310 extending therethrough in this example between the ends 300 and 306 thereof and forward side 320 and rearward side 322 thereof.

The lower portion 296 of the locking member 282 includes at least one catch and in this example first and second pluralities of catches, in this case two rows 311 and 313 of teeth 312 and 314 coupled to the bottom 315 of bracket 298. The rows of teeth align parallel to lateral axis 240 and lateral direction 242. The lower portion 296 of the locking member 282 includes in this example a pair of spaced-apart first and second or side gear racks 316 and 318 of which the pluralities of teeth 312 and 314 are parts thereof. Gear rack 316 is adjacent to the rearward side 320 of the bracket 298 and gear rack 318 is adjacent to the forward side 322 of the bracket in this example.

Still referring to FIG. 17, the locking member 282 includes at least a further catch and in this example a third pluralities of catches, in this case teeth 324 coupled to the bottom 315 of bracket 298 via mounting member or block 326. The block is T-shaped in front profile in this example and is shaped to position teeth 324 below teeth 312 and 314. The block is positioned between apertures 308 and 310 in this example. The row of teeth 324 align parallel to longitudinal axis 201 and forward/rearward direction 182.1. The lower portion 296 of the locking member 282 includes in this example a third or central gear rack 328 of which teeth 324 are parts thereof. Gear rack 328 extends between gear racks 316 and 318 and rearward side 320 and forward side 322 of the bracket 298 in this example. As seen in FIG. 18, the lower portion 296 of the locking member 282 is shaped to fit within and be substantially enclosed by the horizontally-extending portion 152.1 of housing 278 of inward/outward carriage 276.

Figure 23:
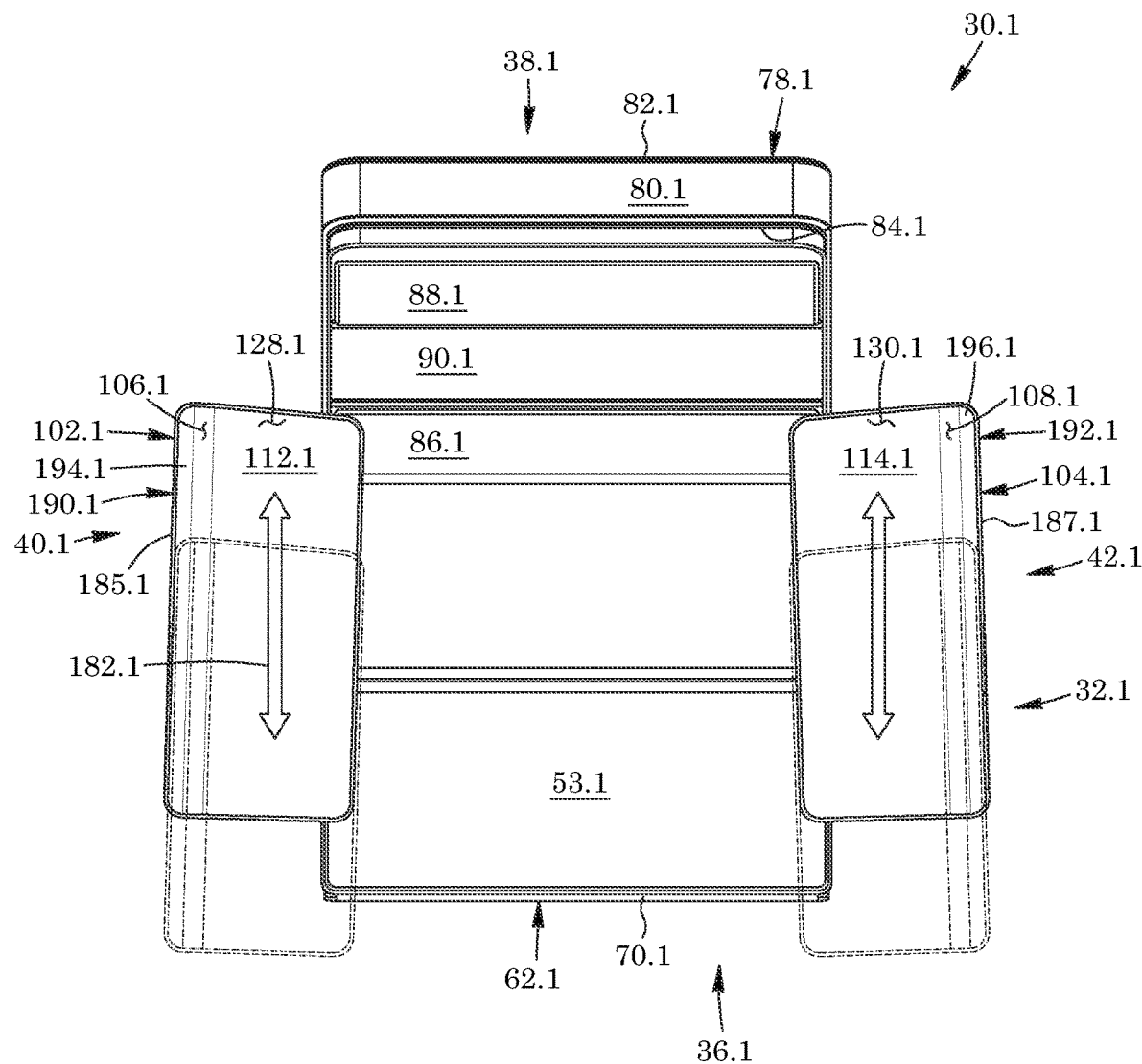
FIG. 23 is a top plan view of the chair of FIG. 13, with the armrests shown in solid lines in rearward positions, with the armrests shown in forward positions in ghost lines.
Figure 24:
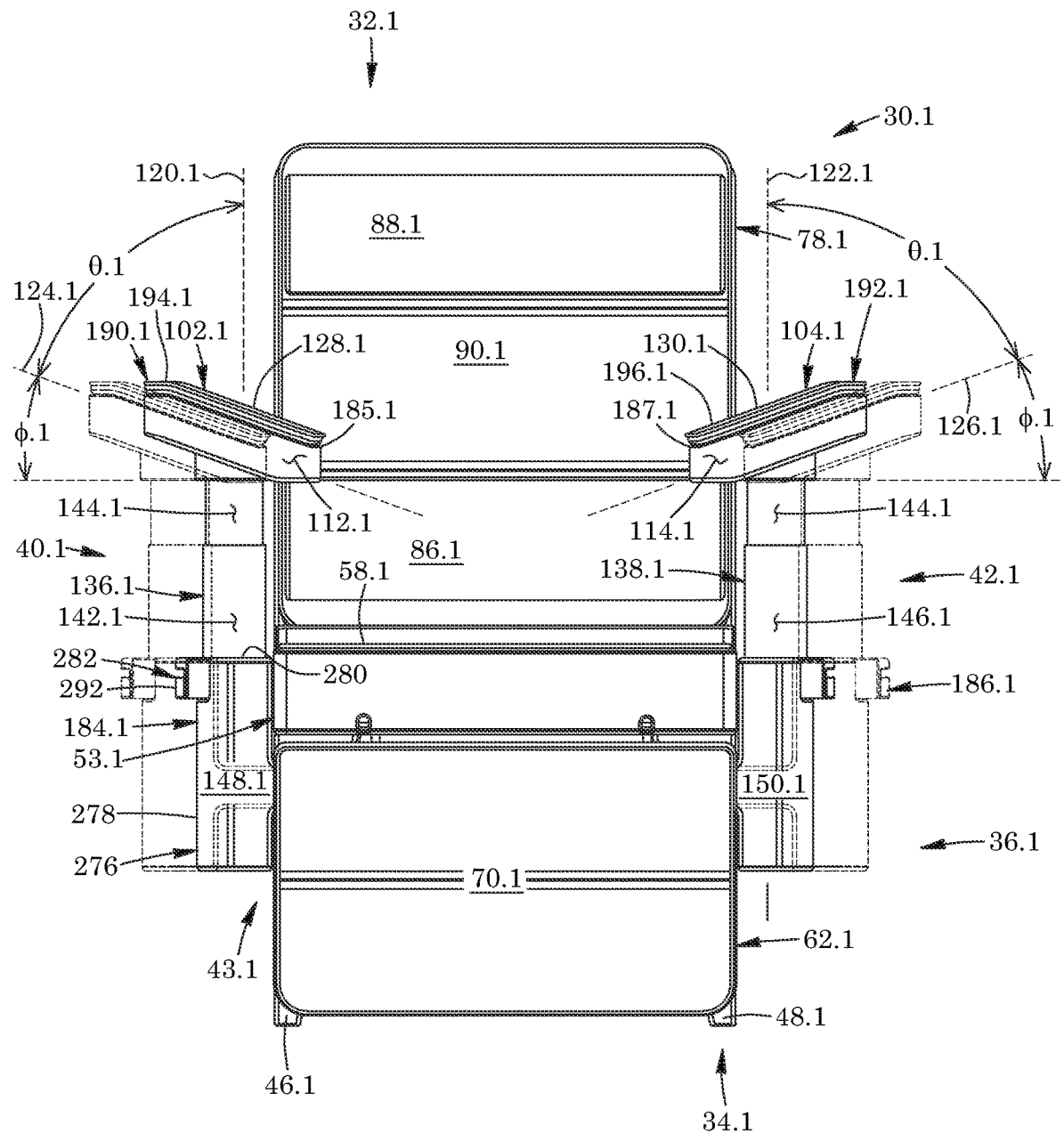
FIG. 24 is a front elevation view of the chair of FIG. 13, with the armrests, armrest height-adjustment assemblies and arm lower carriage assemblies thereof shown in solid lines in laterally-inward positions, and with the armrests, armrest height-adjustment assemblies and arm lower carriage assemblies thereof shown in laterally-outward positions in ghost lines.

Referring to FIGS. 19 and 20, the locking member 282 has an unlocked and in this example raised position in which the teeth 314 and 324 thereof are disengaged and spaced-apart from the corresponding teeth 234 of the forward/rearward carriage 99.1 seen in FIG. 19 and teeth 200 of the base 43.1 of the chair 30.1 seen in FIG. 20. The armrests 102.1 and 104.1 in the unlocked position of the locking member are moveable both forward and rearward as seen in FIG. 23, and laterally inwards and outwards relative to the base 43.1 of the chair 30.1 as seen in FIG. 24.

Figure 21:
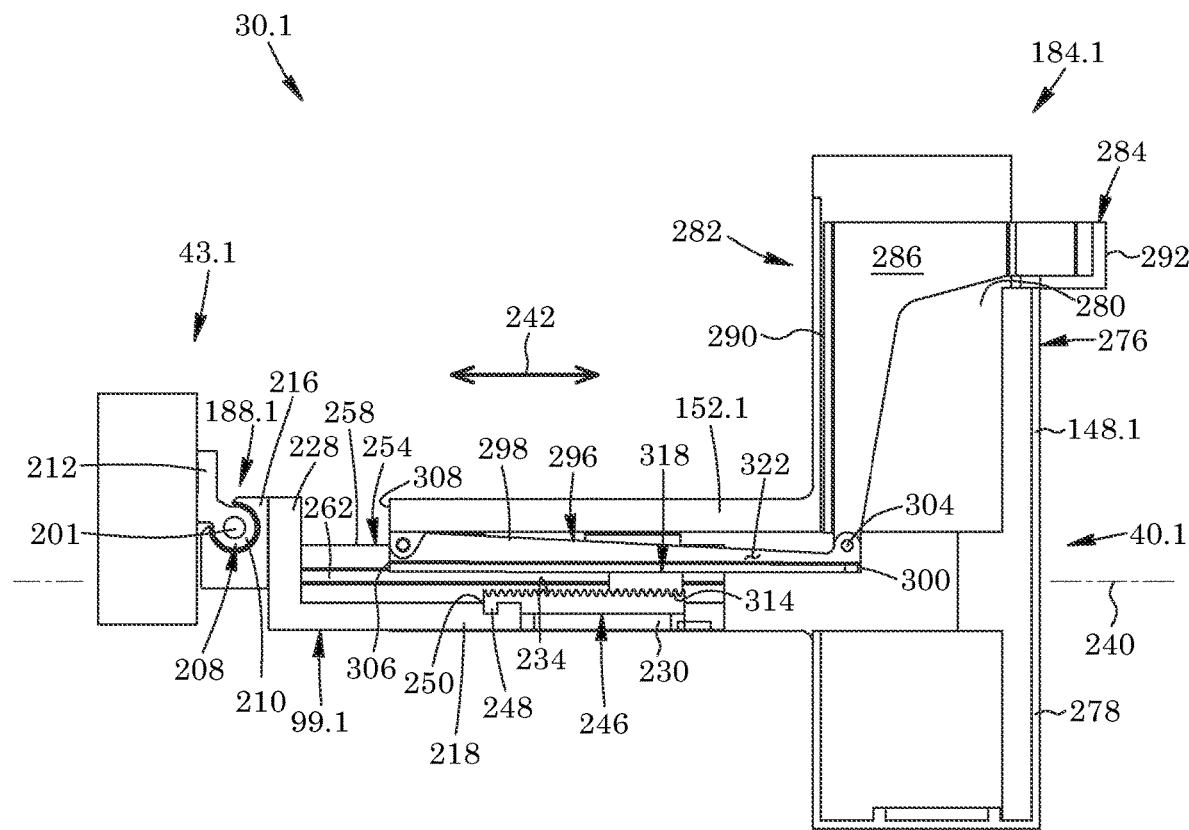
FIG. 21 is a sectional view similar to FIG. 19 of the right arm lower carriage assembly of FIG. 18, the lever being shown in a locked position with the lateral gear racks thereof shown engaged with the gear racks of the forward/rearward carriage.
Figure 22:
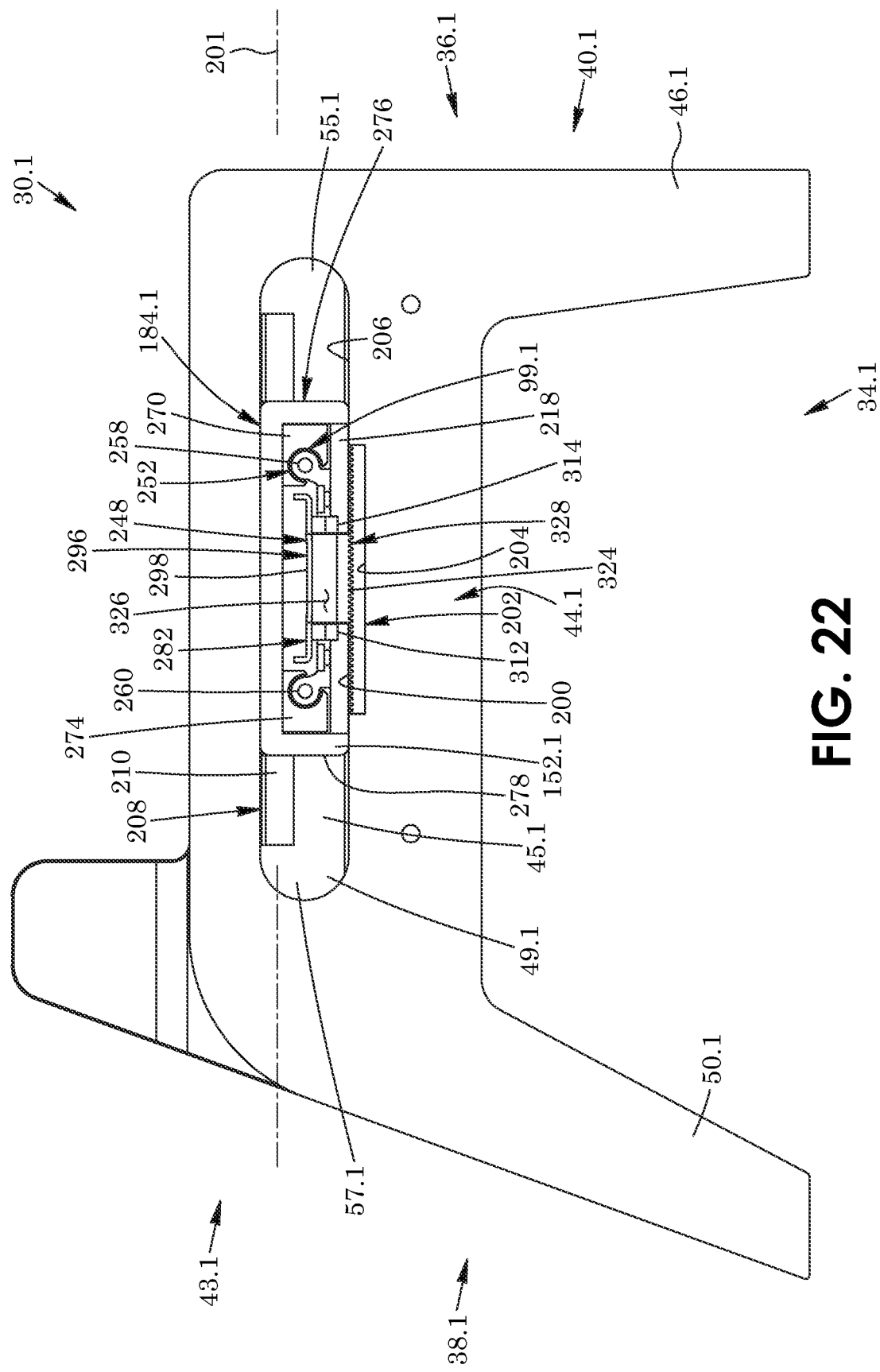
FIG. 22 is a lateral sectional view of the right side legs of FIG. 14 and right arm lower carriage assembly of FIG. 20, with the upper portion of inward/outward carriage not being shown, and the lever shown in the locked position with the longitudinal gear rack thereof shown engaged with the gear rack coupled to the legs.

The locking member 284 is moveable from the unlocked position of FIGS. 19 and 20 to a locked position seen in FIGS. 21 and 22. The teeth 312, 314 and 324 of gear racks 316, 318 and 328 of the locking member 282 seen in FIG. 17 engage with teeth 200 of the base 43.1 of the chair 30.1 seen in FIG. 22 and teeth 234 of the forward/rearward carriage 99.1 seen in FIG. 21 when the locking member is in the locked position. Movement of the armrest forward and rearward and laterally inwards and outwards is thus inhibited in the locked position of the locking member. The degrees of freedom of each armrest 102.1, in this example armrest rotation and extension, are thus combined to one mechanical control to ease adjustment of the armrest by the person while feeding the baby.

The locking member thus locks and unlocks such that it allows simultaneous adjustment of the armrest rotation and armrest extension. This could also be implemented with motorized rotational actuator that rotates the housing (and lock rail) of the armrest-up down actuator to provide rotation. Such an implementation would facilitate user recallable positions when paired with a microprocessor and position feedback on the drive elements.

Figure 27:
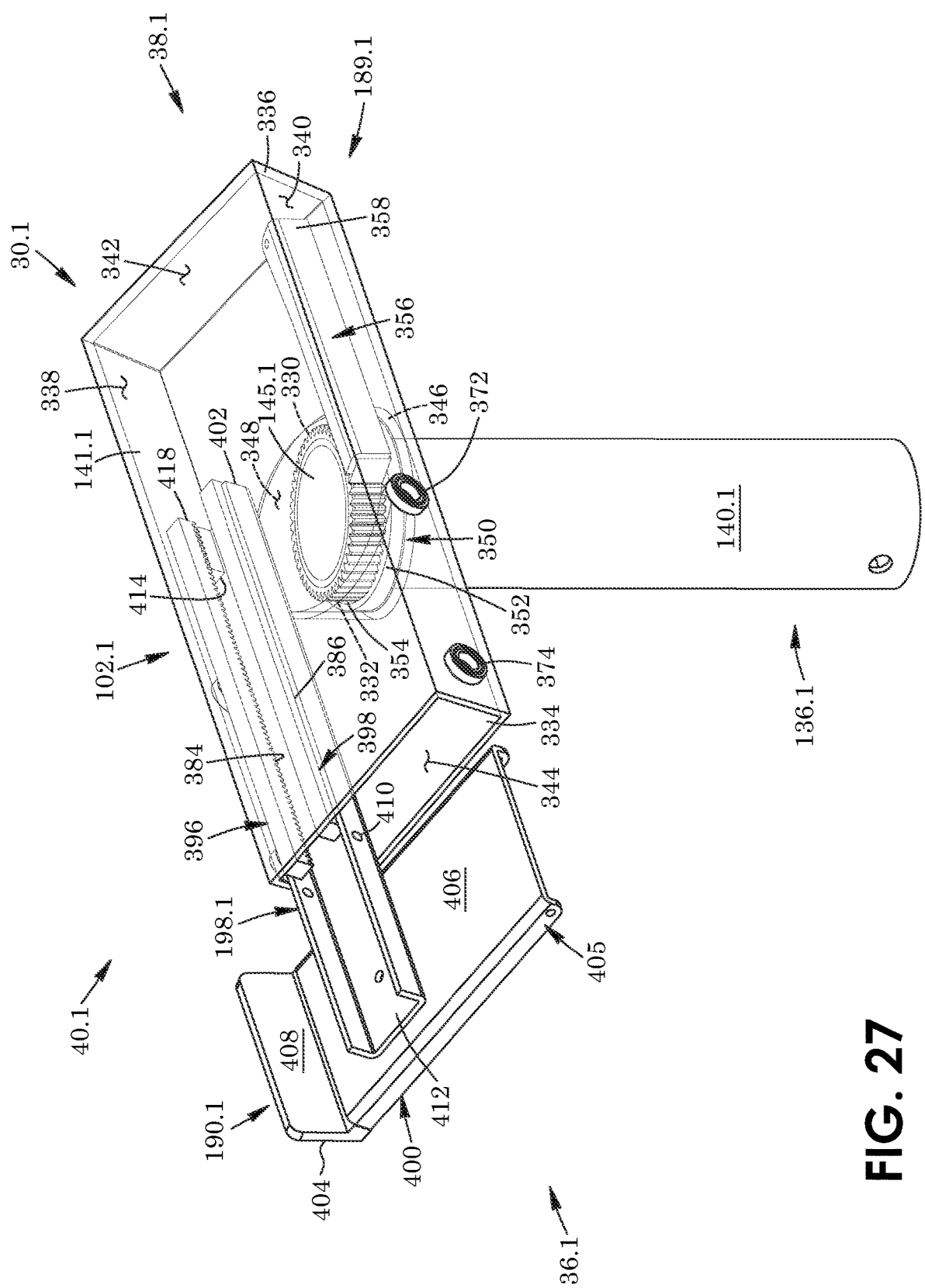
FIG. 27 is a top, front, inner side perspective view of the inner shaft of the right armrest height-adjustment assembly of FIG. 13 together with the right armrest of the chair of FIG. 13, with the outer housing of the right armrest being removed to reveal an inner mount of the right armrest rotatably coupled to the inner shaft, the inner mount being shown in transparent lines, the right armrest further including a locking member pivotally coupled to the inner mount, and the chair further including an upper lever slidably coupled to the inner mount, with the rest chair not being shown.

Referring to FIG. 27, each height-adjustment assembly 136.1 of the chair 30.1 includes an upper elongate member, in this example an inner shaft 140.1. Each inner shaft include a first plurality of catches, in this case teeth 330 coupled thereto and extending about to the distal end 145.1 thereof. The first plurality of teeth are part of a gear 332 in this example.

Each armrest 102.1 includes an inner mount 141.1 in the shape of a rectangular tube in this example. The inner mount has an open forward end 334, an open rearward end 336, an outer side 338, an inner side 340, a top 342 and a bottom 344. The sides of the inner mount 141.1 extend between the ends and top and bottom of the inner mount. The inner mount has a lower recess 346 between the ends 334 and 336 and sides 338 and 340 thereof and which extends from the bottom 344 thereof towards the top 342 thereof. The inner mount 141.1 includes an annular wall 348 which extends about the recess thereof. As seen in FIG. 27, the inner shaft 141.1 rotatably couples to the inner mount via bearing 350 with an outer race 352 coupled to annular wall 348 and an inner race 354 coupled to the shaft. The bearing is positioned adjacent to and below gear 332 in this example.

Figure 28:
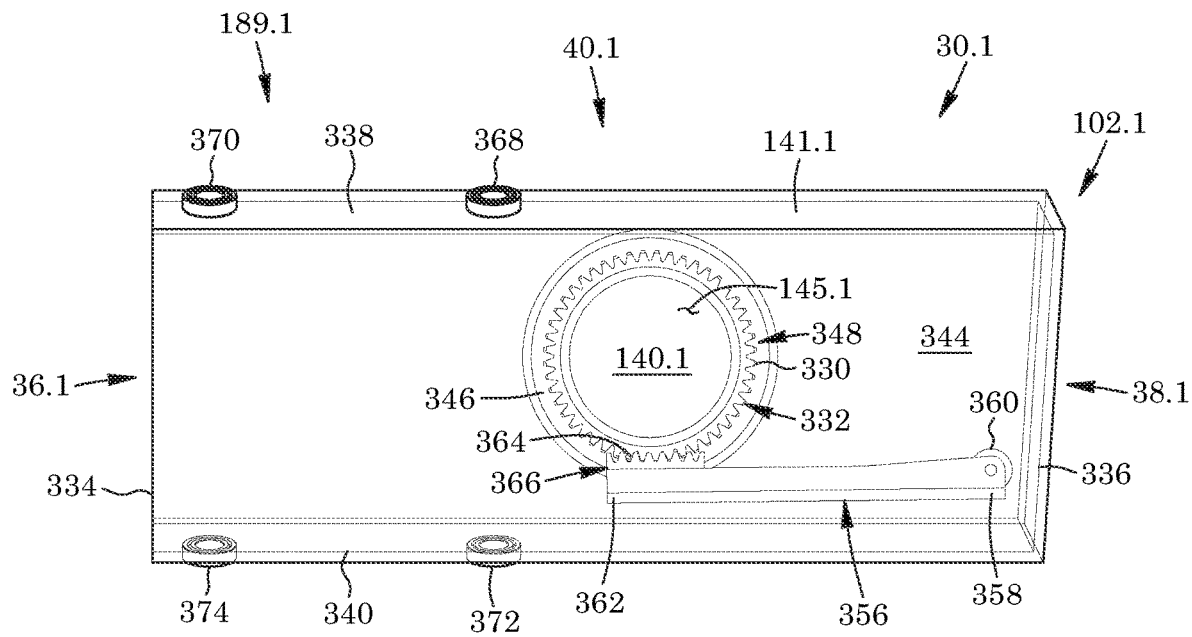
FIG. 28 is a top perspective view of the inner mount of the right armrest of FIG. 27 shown in transparent lines, together with the inner shaft and the locking arm of FIG. 14, with a gear shown coupled to the a distal end of the inner shaft, the right armrest further including an actuator shown actuating the locking member into a locked position in which a gear rack of the locking member engaged with the gear of the inner shaft, and with the rest of the chair not being shown.

Referring to FIG. 28, the chair 30.1 includes an upper locking member per side thereof, as seen by locking member 356 for side 40.1 of the chair. The locking member aligns adjacent to inner side 340 of the inner mount 141.1 in this example. The locking member 356 has a first or proximal end 358 pivotally coupled to the bottom 344 of the inner mount 141.1 via an actuator 360. The actuator may include an electric solenoid or cable, for example. The actuator 360 is positioned adjacent to rearward end 336 of the inner mount in this example. Locking member 358 and actuator are disposed within and enclosed by inner mount 141.1 of the armrest 102.1 in this example.

The locking member has a second or distal end 362 and includes at least one catch and in this example a second plurality of catches, in this case teeth 364 coupled to and extending along and adjacent to the distal end thereof. The locking member 356 includes in this example a gear rack 366 of which the teeth are parts thereof.

Figure 29:
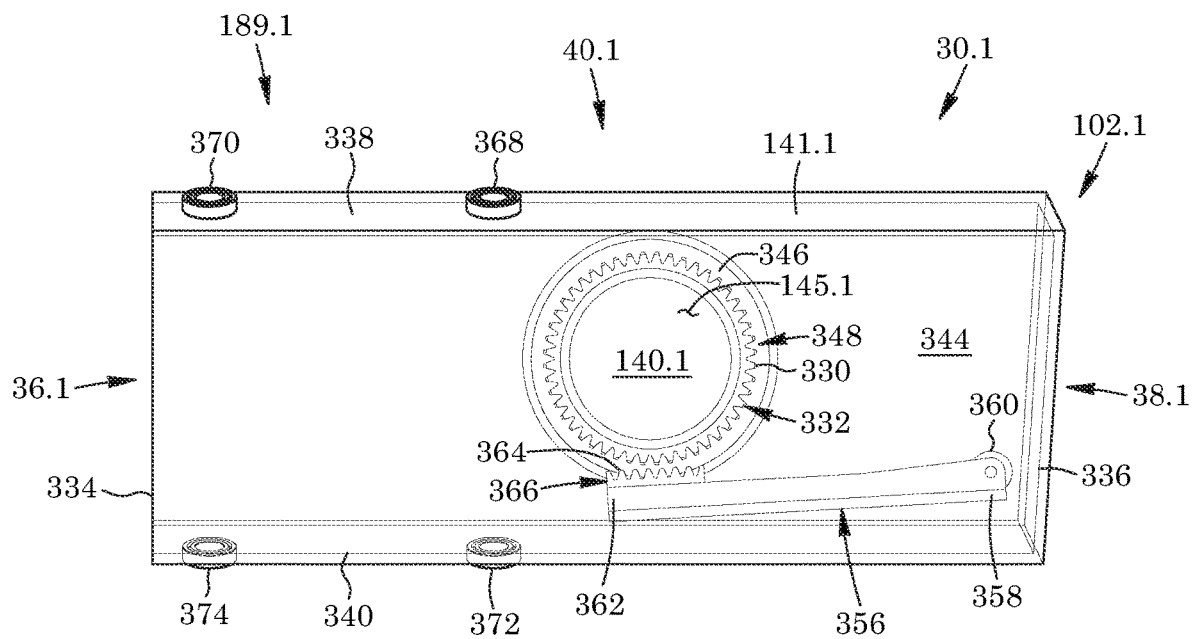
FIG. 29 is a top perspective view of the inner mount of the right armrest of FIG. 28 shown in transparent lines, together with the inner shaft and the locking arm thereof, with the actuator shown actuating the locking member into an unlocked position in which the gear rack of the locking member is spaced-apart from the gear of the inner shaft, and with the rest of the chair not being shown.
Figure 30:
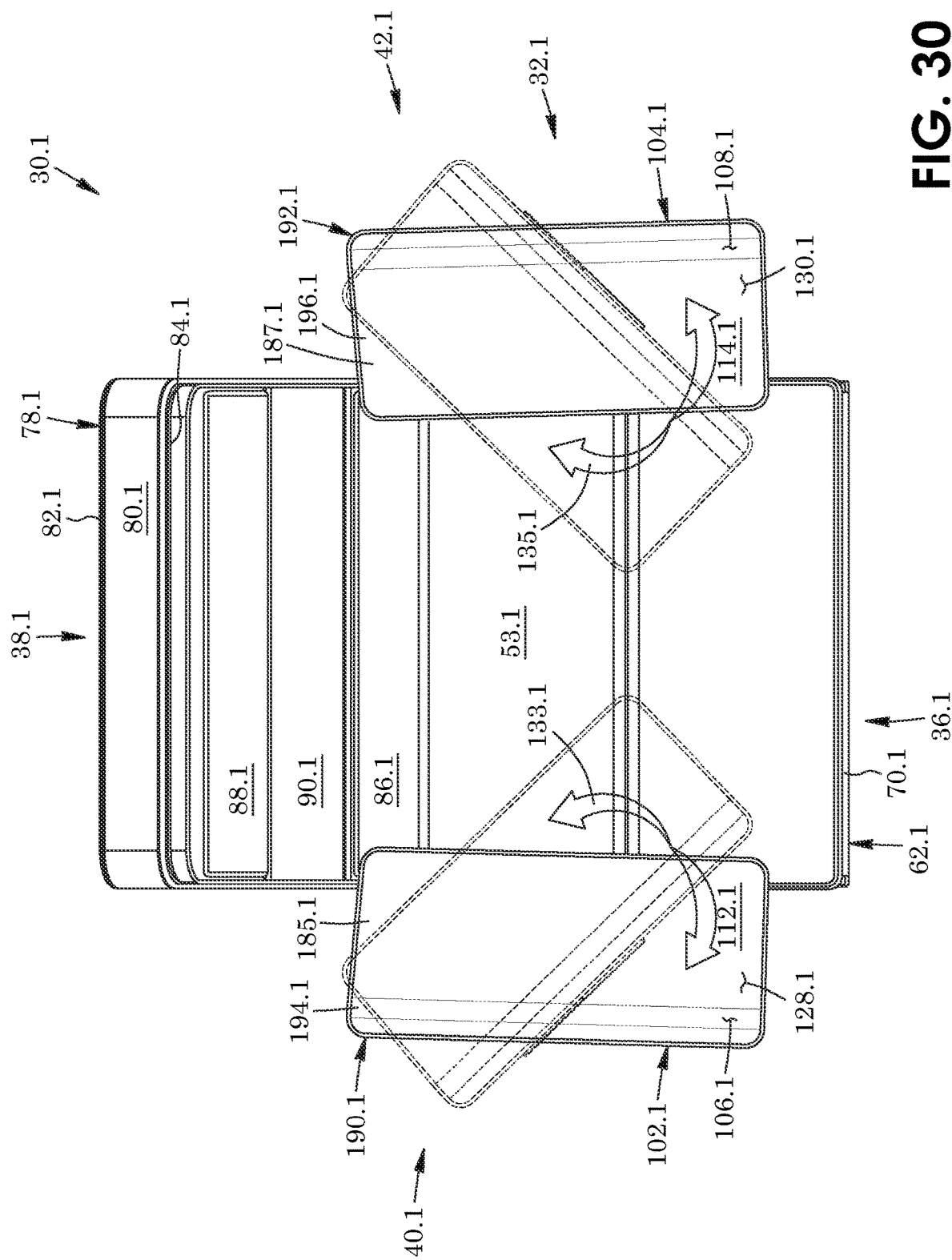
FIG. 30 is a top plan view of the chair of FIG. 13, with the armrests thereof shown in solid lines in non-rotated positions, and with the armrests shown in inwardly-rotated positions in ghost lines.

The locking member has an unlocked position seen in FIG. 29 in which the teeth 364 thereof are disengaged and spaced-apart from the teeth 330 of the inner shaft 140.1. The armrests 102.1 in the unlocked positions are rotatable about the inner shafts 141.1, as seen in FIG. 30 by arrows 133.1 and 135.1. Actuating the actuator 360 seen in FIG. 29 selectively moves the locking member 356 from the unlocked position to a locked position seen in FIG. 28. In the locked position at least some of the teeth 364 of the locking member engage with at least some of the teeth 330 of the inner shaft 141.1, with rotational movement of the armrest 102.1 being inhibited thereby.

Figure 31:
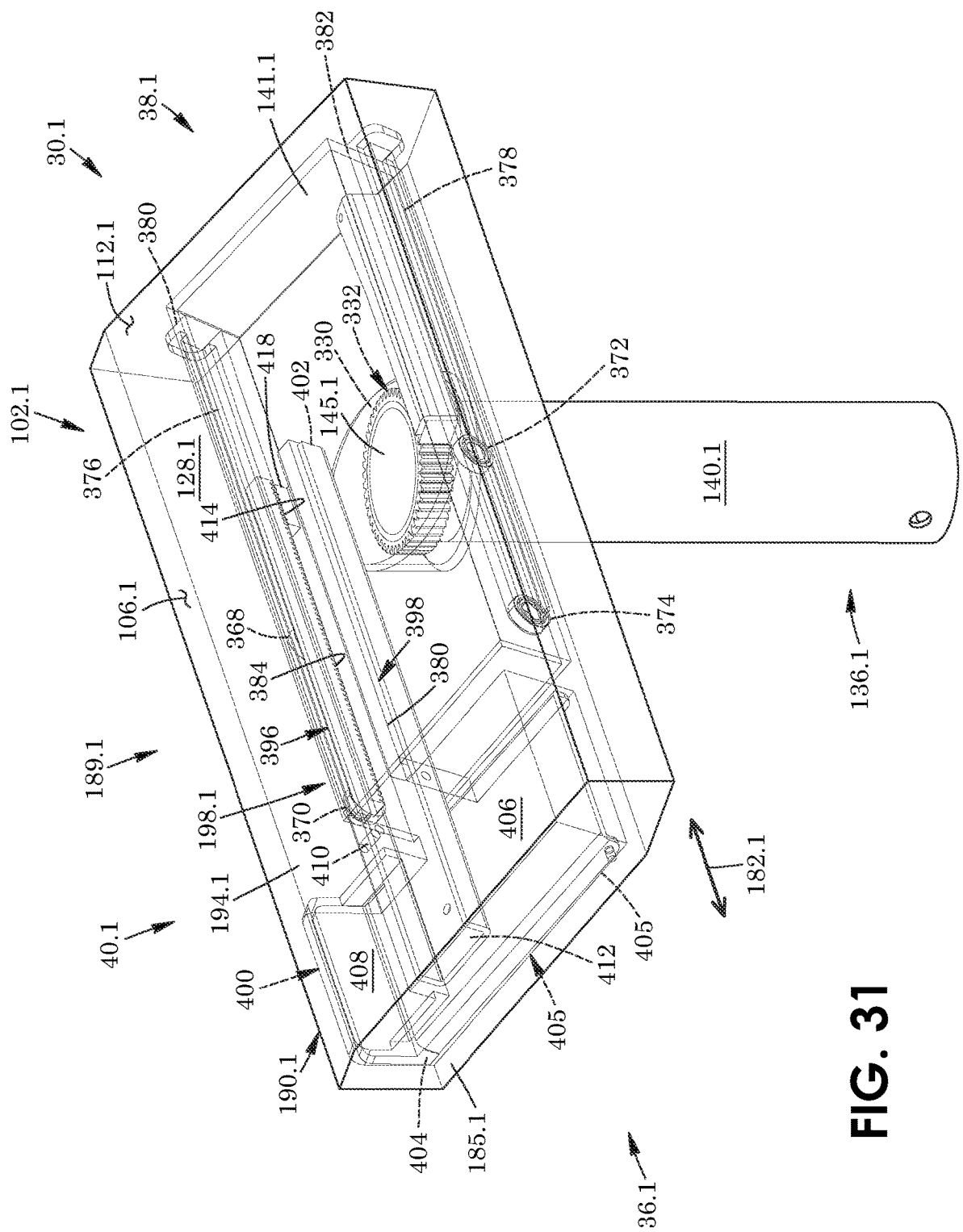
FIG. 31 is a top, front, inner side perspective view of the inner shaft of the right armrest height-adjustment assembly of FIG. 13 together with the inner mount of the right armrest of the chair of FIG. 13 shown rotatably coupled thereto, the outer housing of the armrest and the inner mount being shown in transparent lines, with the outer housing shown slidably coupled to the inner mount in a retracted position, with the lever shown pivotally mounted to the outer housing, and with the rest chair not being shown.

Still referring to FIG. 28, the inner mount 141.1 includes a first of bearings and channels, in this example two spaced-apart, aligned pairs of bearings 368, 370 and 372 and 374. Bearings 368 and 370 are rotatably mounted to side 338 of the inner mount and bearings 372 and 374 are rotatably mounted to side 340 of the inner mount. As seen in FIG. 31, the outer housing 185.1 of armrest 102.1 includes a second of the bearings and channels, in this example a pair of channels 376 and 378 shaped to slidably engage with bearings 368 and 370 and bearings 372 and 374, respectively, of the inner mount 141.1. The channels are within inwardly-facing sides 380 and 382 of the housing 185.1 in this example.

Figure 32:
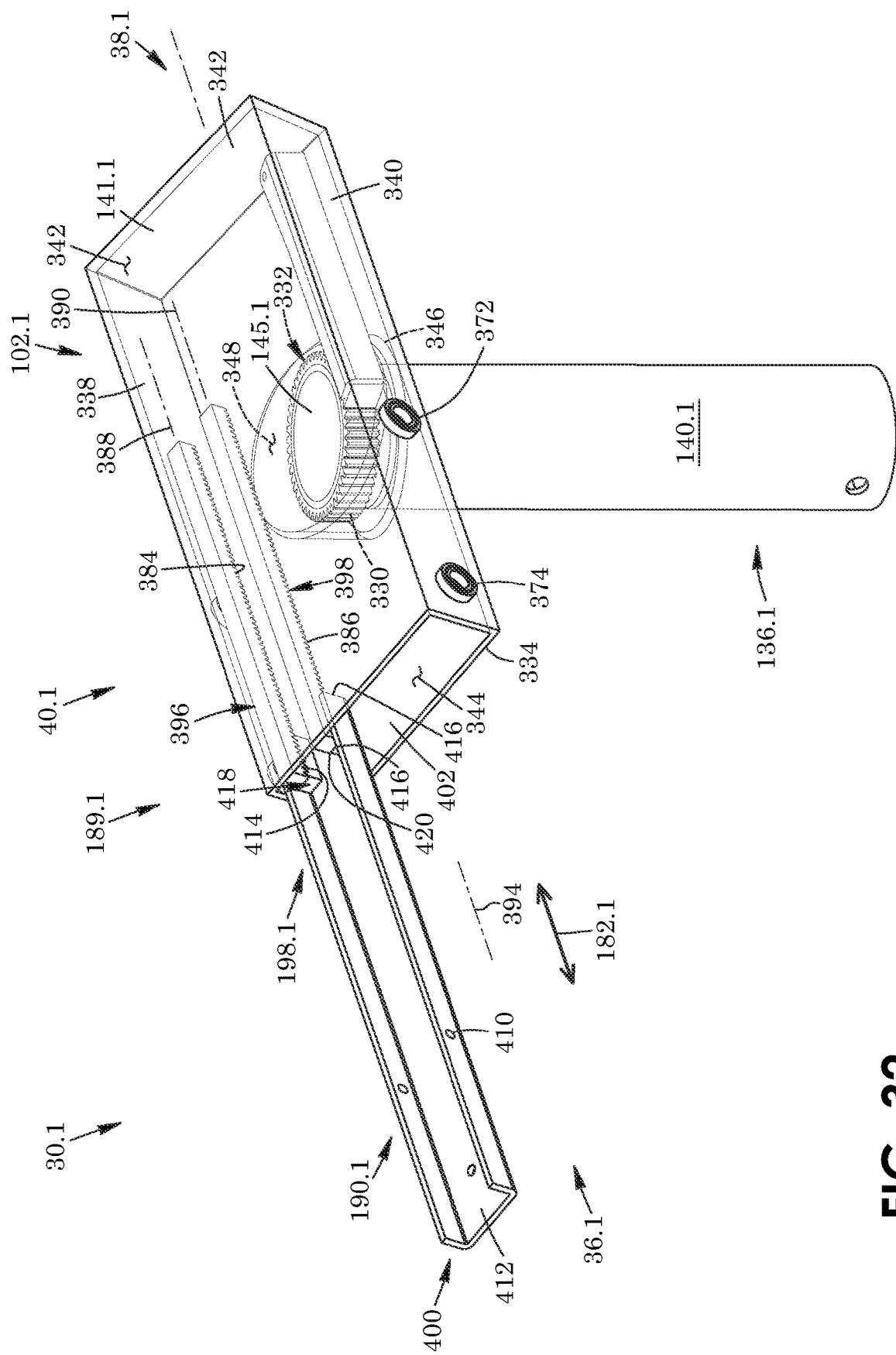
FIG. 32 is a top, front, inner side perspective view of the inner shaft of the right armrest height-adjustment assembly of FIG. 13 together with the inner mount of the right armrest of the chair of FIG. 13 shown rotatably coupled thereto and shown in transparent lines, with the distal end portion of the lever not being shown and a channel of the lever enclosing and being slidable relative to gear racks of the inner mount, and with the channel being shown in an extended position relative to the inner mount.
Figure 35:
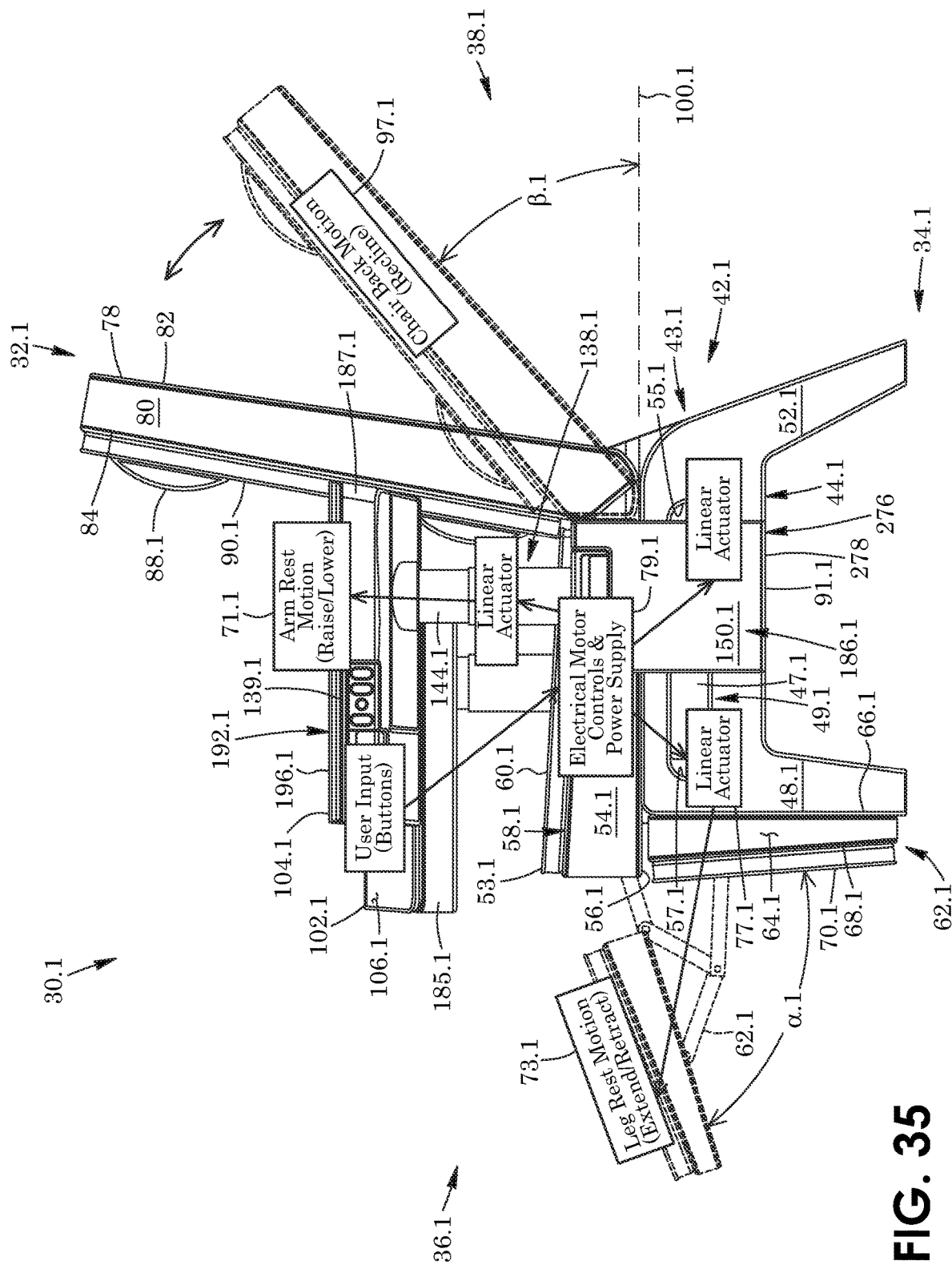
FIG. 35 is a right side elevation view of the chair of FIG. 13, with a fully lowered position of the backrest thereof shown in ghost lines and a fully raised position of the leg rest thereof shown in ghost lines.
Figure 36A:
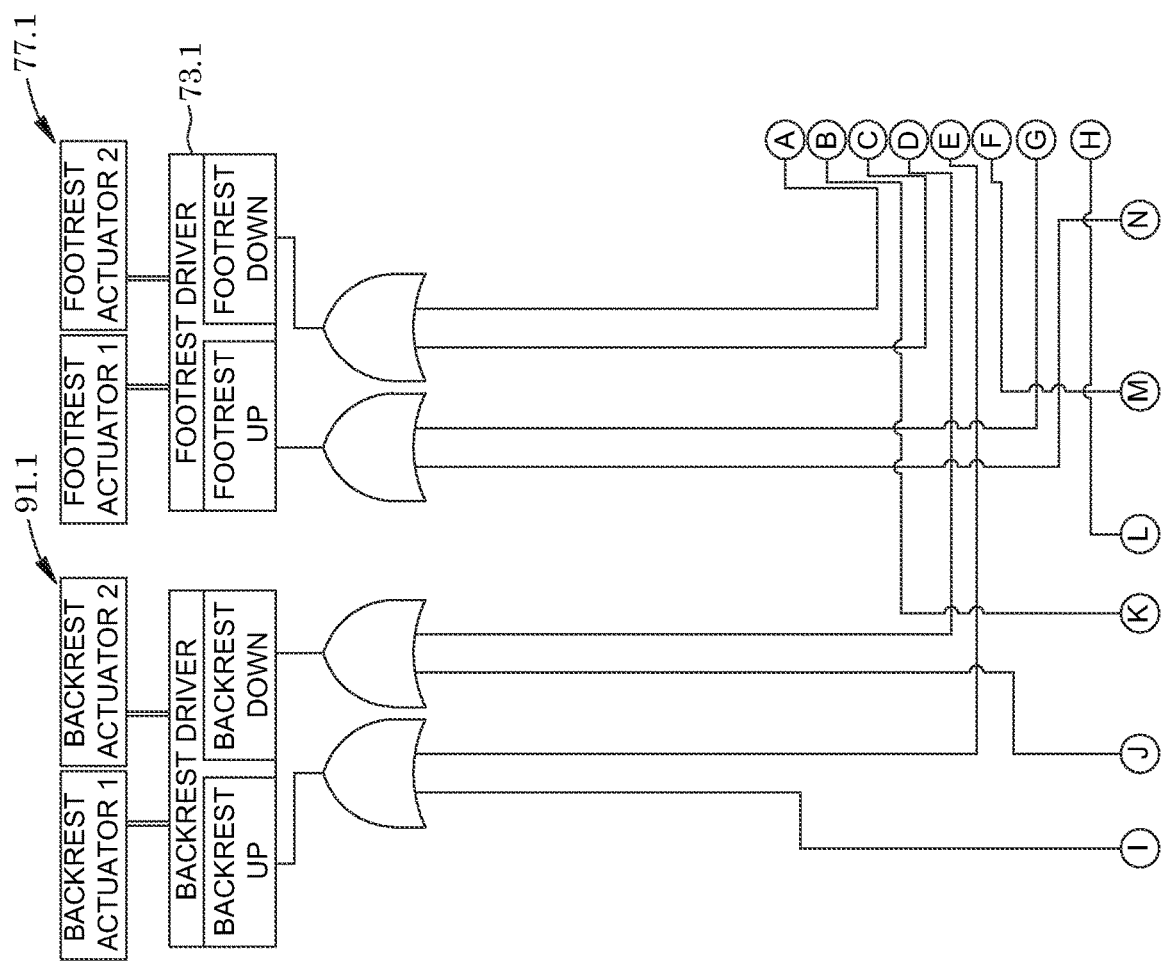
FIGS. 36A to D collectively are a functional logic diagram view of the motor and control system of the chair of FIG. 13 showing how user buttons control the various degrees of freedom of the chair, including individual switches which control individual motors.
Figure 36B:
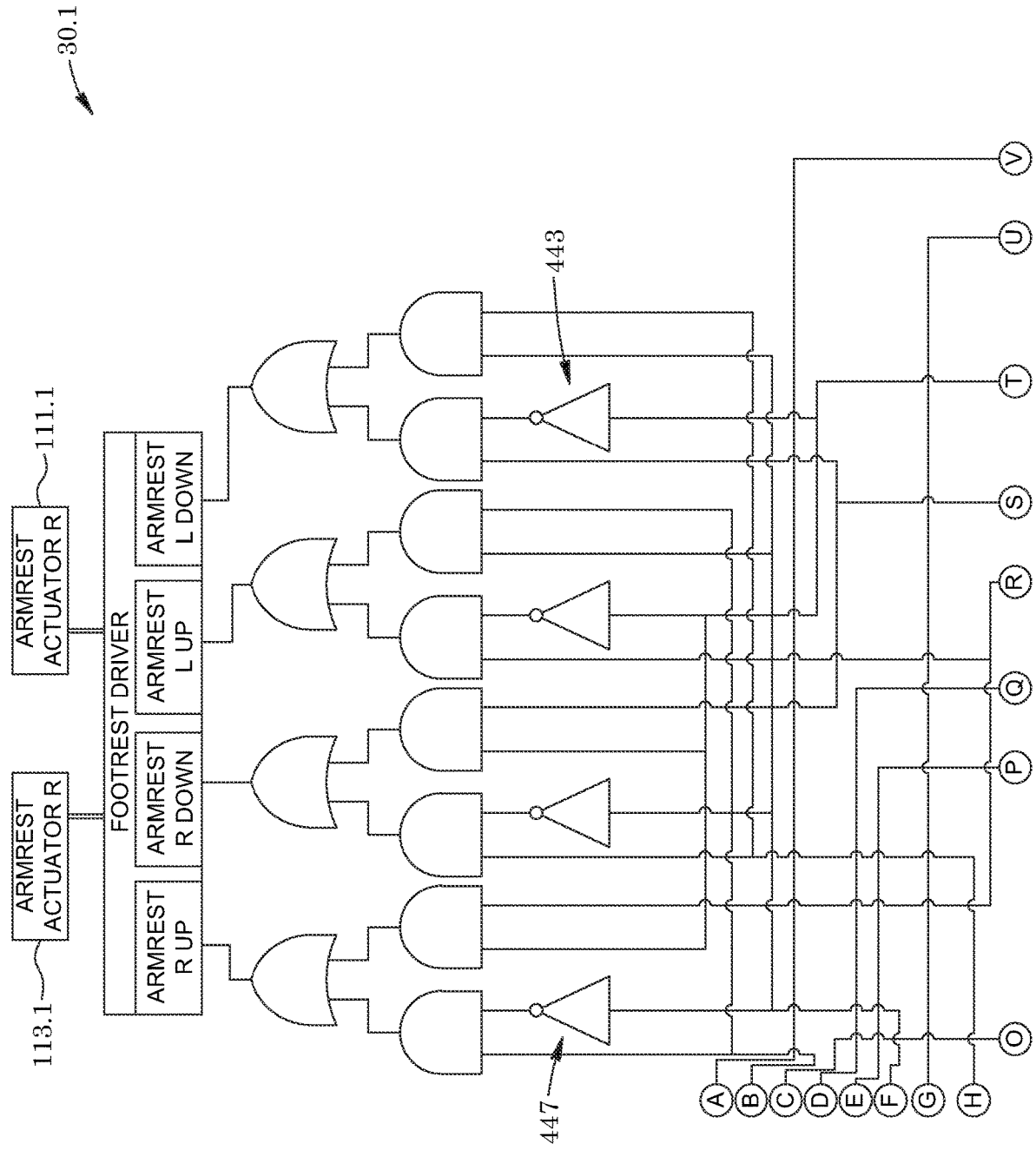
Figure 36C:
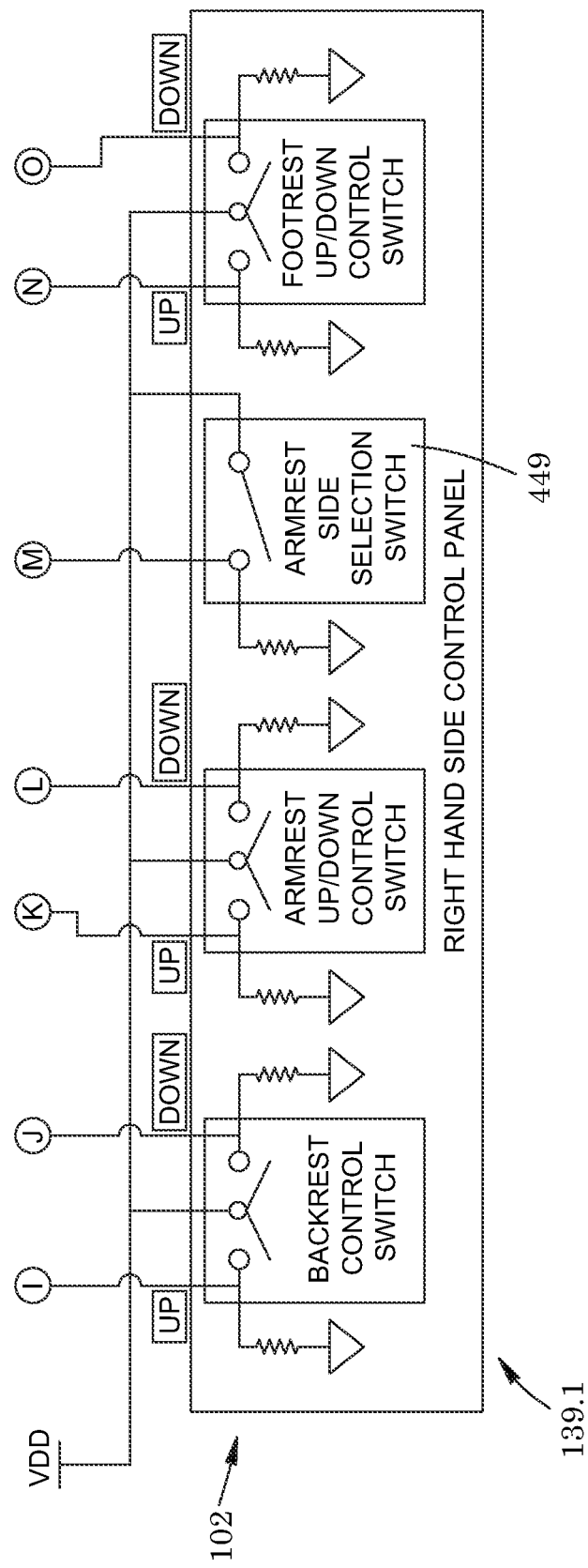
Figure 36D:
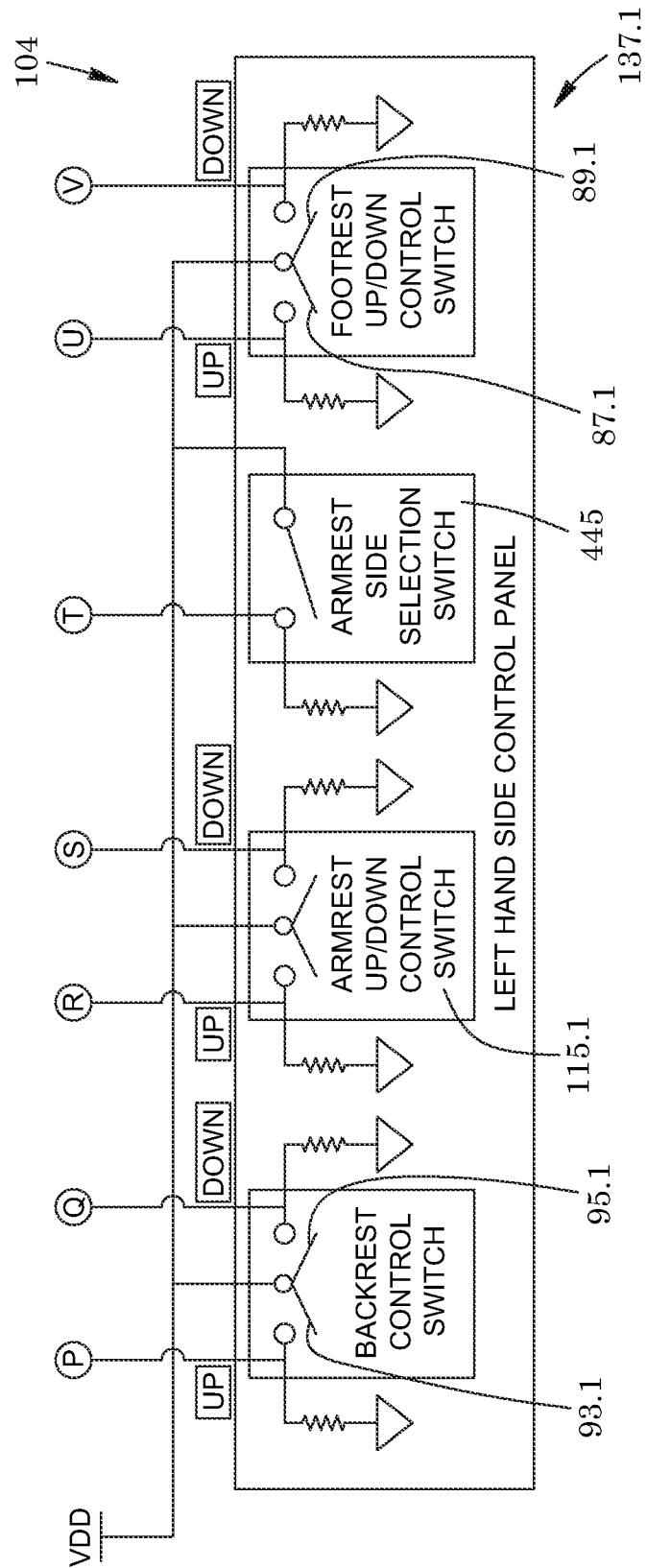
Figure 37A:
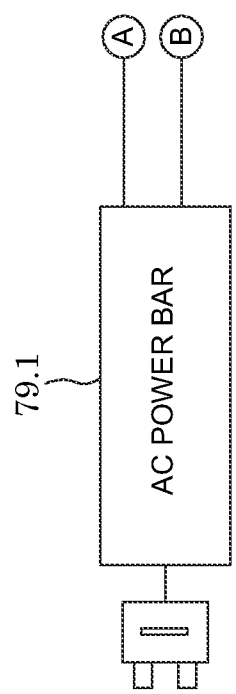
FIGS. 37A to E are a hardware block diagram view of the motor and control system of the chair of FIG. 13 showing the detailed electrical arrangement of the control hardware.
Figure 37B:
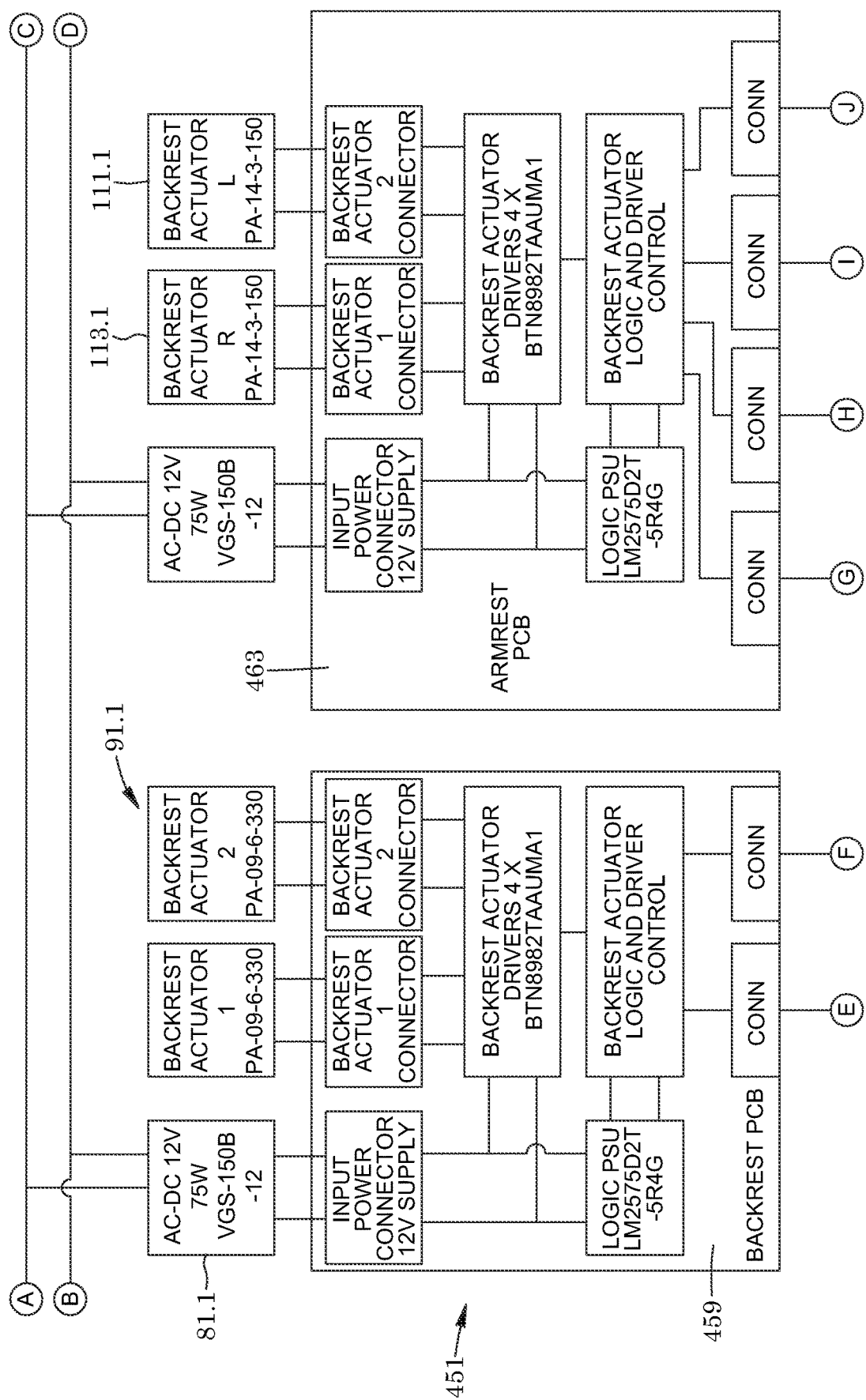
Figure 37C:
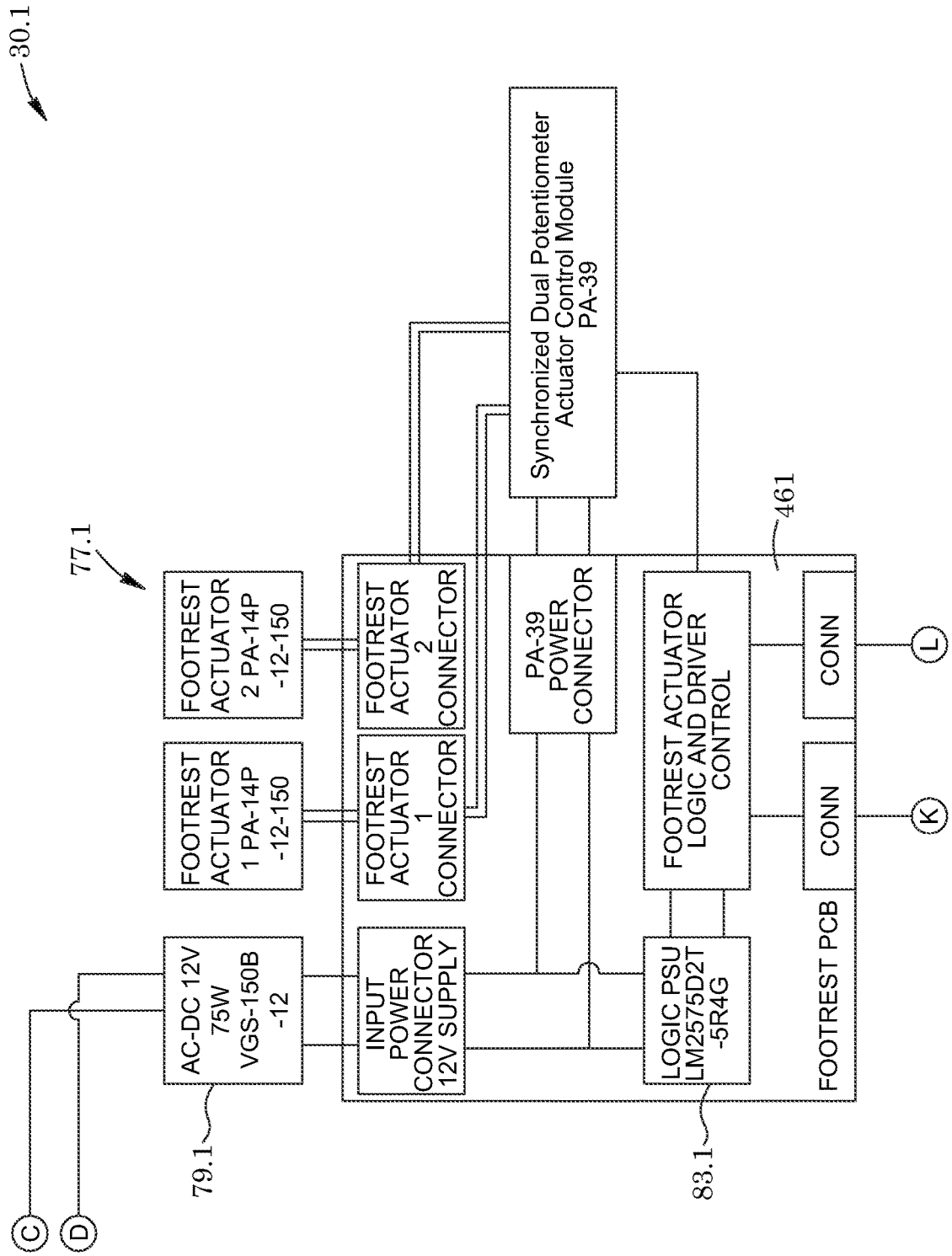
Figure 37D:
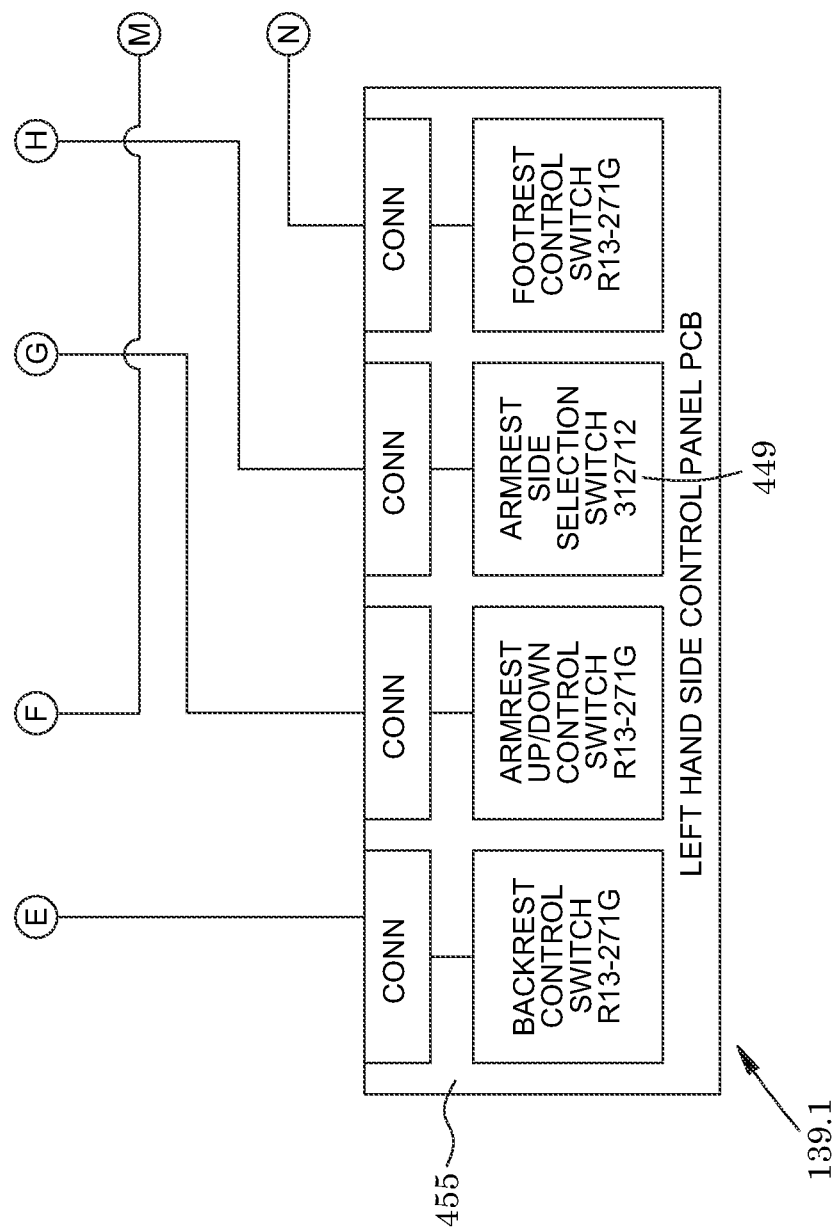
Figure 37E:
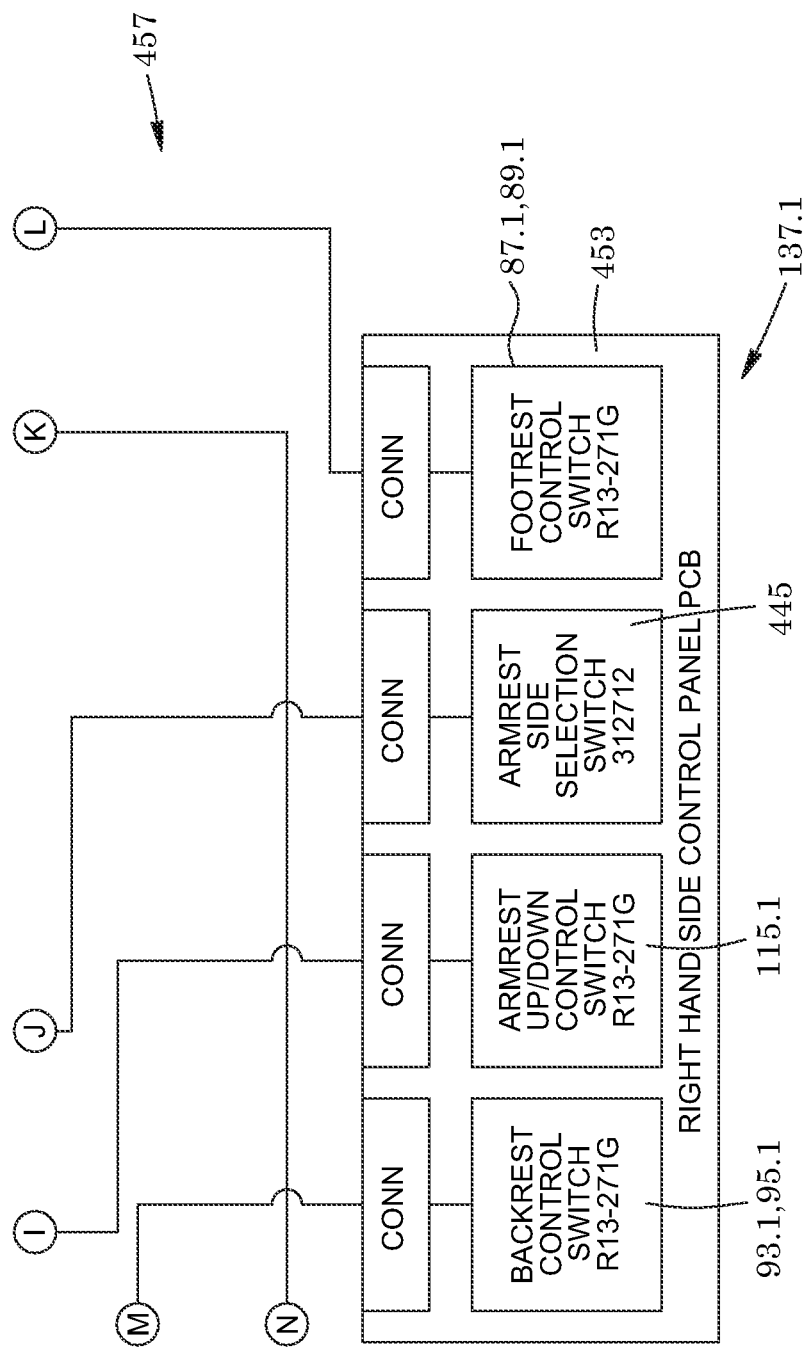

As seen in FIG. 32, each inner mount 141.1 includes at least one and in this example first and second pluralities of teeth 384 and 386 aligned in two rows 388 and 390. The teeth are positioned within the interior 392 of the inner mount and couple to the top 342 of the inner mount in this example. The rows of teeth align parallel with a longitudinal axis 394 of the inner mount 141.1 and direction 182.1 which extends from the front to the rear of the chair. The inner mount includes a pair of spaced-apart gear racks 396 and 398 in this example of which the teeth 384 and 386 are parts thereof. Gear rack 396 is adjacent to and extends along side 338 of the inner mount 141.1 and gear rack 398 extends in parallel with gear rack 396 in this example. The gear racks extend from forward end 334 of the inner mount towards the rearward end 336 of the inner mount in this example.

Figure 25A:
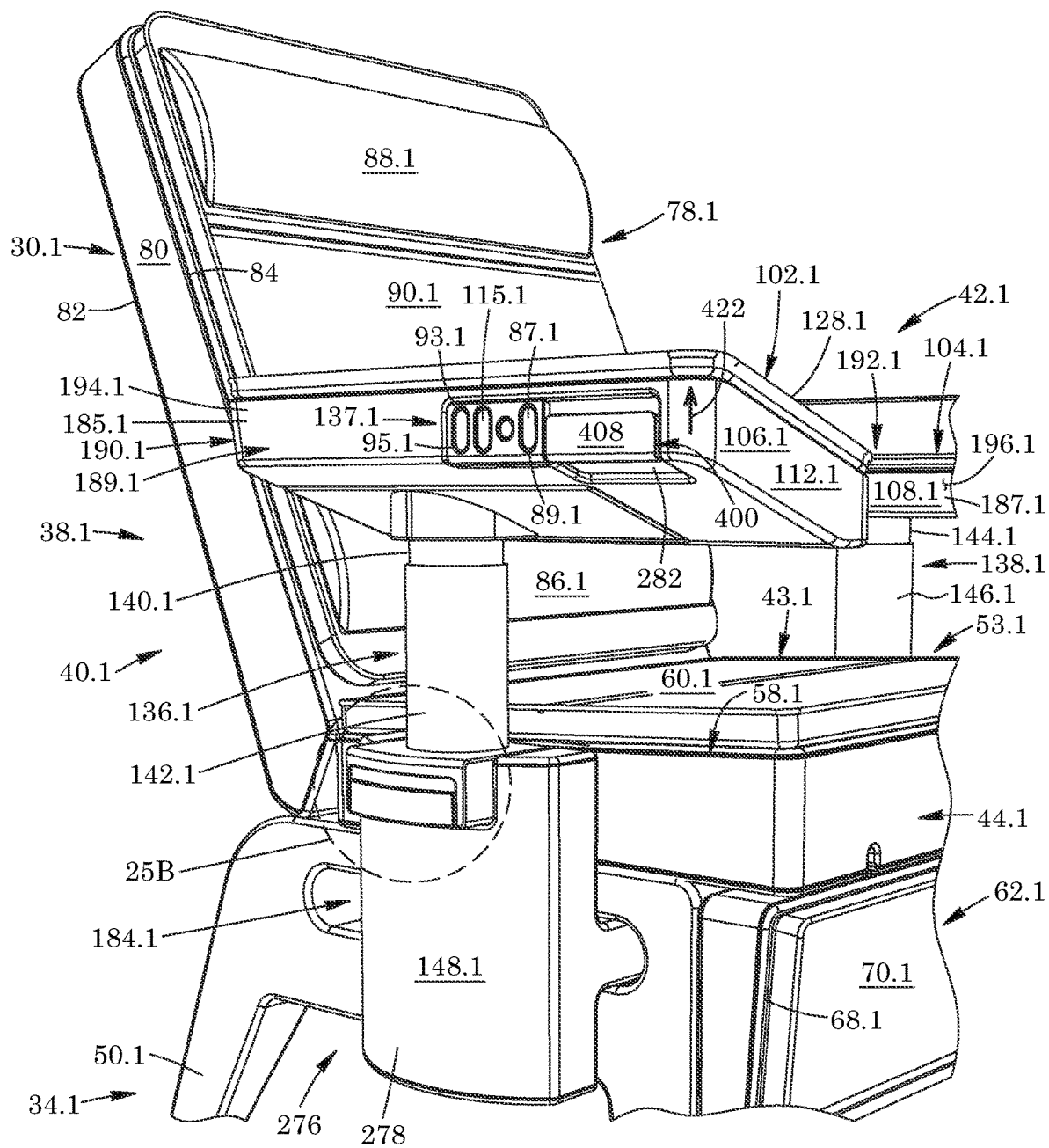
FIG. 25A is an enlarged front, right side perspective view of the chair of FIG. 13, with the lever of the right arm lower carriage assembly shown in the unlocked position, and with the left armrest, backrest and leg rest thereof shown in fragment.

As seen in FIG. 27, each armrest 102.1 includes a lever 400. The lever has a first or proximal end 402 and a second or distal end 404. The lever includes a distal end portion 405 positioned adjacent to the distal end thereof and which extends towards the proximal end thereof. The distal end portion of the lever 400 comprises a generally planar member, in this example a U-shaped bracket 406, and a gripping outer section, in this example handle 408 coupled to and extending upwards from the bracket. As seen in FIG. 25A, the handle of the lever is in communication with and which extends along the exterior 189.1 of the armrest 102.1. As seen in FIG. 31, the lever 400 pivotally couples to the outer housing 185.1 at a pivot point 410 located between the proximal end 402 thereof and the distal end 404 thereof.

As seen in FIG. 27, the lever 400 includes a proximal end portion, in this example a U-shaped channel 412. The channel extends from the proximal end 402 of the lever towards the distal end 404 of the lever. The channel 412 receives, partially encloses and is slidable relative to gear racks 396 and 398 of the inner mount 141.1. Referring to FIG. 31, lever 400 and arm upper carriage assembly 190.1 comprising outer housing 185.1 are moveable forward/rearward, as shown by direction 182.1, relative to the inner mount 14.1 via an extension mechanism 198.1 of which the channel 412, gear racks 396 and 398, bearings 368, 370, 372, and 374 and channels 376 and 378 are parts thereof.

Referring to FIG. 32, the lever 400 includes at least one catch and in this example first and second plurality of catches, in this case teeth 414 and 416 coupled to and adjacent to the proximal end 402 thereof. The rows of teeth align with gear racks 396 and 398 in this example in direction 182.1. The plurality of teeth 414 and 416 are parts of a pair of spaced-apart gear racks 418 and 420 in this example.

The lever 400 has an unlocked position seen in FIG. 34 in which the teeth 414 thereof are disengaged and spaced-apart from the teeth 384 of the gear racks 396 of the inner mount 141.1. The levers and outer housings 185.1 of the armrests 102.1 in the unlocked position are moveable forward/rearward relative to the inner mount as seen in FIG. 23.

Figure 25B:
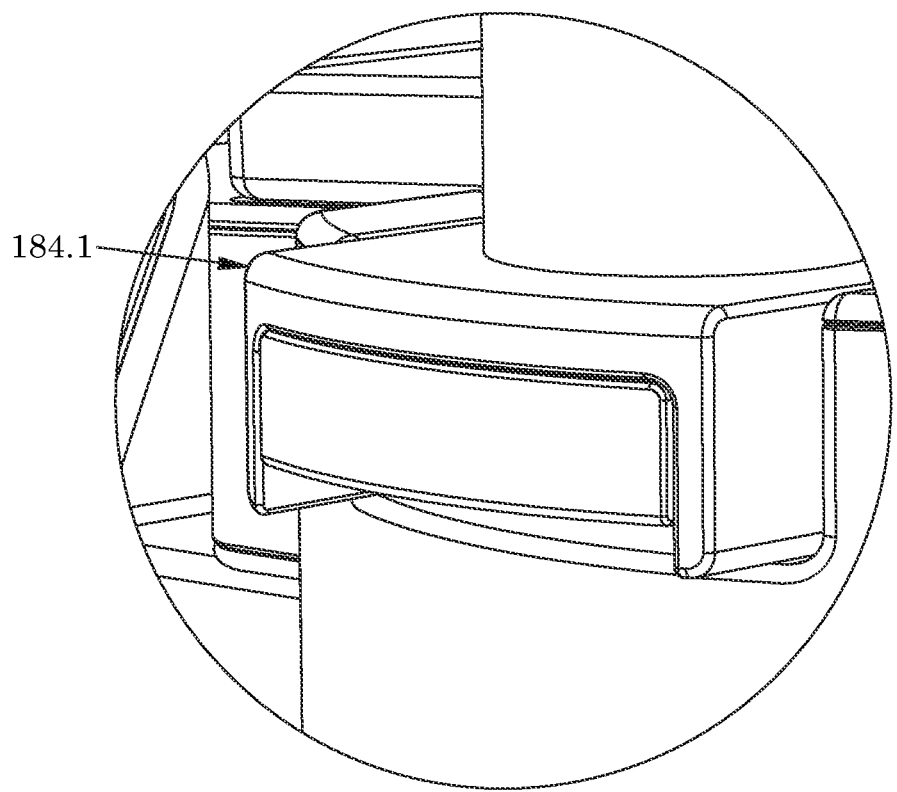
FIG. 25B is a further enlarged front, right side perspective view of the chair of FIG. 13, with the lever of the right arm lower carriage assembly shown in the locked position, and the rest of the chair shown in fragment.
Figure 26:
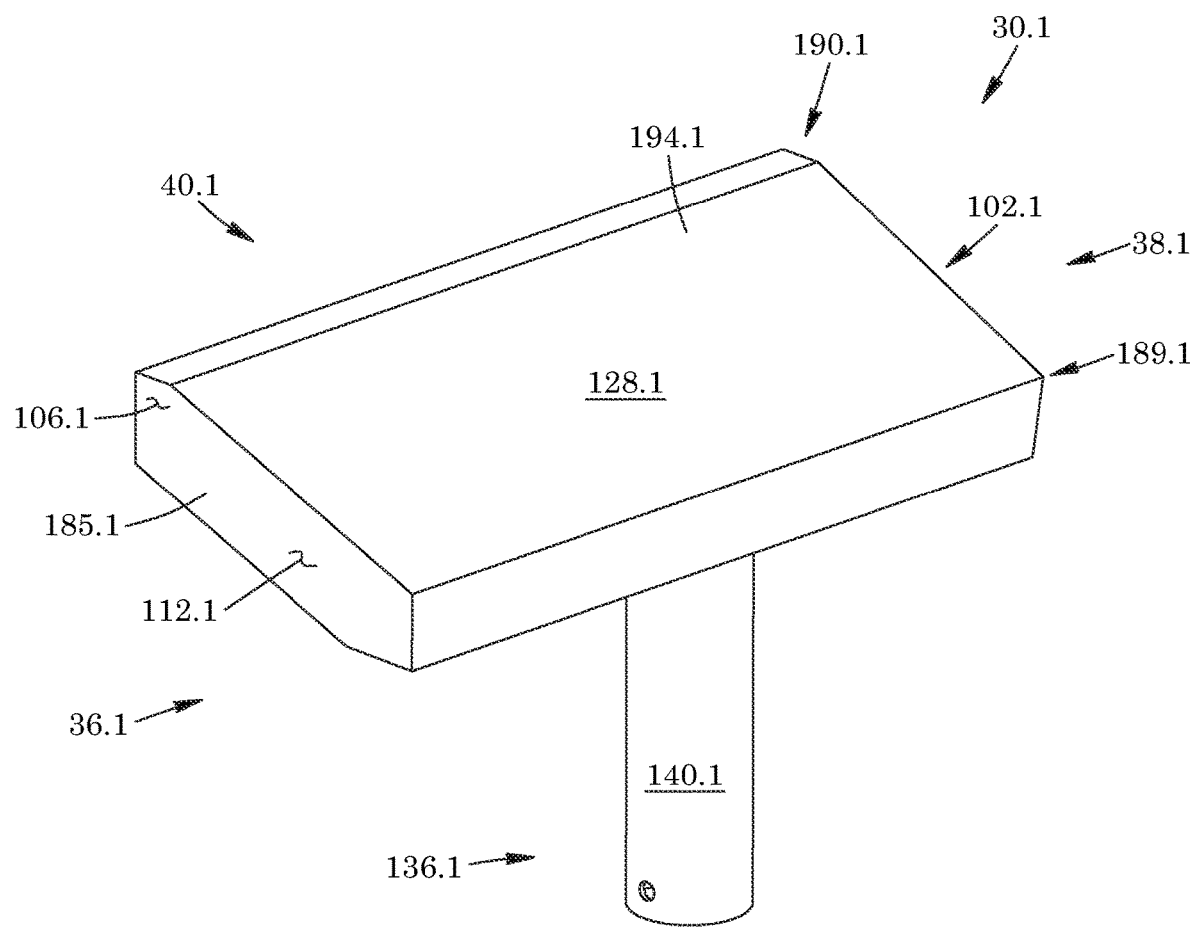
FIG. 26 is a top, front, inner side perspective view of an inner shaft of the right armrest height-adjustment assembly of FIG. 13 together with the right armrest of the chair of FIG. 13, the right armrest including an outer housing and the rest chair not being shown.

Lifting the handle 408 seen in FIG. 25A upwards, as shown by arrow 422 cause the lever 400 to move from the unlocked position to a locked position seen in FIGS. 25B and 33. Referring to FIG. 33, the teeth 414 of the lever engage with teeth 384 of the gear racks 396 of the inner mount 141.1 when the lever is in the locked position. Movement of the lever 400 and outer housing 185.1 forward/rearward is thus inhibited. As seen in FIG. 31, the weight of the distal end portion 405 of the lever biases the lever towards the locked position.

Referring now to FIG. 13, the armrests 102.1 and 104.1 of chair 30.1 each comprise only first or upper portions 106.1 and 108.1 and second or angled portions 112.1 and 114.1 coupled to, extending downwards from and positioned below the upper portions thereof in this embodiment. Portions 112.1 and 114.1 of the armrests are substantially larger than portions 106.1 and 108.1 and are shaped to fully receive a baby stretched out and resting thereon for example.

Figure 38:
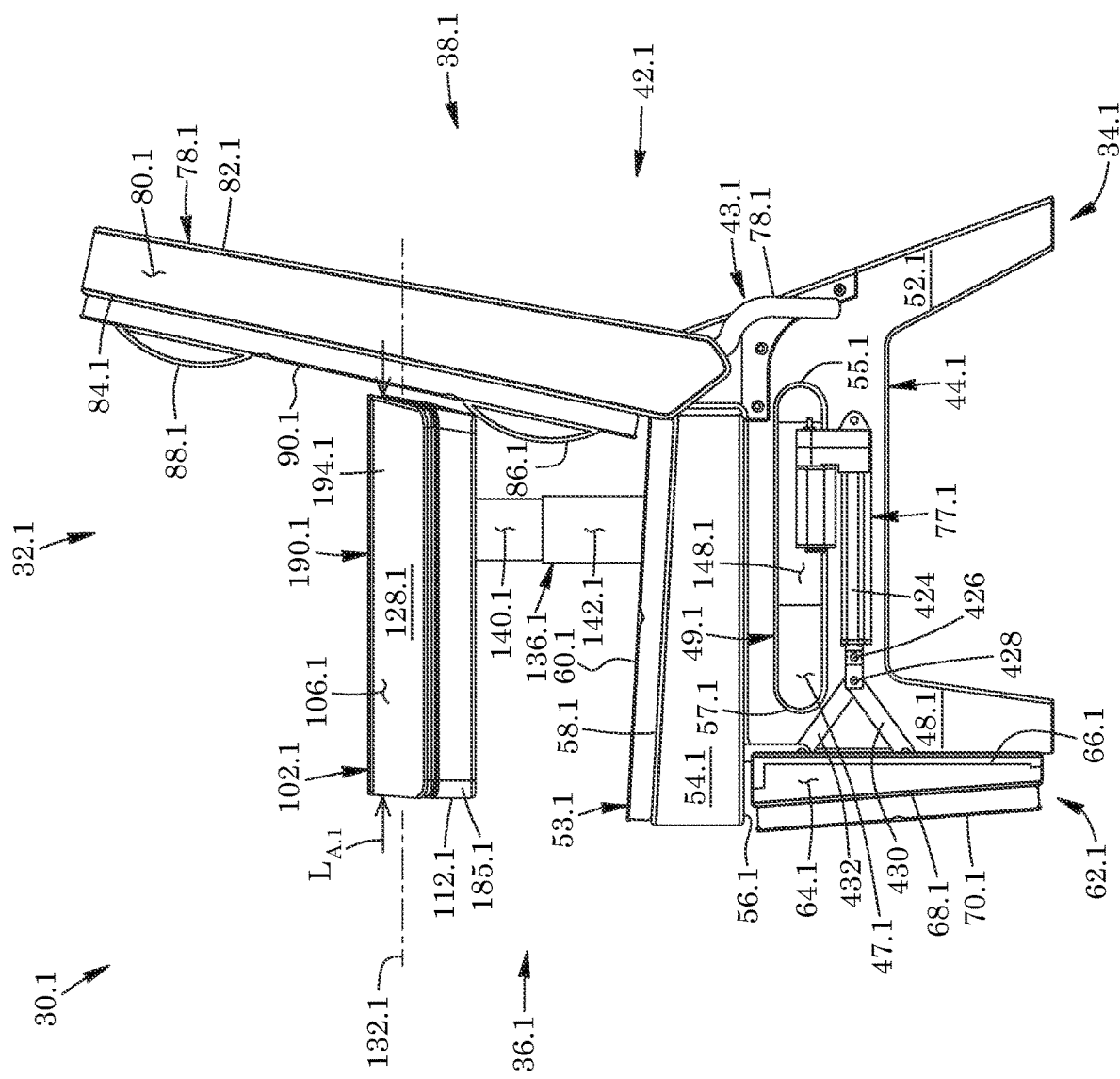
FIG. 38 is a right side elevation view of the chair of FIG. 13, with the right armrest and armrest height-adjustment assembly thereof not shown, with a right leg rest actuator of the chair shown in a retracted position, and the leg rest shown in its fully lowered position.
Figure 39:
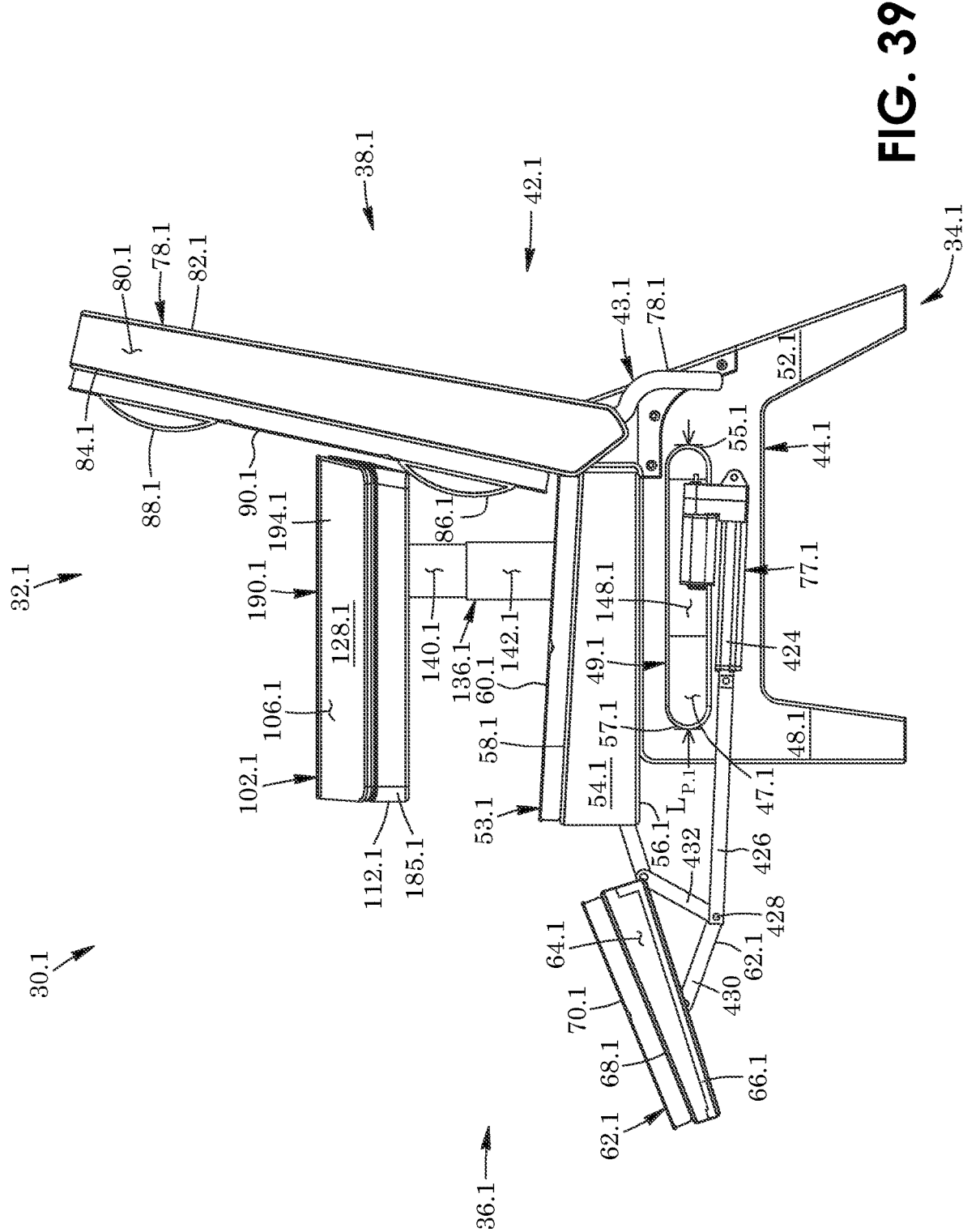
FIG. 39 is a right side elevation view of the chair of FIG. 13, with the right armrest and armrest height-adjustment assembly thereof not shown, with the right leg rest actuator of the chair shown in a fully extended position, and the leg rest shown in its fully raised position.

As seen in FIG. 38, the leg rest actuators 77.1 each comprise a cylinder 424 and a piston 426 slidably received therein in this example. The distal end 428 of the piston pivotally couples to link members 430 and 432 which in turn pivotally couple to the leg base 64.1. Actuation of the actuator 77.1 causes piston 426 and thus leg rest 62.1 to move from retracted positions seen in FIG. 38 to extended/raised positions seen in FIG. 39.

Figure 40:
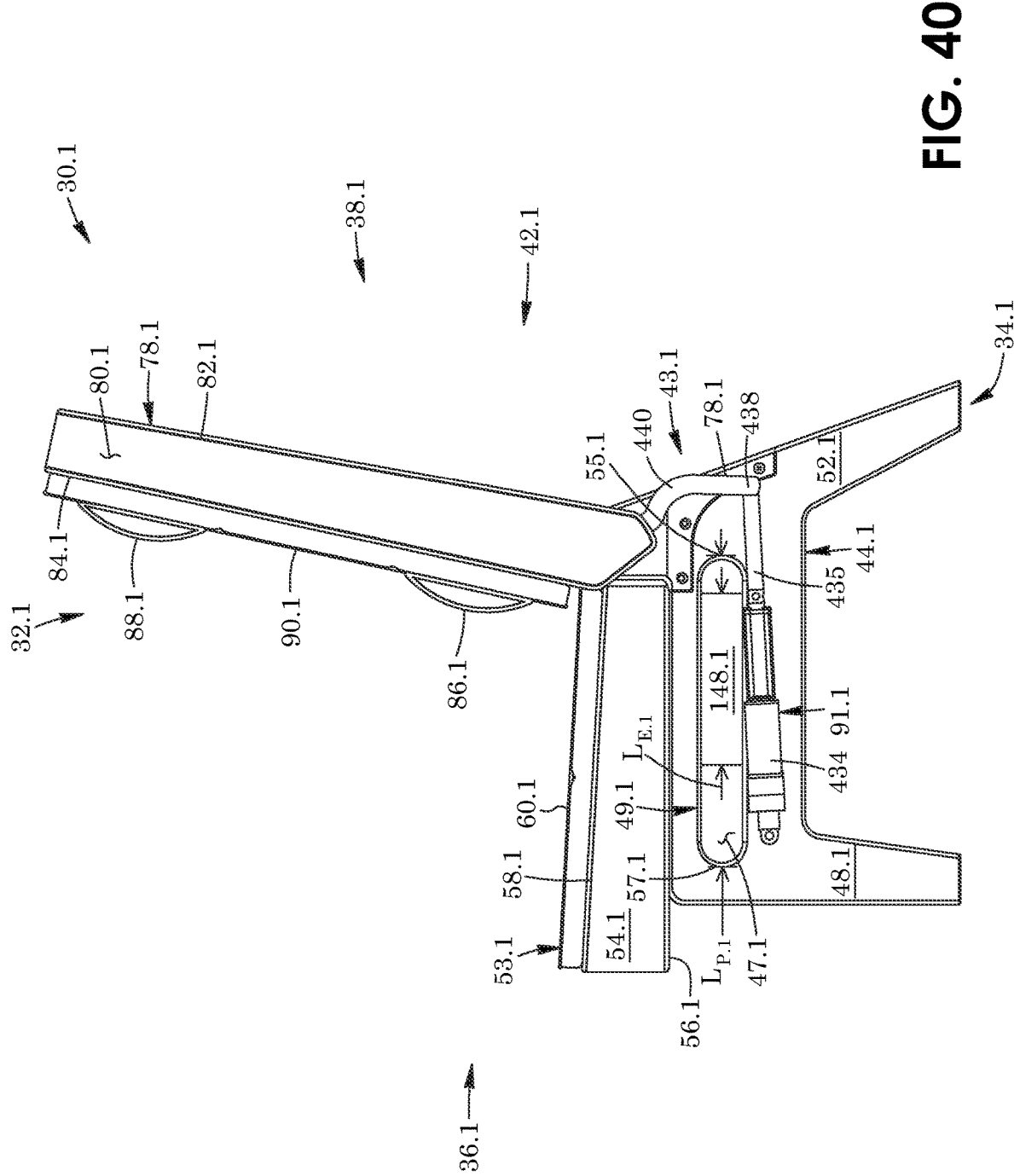
FIG. 40 is a right side elevation view of the chair of FIG. 13, with the armrests, armrest height-adjustment assemblies and leg rest thereof not shown, with a right backrest actuator of the chair shown in an extended position, and the backrest shown in its fully raised position.
Figure 41:
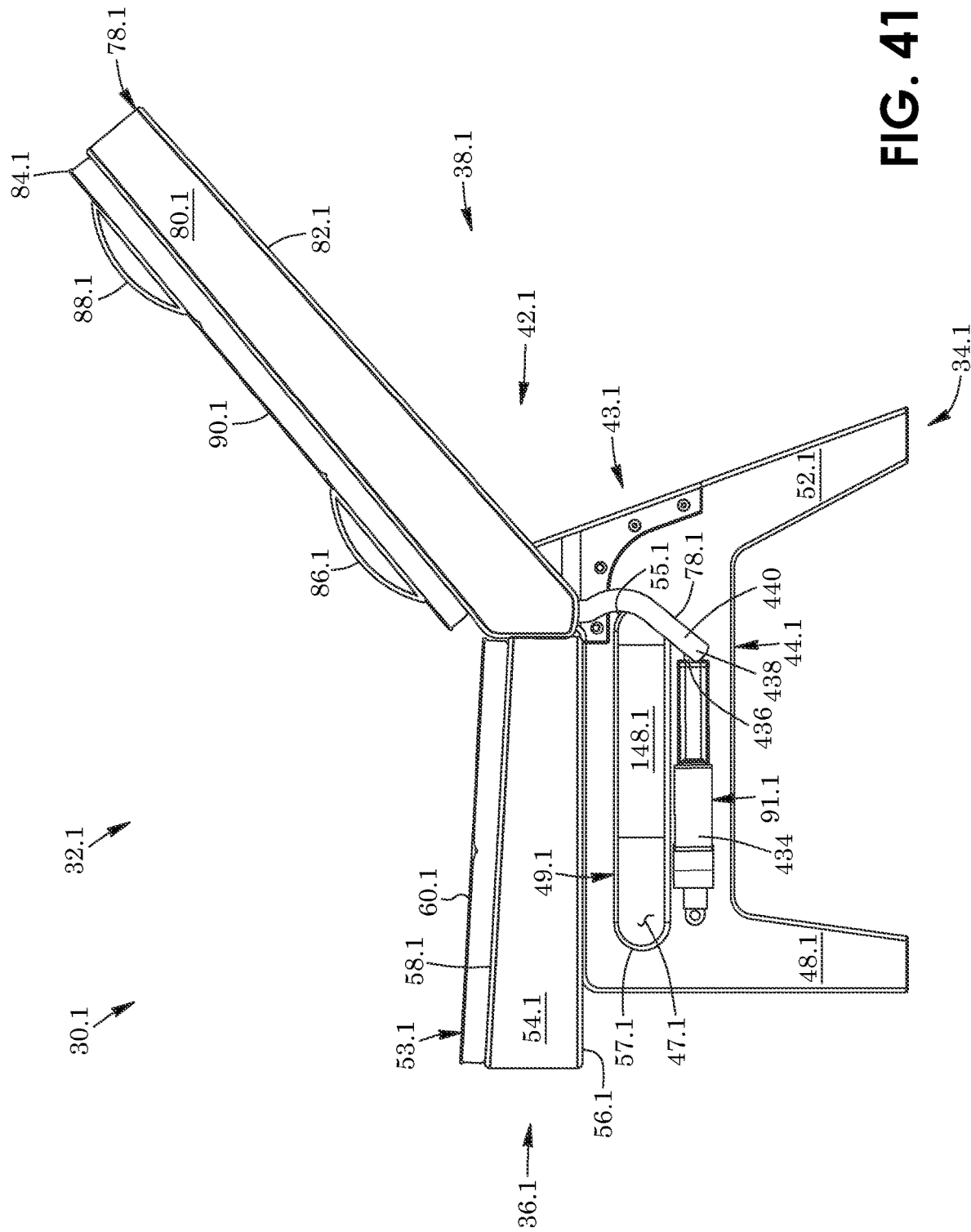
FIG. 41 is a right side elevation view of the chair of FIG. 13, with the armrests, armrest height-adjustment assemblies and leg rest thereof not shown, with the right backrest actuator of the chair shown in a retracted position, and the backrest shown in its fully lowered position.

As seen in FIG. 40, the backrest actuators 91.1 each comprise a cylinder 434 and a piston 436 slidably received therein in this example. The distal end 438 of the piston pivotally couples to link member 440. The link member is arcuate-shaped in this example and couples and extends downwards from backrest base 80.1. Retraction of the piston 436 within cylinder 434 to a fully retracted position seen in FIG. 41 causes the backrest 78.1 to be in a fully lowered position. Actuation of the actuator 91.1 causes the piston to move to an extended position which causes the backrest to move to a fully raised position seen in FIG. 40.

Figure 43:
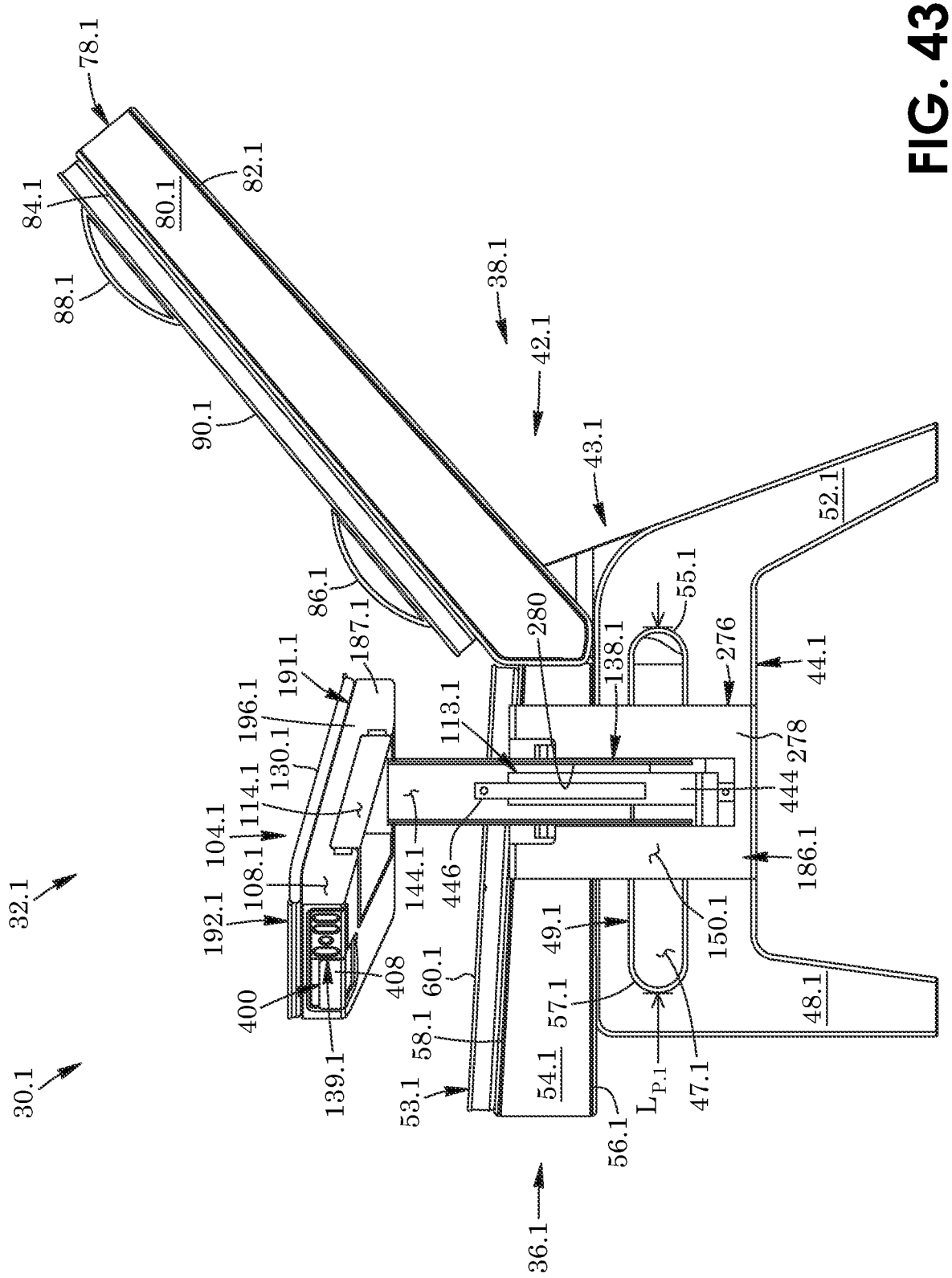
FIG. 43 is a right side elevation view of the chair of FIG. 13, with the right armrest and the leg rest thereof not shown, with the left armrest height-adjustment actuator shown in a retracted position, the left armrest shown in a lowered position and the backrest shown in its fully lowered position.
Figure 44:
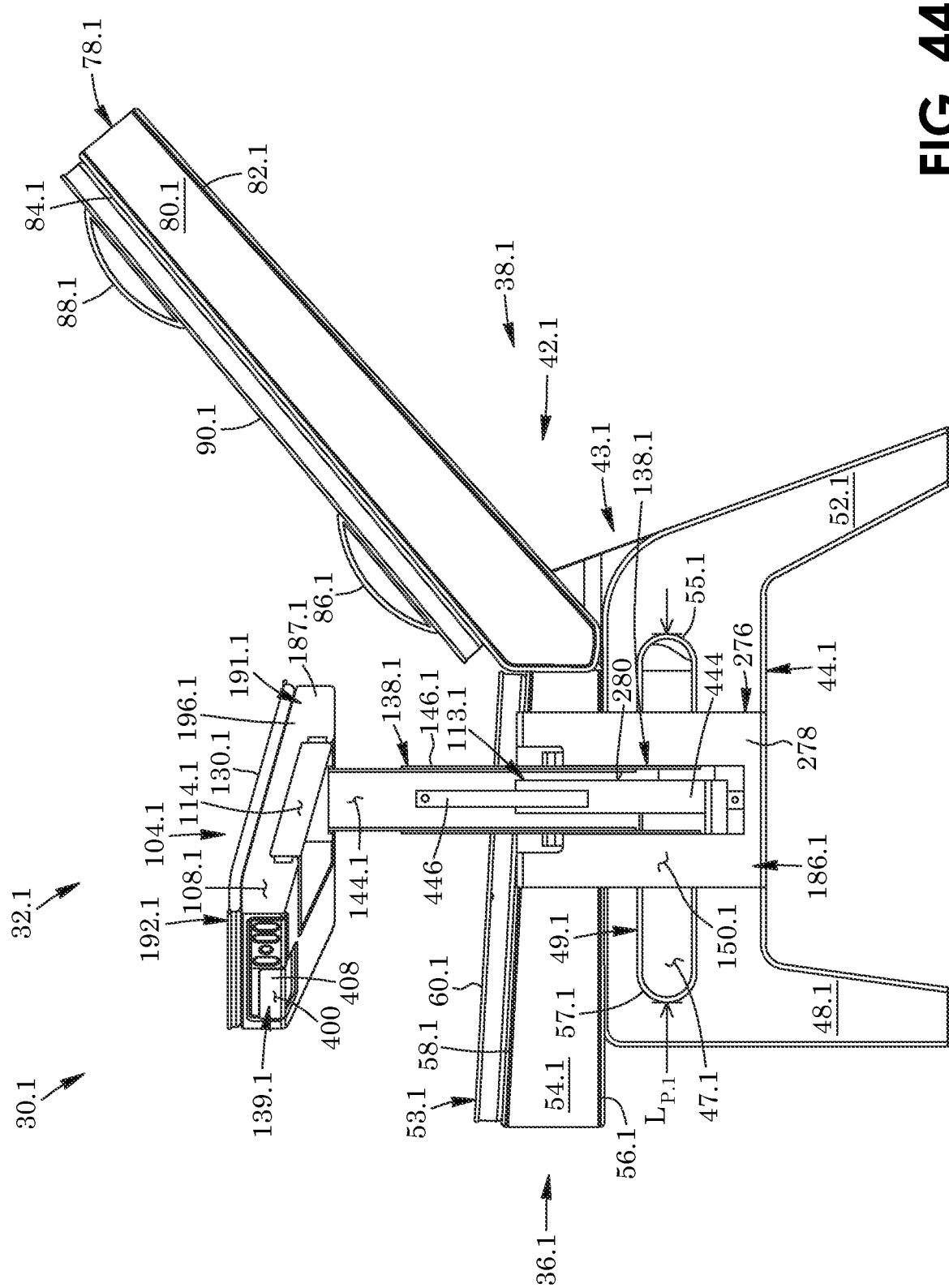
FIG. 44 is a right side elevation view of the chair of FIG. 13, with the right armrest and the leg rest thereof not shown, with the left armrest height-adjustment actuator shown in an extended position, the left armrest shown in an extended position, and the backrest shown in its fully lowered position.

As seen in FIG. 43, the armrest height-adjustment actuators 113.1 each comprise a cylinder 444 and a piston 446 slidably received therein in this example. The piston couples to corresponding inner shaft 144.1 of the height-adjustment assembly 138.1. Retraction of the piston 446 within cylinder 444 to a fully retracted position seen in FIG. 43 causes the armrest 104.1 to move to a fully lowered position. Actuation of the actuator 113.1 causes the piston to move to an extended position which causes the armrest to move to a fully raised position seen in FIG. 44.

FIGS. 36A to D show that the left and right control switches are located on the control panels 137.1 and 139.1 on the corresponding armrests 104.1 and 102.1 of the chair 30.1. The left armrest 104.1 includes redundant controls 443 including an armrest side selection switch 445. Operation of controls 443 enables the right armrest 102.1 to be electronically adjustable via the left armrest. The right armrest includes redundant controls 447 including an armrest side selection switch 449. Operation of controls 447 enables the left armrest 104.1 to be electronically adjustable via the right armrest. FIGS. 36A to D also show that the backrest control switches 93.1 and 95.1 on both sides of the armrests 102.1 and 104.1 with redundancy control of adjustment of the backrest. FIGS. 36A to D further show that the footrest control switches 87.1 and 90.1 on both sides of the armrests with redundancy control of adjustment of the footrest.

Each armrest control switch 115.1 on a given side has two states. When actuated alone, the control switch controls the vertical motion of the arm rest. When actuated in conjunction with the side selection switch' 445, the switch 115.1 controls the vertical movement of the opposite arm and also locks out simultaneous control of the opposite arm from its native side switch. The armrest control switch is momentary, and only works while being actively held down in this example.

FIGS. 37A to E show a block diagram implementation of the printed circuit board assembly 451 of chair 30.1 according to one example and embodiment. The assembly includes a control panel printed circuit board 453 for control panel 137.1 and a control panel printed circuit board 455 for control panel 139.1. Each control panel printed circuit board comprises:

a. a backrest control rocker switch 93.1;
b. a footrest control rocker switch 87.1;
c. armrest up/down rocker switch 115.1;
d. a momentary 'side select' button 445; and
e. a plurality of connectors or conductors 457 including power conductors and ground conductors to provide signals generated by the switches.

The assembly 451 includes a backrest printed circuit board 459. The backrest printed circuit board comprises:
a. switching regulators to convert the 12V input from the power supply unit (PSU) to local regulated voltages;
b. implementation of the digital logic outlined for the backrest in FIGS. 36A to D;
c. a motor driver circuit to control forward and reverse excitation of the motor; and
d. a plurality of connectors or conductors to connect to its PSU and to the back rest linear actuators.

The assembly 451 includes a footrest printed circuit board 461. The footrest printed circuit board comprises:
a. switching regulators to convert the 12V input from the PSU to local regulated voltages;
b. implementation of the digital logic outlined for the footrest in FIGS. 36A to D;
c. a motor driver circuit to control forward and reverse excitation of the motors;
d. a balancing actuator control module to ensure left and right actuators move in tandem; and
e. a plurality of connectors or conductors to connect to its PSU and to the foot rest linear actuators.

The assembly 451 includes an armrest printed circuit board 463. The armrest printed circuit board comprises:
a. switching regulators to convert the 12V input from the PSU to local regulated voltages;
b. implementation of the digital logic outlined for the armrests in FIGS. 36A to D;
c. a motor driver circuit to control forward and reverse excitation of the respective motors; and
d. a plurality of connectors or conductors to connect to its PSU and to the back rest linear actuators.

The backrest printed circuit board 459, footrest printed circuit board 461, and armrest printed circuit board 463 receive 12V power from an external AC-DC supply. This may be implemented as a single supply or 3 separate supplies, one dedicated to each printed circuit board, for example.

It will be appreciated that many variations are possible within the scope of the invention described herein. For example, person 76 seen in FIG. 7 has been illustrated as a nursing mother. However, this is not strictly required and the person may be any parent or caregiver feeding a baby, including a person who is bottle-feeding their infant for example.

Also specific examples of various locking and movement mechanisms have been described herein for chairs 30 and 30.1. However, it is to be understood that these are examples only and that many variations in such locking and movement mechanisms may be employed, such as those mentioned in the summary of the invention for example.

ADDITIONAL DESCRIPTION

Examples of chairs for supporting a person feeding a baby have been described. The following clauses are offered as further description.

(1) A chair for supporting a person feeding a baby, the chair comprising: a seat; and an armrest operatively connected to the seat, the armrest being selectively rotatable about a vertical axis, and moveable forward/rearward, inward/outward, and vertically relative to the seat, the armrest including an upper portion extending along a horizontal plane and an angled portion coupling to and extending inwards and downwards from and relative to the upper portion thereof.

(2) The chair of any preceding clause wherein at least one of the portions of the armrest is shaped to fully receive and support the baby thereon when breastfeeding.

(3) The chair of any preceding clause wherein the upper portion of the armrest is shaped to enable an arm of the person to rest and extend thereon when breastfeeding.

(4) The chair of any preceding clause wherein the armrest has a length equal to or greater than an average length of a full-term baby at birth. In other embodiments, the armrest may have a length that is less than the average length of a full-term baby.

(5) The chair of any preceding clause wherein the armrest has a length equal to or greater than 18 inches. The armrest may have another length in other embodiments.

(6) The chair of any preceding clause wherein the chair a front, a rear and a side extending between the front and the rear thereof, wherein the upper portion of the armrest extends between the front and the rear of the chair and is adjacent to and extends along the side of the chair, and wherein the angled portion of the armrest is inwardly spaced-apart from the upper portion of the armrest.

(7) The chair of any preceding clause wherein the angled portion of the armrest is larger than the upper portion of the armrest. The angled portion of the armrest may be smaller than the upper portion of the armrest in other embodiments.

(8) The chair of any preceding clause wherein the upper portion and the angled portion of the armrest have upper surfaces, with each said upper surface being planar.

(9) The chair of any preceding clause wherein each said portion of the armrest is a compound or custom molded shape. In this case the armrest is a rectangular prism in shape; however, this is not strictly required.

(10) The chair of any preceding clause wherein the armrest includes a side portion co-planar with a vertical plane, the angled portion of the armrest coupling to and extending between the upper portion and the side portion of the armrest.

(11) The chair of any preceding clause wherein the upper portion of the armrest is shaped to receive and support an arm of the person, wherein the angled portion of the armrest is shaped to receive, support and extend along a length of the baby, and wherein the armrest further includes a side portion coupled to and extending downwards from the angled portion of the armrest, the side portion of the armrest being shaped to abut, extend along and support a side of the person.

(12) The chair of any preceding clause wherein the armrest includes a recessed portion shaped to accommodate fitting around legs of the person.

(13) The chair of clause 12 wherein the recessed portion comprises a recessed cut-out of a vertical section of the armrest.

(14) The chair of any preceding clause wherein the side portion extends along a vertical plane.

(15) The chair of any preceding clause, wherein the armrest is electronically adjustable.

(16) The chair of any preceding clause, wherein the armrest is motorized.

(17) The chair of any preceding clause, further including a backrest coupled to the seat, a leg rest coupled to the seat, an armrest actuator actuation thereof enabling the armrests to selectively move, a backrest actuator actuation thereof enabling adjustment of the backrest relative to the seat, and a leg rest actuator actuation thereof enabling adjustment of the leg rest relative to the seat.

(18) A chair for supporting a person who is feeding a baby, the chair comprising: a seat; and an elongate armrest operatively connected to the seat, the armrest including a lower portion and an upper portion, being rotatable about a vertical axis and being moveable laterally, horizontally and vertically so as to enable the lower portion of the armrest to extend along and abut an abdomen of the person and enable the upper portion of the armrest to extend along and support a forearm of the person.

(19) The chair of clause 18 wherein the armrest angles inwards when extending along and abutting the abdomen of the person.

(20) A chair for supporting a person who is feeding a baby, the chair comprising: a base; a first carriage coupled to and laterally moveable relative to the base; a second carriage coupled to and moveable relative to the first carriage; an armrest coupled to the second carriage; and a locking mechanism having an unlocked position in which the armrest is moveable forward/rearward and laterally relative to the base, the locking mechanism being moveable from the unlocked position to a locked position in which movement of the armrest both forward/rearward and laterally is inhibited.

(21) A chair for supporting a person who is feeding a baby, the chair comprising: a base with a first plurality of teeth coupled thereto; a first carriage coupled to and laterally moveable relative to the base via a first rail system, the first carriage including a second plurality of teeth; a second carriage coupled to and moveable relative to the first carriage via a second rail system; an armrest coupled to the second carriage; and a locking member pivotally coupled to the second carriage, the locking member having an unlocked position in which first and second catches thereof are disengaged from the first plurality of teeth and the second plurality of teeth, the armrest in said unlocked position being moveable forward/rearward and laterally relative to the base, and the locking member being moveable from the unlocked position to a locked position in which both said catches engage with some of the first plurality of teeth and the second plurality of teeth, respectively, with movement of the armrest forward/rearward and laterally being inhibited thereby.

(22) The chair of clause 21 wherein the first plurality of teeth align in a first direction which extends from a front to a rear of the chair, and wherein the second plurality of teeth align in a second direction which extends from a left side to a right side of the chair

(23) The chair of any of clauses 21 further including a first gear rack of which the first plurality of teeth are parts thereof and a second gear rack of which the second plurality of teeth of parts thereof.

(24) The chair of any of clauses 21 to 23 wherein the locking member includes an upper portion with a handle thereon and a lower portion to which said catches couple.

(25) The chair of any of clauses 21 to 24 wherein the base includes a seat and a plurality of legs coupled to and extending downwards from the seat, the first plurality of teeth coupling to at least one of the legs, and the first carriage coupling to and being laterally moveable relative to the seat via the first rail system.

(26) The chair of any of clauses 21 to 25 wherein the locking member includes a third plurality of teeth of which said first catch is a part thereof and a fourth plurality of teeth of which said second catch is a part thereof.

(27) The chair of clause 26 further including a third gear rack of which the third plurality of teeth are parts thereof and a fourth gear rack of which the fourth plurality of teeth of parts thereof.

(28) The chair of any of clauses 21 to 27 wherein the locking member is Z-shaped.

(29) A chair for supporting a person who is feeding a baby, the chair comprising: a base; an elongate member coupled to and extending upwards from the base; an armrest coupled to the elongate member; and a locking member having an unlocked position in which the armrest is rotatable about said elongate member, and the locking member being moveable from the unlocked position to a locked position in which rotational movement of the armrest is inhibited.

(30) A chair for supporting a person who is feeding a baby, the chair comprising: a base; an elongate member coupled to and extending upwards from the base, the elongate member including a first plurality of teeth extending about to a distal end thereof; an armrest coupled to the elongate member; and a locking member pivotally coupled to the armrest, the locking member having an unlocked position in which at least one catch thereof is disengaged from the first plurality of teeth, the armrest in said unlocked position being rotatable about said elongate member, and the locking member being moveable from the unlocked position to a locked position in which said at least one catch engages with some of the first plurality of teeth, with rotational movement of the armrest being inhibited thereby.

(31) The chair of clause 30 further including a gear of which the first plurality of teeth are parts thereof.

(32) The chair of any of clauses 30 to 31 wherein the locking member includes a second plurality of teeth of which said at least one catch is a part thereof.

(33) The chair of any of clauses 30 to 32 wherein the locking member comprises a gear rack of which said at least one catch is a part thereof.

(34) The chair of any of clauses 30 to 33 wherein the locking member is elongate with a first end thereof pivotally connected to the armrest and a second end thereof including a second plurality of teeth extending therealong, said at least one catch being one of said tooth of the second plurality of teeth.

(35) The chair of any of clauses 29 to 34 further including an actuator actuating thereof selectively moves the locking member from the unlocked position to the locked position.

(36) The chair of clause 35 wherein the actuator is one of a cable and an electrical solenoid.

(37) The chair of any of clauses 29 to 35 including a second elongate member, the elongate members telescopically coupling together, and further including an actuator actuating thereof causes a first said elongate member extend upwards relative to a second said elongate member, the actuator being positioned within and enclosed by at least one of the elongate members.

(38) The chair of clause 37 wherein the locking member and the actuator are disposed within enclosed by the armrest.

(39) An armrest for a person who is feeding a baby, the armrest comprising: an inner mount; an outer housing coupled to, linearly moveable relative to and enclosing at least in part the inner mount; and a locking mechanism having an unlocked position in which the outer housing is moveable forward/rearward relative to the inner mount, the locking mechanism being moveable from the unlocked position to a locked position, with movement of the armrest forward/rearward being inhibited thereby.

(40) An armrest for a person who is feeding a baby, the armrest comprising: an inner mount along which a plurality of teeth couple; an outer housing coupled to and enclosing the inner mount at least in part; and a lever pivotally coupled to the outer housing, the lever having an unlocked position in which at least one catch thereof is disengaged from the plurality of teeth, the armrest in said unlocked position being moveable forward/rearward relative to the inner mount, and the lever being moveable from the unlocked position to a locked position in which the at least one catch engages with some of the plurality of teeth, with movement of the armrest forward/rearward being inhibited thereby.

(41) The armrest of clause 40 further including a gear rack of which the plurality of teeth are parts thereof.

(42) The armrest of any of 40 to 41 wherein the lever includes a second plurality of teeth of which said at least one catch is a part thereof.

(43) The armrest of any of clauses 40 to 42 wherein the lever comprises a gear rack of which said at least one catch is a part thereof.

(44) The armrest of clause 42 wherein the lever includes a channel which receives and is slidable relative to said gear rack.

(45) The armrest of clause 44 wherein the lever includes a gear rack of which said at least one catch is a part thereof.

(46) The armrest of any of clauses 40 to 45 wherein the armrest has an exterior, wherein the lever includes a distal end portion which extends in part along the exterior of the armrest.

(47) The armrest of clause 46 wherein the distal end portion is positioned in part adjacent to a distal end of the lever and the at least one catch is positioned adjacent to a proximal end of the lever.

(48) The armrest of any of clauses 40 to 47 wherein the lever is biased towards said locked position.

(49) The armrest of clause 39 wherein the locking member is biased towards said locked position.

(50) The armrest of any of clauses 40 to 47 wherein the lever further includes a distal end portion which biases the lever towards said locked position, with lifting upwards of the distal end portion causing the lever to move from the unlocked position to the locked position.

(51) The armrest of clause 50 wherein the distal end portion is planar.

(52) The armrest of any of clauses 40 to 49 and 51 wherein the inner mount includes a first of bearings and channels extending along outer sides thereof, and wherein the outer housing include a second of said bearings and said channels shaped to slidably engage with said first of the bearings and the channels.

(53) A chair for supporting a person who is feeding a baby, the chair comprising the armrest of any of clauses 39 to 52.

(54) A method of breastfeeding using a chair with an armrest that is rotatable about a vertical axis and moveable horizontally, vertically and laterally, the chair being for supporting a person feeding a baby, and the method comprising: positioning a lower portion of the armrest to extend along and abut an abdomen of the person; positioning an upper portion of the armrest to extend along and receive a forearm of the person; and positioning an intermediate portion of the armrest to extend along and receive a baby thereon such that a mouth of the baby aligns with a breast of the person.

(55) The method of clause 54, wherein the intermediate portion of the armrest couples to and extends between the upper portion and the lower portion of the armrest, and wherein the method further includes: positioning an outer surface of the intermediate portion of the armrest at angle so as to face the breast of the person.

It will be understood by someone skilled in the art that many of the details provided above are by way of example only and are not intended to limit the scope of the invention which is to be determined with reference to the following claims.

What is claimed is:

1. A chair for supporting a person feeding a baby, the chair comprising:
    a seat;
    an armrest operatively connected to the seat, the armrest being shaped to receive the baby thereon;
    a first actuator which selectively rotates the armrest about a vertical axis;
    a second actuator which selectively moves the armrest forwards/rearwards relative to the seat; and
    a third actuator which selective moves the armrest vertically relative to the seat;
    wherein each said actuator is electronically adjustable.

2. The chair as claimed in claim 1 wherein the second actuator and the third actuator are linear said actuators.

3. The chair as claimed in claim 1 wherein the armrest is motorized.

4. The chair as claimed in claim 1 wherein the armrest includes a lower portion and an upper portion, and wherein the armrest is moveable laterally, horizontally and vertically so as to enable the lower portion of the armrest to extend along and abut an abdomen of the person and enable the upper portion of the armrest to extend along and support a forearm of the person.

5. The chair as claimed in claim 1, wherein the armrest has pre-set recallable positions.

6. The chair as claimed in claim 1 wherein degrees of freedom of the armrest are electronically controlled.

7. The chair as claimed in claim 1 wherein the third actuator is a rotation said actuator.

8. A chair for supporting a person feeding a baby, the chair comprising:
    a seat; and
    first and second armrests operatively connected to the seat, each said armrest being shaped to receive the baby thereon, being selectively rotatable about a vertical axis, being moveable forward/rearward, being moveable laterally inwards/outwards, and being moveable vertically relative to the seat; and
    a control and processing unit including a pair of control panels, each said control panel coupling to a respective said armrest, and each said control panel being configured to control both said armrests.

9. The chair as claimed in claim 8 further including a plurality of actuators that enable said armrests to selectively move.

10. The chair as claimed in claim 9 wherein at least some of the actuators are linear said actuators.

11. The chair as claimed in claim 10 wherein one of the actuators is a rotation said actuator.

12. The chair as claimed in claim 8 wherein the armrests are electronically adjustable.

13. The chair as claimed in claim 8 wherein the armrests are motorized.

14. The chair as claimed in claim 8, wherein the armrests have pre-set recallable positions.

15. The chair as claimed in claim 8 wherein degrees of freedom of the armrests are electronically controlled.

16. A chair for supporting a person feeding a baby, the chair comprising:

a seat; and at least one armrest operatively connected to the seat, the at least one armrest including an upper portion extending along a horizontal plane, and the at least one armrest including an angled portion coupling to and extending inwards from the upper portion thereof, the angled portion of the at least one armrest being angled relative to the horizontal plane and the vertical plane, and each said portion of the armrest being planar on the top surface thereof.

17. The chair as claimed in claim 16, wherein the armrest includes a side portion co-planar with the vertical plane, and wherein the angled portion of the armrest couples to and extends between the upper portion of the armrest and the side portion of the armrest.

18. The chair as claimed in claim 16 wherein the angled portion of the armrest is rectangular in shape.

19. The chair as claimed in claim 16 wherein the upper portion of the armrest is rectangular in shape.

20. A chair for supporting a person feeding a baby, the chair comprising:

a seat;

an armrest operatively connected to the seat, the armrest being shaped to receive the baby thereon;

a first actuator which selectively rotates the armrest about a vertical axis;

a second actuator which selectively moves the armrest forwards/rearwards relative to the seat;

a third actuator which selective moves the armrest vertically relative to the seat; and an input device, whereby rotating the input device causes the first actuator to selectively rotate the armrest in a first direction of rotation or a second direction of rotation, moving the input device in a third direction causes of the second actuator to selectively move the armrest forwards or rearwards, and moving the input device in a fourth direction causes the third actuator to selectively raise or lower the armrest.

\* \* \* \* \*